(12) United States Patent
Suzuki et al.

(10) Patent No.: US 8,100,011 B2
(45) Date of Patent: Jan. 24, 2012

(54) PIEZOELECTRIC DEVICE, OSCILLATION TYPE GYRO SENSOR, ELECTRONIC DEVICE, AND METHOD OF MANUFACTURING PIEZOELECTRIC DEVICE

(75) Inventors: Koji Suzuki, Miyagi (JP); Teruo Inaguma, Miyagi (JP); Kazuo Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 11/960,041

(22) Filed: Dec. 19, 2007

(65) Prior Publication Data

US 2008/0196498 A1 Aug. 21, 2008

(30) Foreign Application Priority Data

Dec. 22, 2006 (JP) .................................. 2006-345357

(51) Int. Cl.
*G01P 9/04* (2006.01)
*G01C 19/56* (2006.01)
(52) U.S. Cl. .................................. 73/504.12; 73/504.15
(58) Field of Classification Search .............. 73/504.15, 73/504.12, 504.16, 504.13, 504.04, 504.02
See application file for complete search history.

(56) References Cited

U.S. PATENT DOCUMENTS

| 5,796,000 | A | * | 8/1998 | Fujiu et al. ................. | 73/504.15 |
| 6,523,410 | B2 | | 2/2003 | Matsubara et al. | |
| 7,107,843 | B2 | * | 9/2006 | Ohuchi et al. ............. | 73/504.16 |
| 7,263,884 | B2 | * | 9/2007 | Takahashi et al. ......... | 73/504.15 |
| 7,325,452 | B2 | * | 2/2008 | Takahashi et al. ......... | 73/504.15 |
| 2002/0134156 | A1 | | 9/2002 | Matsubara et al. | |
| 2006/0196267 | A1 | * | 9/2006 | Takahashi et al. ......... | 73/504.12 |

FOREIGN PATENT DOCUMENTS

JP 2001-165664 6/2001

* cited by examiner

*Primary Examiner* — Helen C. Kwok
(74) *Attorney, Agent, or Firm* — K&L Gates LLP

(57) ABSTRACT

A piezoelectric device is disclosed. A substrate has an arm portion. A piezoelectric member is disposed on the substrate. A drive electrode oscillates the arm portion by a piezoelectric operation of the piezoelectric member. First and second detection electrodes detect a Coriolis force from the oscillating arm portion. A first lead electrode having a first area is disposed on the substrate and connected to the first detection electrode and connects the first detection electrode to the outside. A second lead electrode has a second area substantially the same as the first area. The second lead electrode is disposed on the substrate asymmetrical to the first lead electrode with respect to an axis in a longitudinal direction of the arm portion and connected to the second detection electrode. The second lead electrode connects the second detection electrode to the outside. A third lead electrode connects the drive electrode to the outside.

7 Claims, 55 Drawing Sheets

| Film thickness [nm] | 100 | 200 | 233 | 288 | 350 | 400 |
|---|---|---|---|---|---|---|
| Good product ratio [%] | 96 | 95 | 93 | 90 | 80 | 30 |

PIEZOELECTRIC DEVICE, OSCILLATION TYPE GYRO SENSOR, ELECTRONIC DEVICE, AND METHOD OF MANUFACTURING PIEZOELECTRIC DEVICE

CROSS REFERENCES TO RELATED APPLICATIONS

The present application claims priority to Japanese Patent Application JP 2006-345357 filed in the Japanese Patent Office on Dec. 22, 2006, the entire contents of which is being incorporated herein by reference.

BACKGROUND

The present application relates to a piezoelectric device that detects a rotational angular velocity of a subject, an oscillation type gyro sensor in which a piezoelectric device is mounted, an electronic device in which an oscillation type gyro sensor is mounted, and a method of manufacturing a piezoelectric device.

As commercially used angular velocity sensors, so-called oscillation type gyro sensors have been widely used. An oscillation type gyro sensor is a sensor having a cantilevered oscillator that oscillates at a predetermined resonance frequency and a piezoelectric device that detects the Coriolis force that occurs due to an influence of an angular velocity so as to detect the angular velocity (for example, see Japanese Patent Application Laid-Open No. 2001-165664, paragraph 0043, FIG. 1, hereinafter this document is referred to as Patent Document 1).

An oscillation type gyro sensor has advantages of for example simple mechanism, short activation time, and low manufacturing cost. Oscillation type gyro sensors are mounted in electronic devices such as video cameras, virtual reality devices, and car navigation systems for sensors that detect hand jitter, motion detection, and direction detection, respectively.

In recent years, as electronic devices in which an oscillation type gyro sensor is mounted have been size-reduced and have had improved functions, needs of size-reduction and advanced functions of the oscillation type gyro sensors have become strong. For example, to satisfy the needs of multi-functions and size-reduction of an electronic device, an oscillation type gyro sensor is mounted on a single circuit board together with other sensors. To accomplish the size-reduction of the electronic device, a technique called the MEMS (Micro Electro Mechanical System) that forms a structure on an Si substrate using a thin film process and a photolithography technique has become common.

SUMMARY

However, in such a small cantilevered oscillator, a wiring of an externally applied voltage used to drive the oscillator and a wiring of a detection electrode used to detect the Coriolis force and generate a weak signal are disposed very closely in an area of for example 1 mm$^2$ on the same plane. In this case, a phenomenon of which an externally applied drive current that is very weak leaks from a lead electrode (drive lead electrode) of a drive electrode to a lead electrode (detection lead electrode) of the detection electrodes occurs.

When leak currents flow from the drive lead electrode to for example two detection lead electrodes, the leak currents act as a voltage that occurs when the detection lead electrodes detect the Coriolis force. Thus, if the levels of signals of the leak currents that flow to the two detection lead electrodes are different, the detection signals become unbalanced. Taking into account of the detection theory of the cantilevered oscillator that detects the Coriolis force as the difference of two detection signals, it appears that an extra signal is regularly applied to one of the detection lead electrode. In this state, since the PSRR (Power Supply Rejection Ratio) against the fluctuation of the power supply voltage becomes large, the detection signals may deviate from the predetermined specification value.

In view of the foregoing, it would be desirable to provide a piezoelectric device, an oscillation type gyro sensor, an electronic device, and a method of manufacturing an piezoelectric device that allow the difference of leak currents that flow from a drive lead electrode to at least two detection lead electrodes to be suppressed as much as possible.

According to an embodiment, there is provided a piezoelectric device. The piezoelectric device includes a substrate, a piezoelectric member, a drive electrode, a first detection electrode, a second detection electrode, a first lead electrode, a second lead electrode, and a third lead electrode. The substrate has an arm portion. The piezoelectric member is disposed on the substrate. The drive electrode oscillates the arm portion by a piezoelectric operation of the piezoelectric member. The first detection electrode and the second detection electrode detect a Coriolis force which occurs in the arm portion which oscillates. The first lead electrode has a first area. The first lead electrode is disposed on the substrate and connected to the first detection electrode. The first lead electrode connects the first detection electrode to an outside of the piezoelectric device. The second lead electrode has a second area which is substantially the same as the first area. The second lead electrode is disposed on the substrate in a shape asymmetrical to the first lead electrode with respect to an axis in a longitudinal direction of the arm portion and connected to the second detection electrode. The second lead electrode connects the second detection electrode to the outside of the piezoelectric device. The third lead electrode connects the drive electrode to the outside of the piezoelectric device.

According to this embodiment, the first area of the first lead electrode is substantially the same as the second area of the second lead electrode. Thus, the difference between the leak current from the third lead electrode to the first lead electrode and the leak current from the third lead electrode to the second lead electrode can be decreased.

The first lead electrode (or the second lead electrode) has a lead wire and a pad. To dispose the first lead electrode and the second lead electrode in a narrow area of the substrate without crosses, it is preferred that the first lead electrode and the second lead electrode be asymmetrically formed.

The first lead electrode and the second lead electrode can be asymmetrically formed as long as the first area is substantially the same as the second area. Thus, it is not necessary to dispose the arm portions at the center axis of all the piezoelectric devices. As a result, when a plurality of piezoelectric devices are manufactured from one substrate by the MEMS technique or the like, the degree of freedom of the positions of piezoelectric devices manufactured from the substrate is improved. Thus, the number of piezoelectric devices manufactured from one substrate can be increased.

In addition, since the degree of freedom of the positions of the first and second lead electrodes is improved, when a plurality of piezoelectric devices are manufactured from one substrate by the MEMS technique or the like, a polarization treatment for the piezoelectric material of the plurality of piezoelectric devices can be performed at a time.

As used herein, the term "external" of "external connection" refers to an element or a device that is different from a piezoelectric device. Such an element or such a device is, for example, a circuit board on which a piezoelectric device is mounted.

As used herein, the term "(piezoelectric member formed) on the circuit board" means that the piezoelectric member may not be directly in contact with the circuit board. Instead, another member may be interspersed between the circuit board and the piezoelectric member. In other words, this term implies that the circuit board and the piezoelectric member are unified through another member.

According to an embodiment, in the piezoelectric device, the first lead electrode has a first lead wire and a first pad. The first lead wire is connected to the first detection electrode and has a first length. The first pad is connected to the first lead wire. The second lead electrode has a second lead wire and a second pad. The second lead wire is connected to the second detection electrode and has a second length larger than the first length. The second pad is connected to the second lead wire. In such a manner, the first lead wire and the second lead wire can be designed such that their lengths are different. As a result, the degree of freedom of the positions of for example the third lead electrode and so forth can be improved.

According to an embodiment, in the piezoelectric device, the drive electrode is disposed between the first detection electrode and the second detection electrode. The third lead electrode has a third lead wire and a third pad. The third lead wire is connected to the drive electrode and has a third length larger than the first length. The third pad is connected to the third lead wire. When the drive electrode is disposed at such a position, for example the third pad can be disposed at a position apart from the arm portion like the first pad. As a result, the degree of freedom of layout of positions can be improved. Thus, as described above, the MEMS technique can be effectively performed.

According to an embodiment, in the piezoelectric device, a ratio of the first area and the second area may be 8% or less. Thus, the PSRR can be decreased to a predetermined specification value or lower.

According to an embodiment, there is provided an oscillation type gyro sensor. The oscillation type gyro sensor includes a substrate, a piezoelectric member, a drive electrode, a first detection electrode, a second detection electrode, a first lead electrode, a second lead electrode, a third lead electrode, and a control circuit. The substrate has an arm portion. The piezoelectric member is disposed on the substrate. The drive electrode oscillates the arm portion by a piezoelectric operation of the piezoelectric member. The first detection electrode and the second detection electrode detect a Coriolis force which occurs in the arm portion which oscillates. The first lead electrode has a first area. The first lead electrode is disposed on the substrate and connected to the first detection electrode. The first lead electrode connects the first detection electrode to an outside of the piezoelectric device. The second lead electrode has a second area which is substantially the same as the first area. The second lead electrode is disposed on the substrate in a shape asymmetrical to the first lead electrode with respect to an axis in a longitudinal direction of the arm portion and is connected to the second detection electrode. The second lead electrode connects the second detection electrode to the outside of the piezoelectric device. The third lead electrode connects the drive electrode to the outside of the piezoelectric device. The control circuit is capable of outputting a drive signal to the drive electrode through the third lead electrode and obtaining a detection signal detected by the first detection electrode and the second detection electrode through the first lead electrode and the second lead electrode, respectively.

According to an embodiment, there is provided an electronic device. The electronic device includes an oscillation type gyro sensor and a device body. The oscillation type gyro sensor has a substrate, a piezoelectric member, a drive electrode, a first detection electrode, a second detection electrode, a first lead electrode, a second lead electrode, a third lead electrode, and a control circuit. The substrate has an arm portion. The piezoelectric member is disposed on the substrate. The drive electrode oscillates the arm portion by a piezoelectric operation of the piezoelectric member. The first detection electrode and the second detection electrode detect a Coriolis force which occurs in the arm portion which oscillates. The first lead electrode has a first area. The first lead electrode is disposed on the substrate and connected to the first detection electrode. The first lead electrode connects the first detection electrode to an outside of the piezoelectric device. The second lead electrode has a second area which is substantially the same as the first area. The second lead electrode is disposed on the substrate in a shape asymmetrical to the first lead electrode with respect to an axis in a longitudinal direction of the arm portion and is connected to the second detection electrode. The second lead electrode connects the second detection electrode to the outside of the piezoelectric device. The third lead electrode connects the drive electrode to the outside of the piezoelectric device. The control circuit is capable of outputting a drive signal to the drive electrode through the third lead electrode and obtaining a detection signal detected by the first detection electrode and the second detection electrode through the first lead electrode and the second lead electrode, respectively. In the device body, the oscillation type gyro sensor is mounted.

According to an embodiment, there is provided a method of manufacturing a piezoelectric device. A piezoelectric member is formed on a substrate. A drive electrode which oscillates an arm portion is formed on the piezoelectric member. A first detection electrode and a second detection electrode are formed on the piezoelectric member. The first detection electrode and the second detection electrode detect a Coriolis force which occurs in the arm portion which oscillates. A first lead electrode is formed on the substrate such that the first lead electrode is connected to the first detection electrode. The first lead electrode connects the first detection electrode to an outside of the piezoelectric device. The first electrode has a first area. A second lead electrode is formed on the substrate such that the second lead electrode is connected to the second detection electrode. The second lead electrode connects the second detection electrode to the outside of the piezoelectric device. The second lead electrode is asymmetrical to the first lead electrode with respect to an axis in a longitudinal direction of the arm portion. The second lead electrode has a second area which is substantially same as the first area. A third lead electrode is formed on the substrate. The third lead electrode connects the drive electrode to the outside of the piezoelectric device.

As described above, according to embodiments, the difference between leak currents from the drive lead electrode to at least two detection lead electrodes can be decreased as much as possible. As a result, the PSRR can be decreased.

Additional features and advantages are described herein, and will be apparent from, the following Detailed Description and the figures.

BRIEF DESCRIPTION OF THE FIGURES

FIG. 5A is a plan view showing a single crystal silicon substrate, FIG. 5B is a sectional view taken along line X-X' of FIG. 5A;

FIG. 6A is a plan view, FIG. 6B is a sectional view taken along line X-X' of FIG. 6A;

FIG. 7A is a plan view, FIG. 7B is a sectional view taken along line X-X' of FIG. 7A;

FIG. 8A is a plan view, FIG. 8B is a sectional view taken along line X-X' of FIG. 8A;

FIG. 10A is a plan view, FIG. 10B is a sectional view taken along line X-X' of FIG. 10A;

FIG. 11A is a graph, FIG. 11B is a table;

FIG. 15A is a plan view, FIG. 15B is a sectional view taken along line X-X' of FIG. 15A;

FIG. 16A is a plan view, FIG. 16B is a sectional view taken along line X-X' of FIG. 16A;

FIG. 19A is a plan view, FIG. 19B is a sectional view taken along line X-X' of FIG. 19A;

FIG. 39A is a plan view showing the entire substrate, FIG. 39B is an enlarged plan view showing a state of the substrate;

FIG. 40A is a plan view showing the entire substrate, FIG. 40B is an enlarged plan view showing a state of the substrate;

FIG. 41A is a plan view showing the entire substrate, FIG. 41B is an enlarged plan view showing the substrate;

FIG. 42A is a plan view showing the entire substrate, FIG. 42B is an enlarged plan view showing a state of the substrate;

DETAILED DESCRIPTION

Next, with reference to the accompanying drawings, embodiments will be described.

Figure 1A:
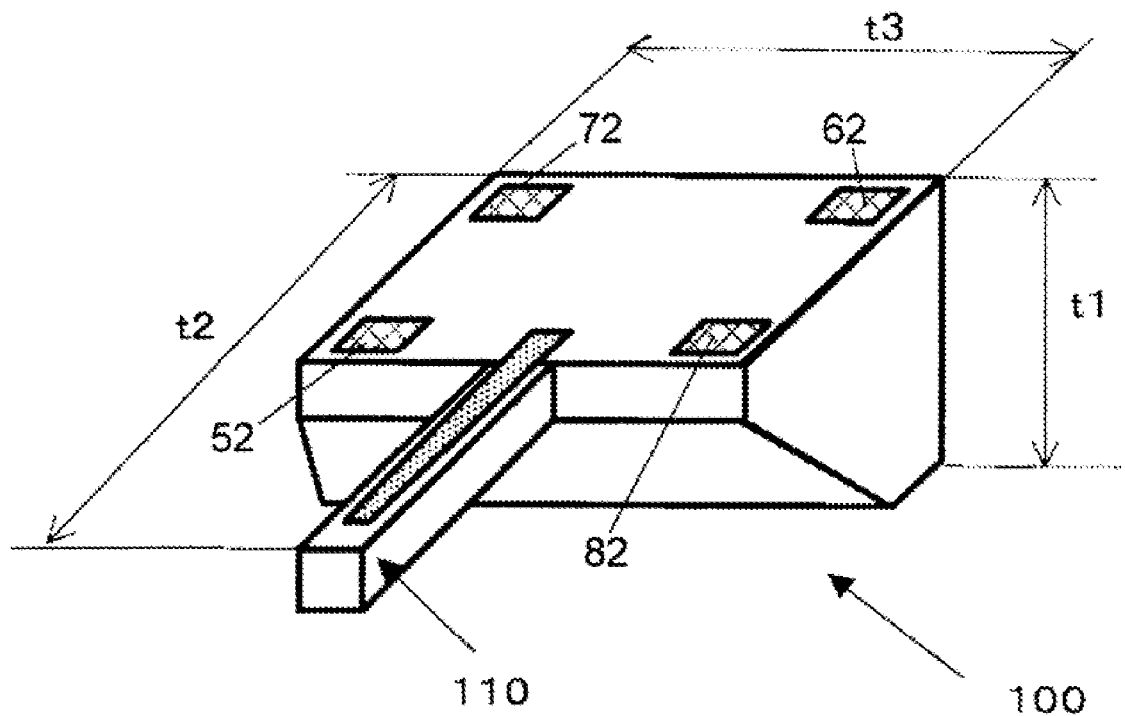
FIG. 1A and FIG. 1B are schematic perspective views describing a piezoelectric device according to an embodiment.
Figure 1B:
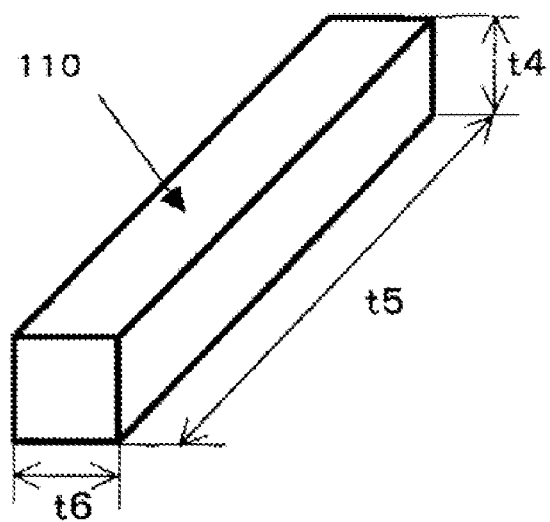

FIG. 1A and FIG. 1B show a piezoelectric device according to an embodiment. The piezoelectric device is designated by reference numeral 100 and is an element as a part mounted in an oscillation type gyro sensor. FIG. 1A is an external perspective view showing the entire piezoelectric device 100. FIG. 1B is an enlarged perspective view showing only an oscillator 110 of the piezoelectric device 100. As shown in FIG. 1A and FIG. 1B, the piezoelectric device 100 has a so-called cantilevered oscillator 110 that has been cut from a silicon single crystal substrate. The oscillator 110 is formed in a quadrangular prism shape of which the sectional shape in its longitudinal direction is square.

The thickness t1, the length t2, and the width t3 of the piezoelectric device 100 are around 300 μm, 3 mm, and 1 mm, respectively. As the size of an oscillation lever of the oscillator 110 (the oscillation lever actually oscillates), the thickness t4 of the oscillation lever, the length t5 of the oscillation lever, and the width t6 of the oscillation lever are 100 μm, 2.5 mm, and 100 μm, respectively. The resonance frequency at which the oscillation lever oscillates in this shape is around 40 kHz. The foregoing values are just exemplary, not limited to them. These values can be changed depending on the frequency for use and the size of the piezoelectric device for use.

Figure 2:
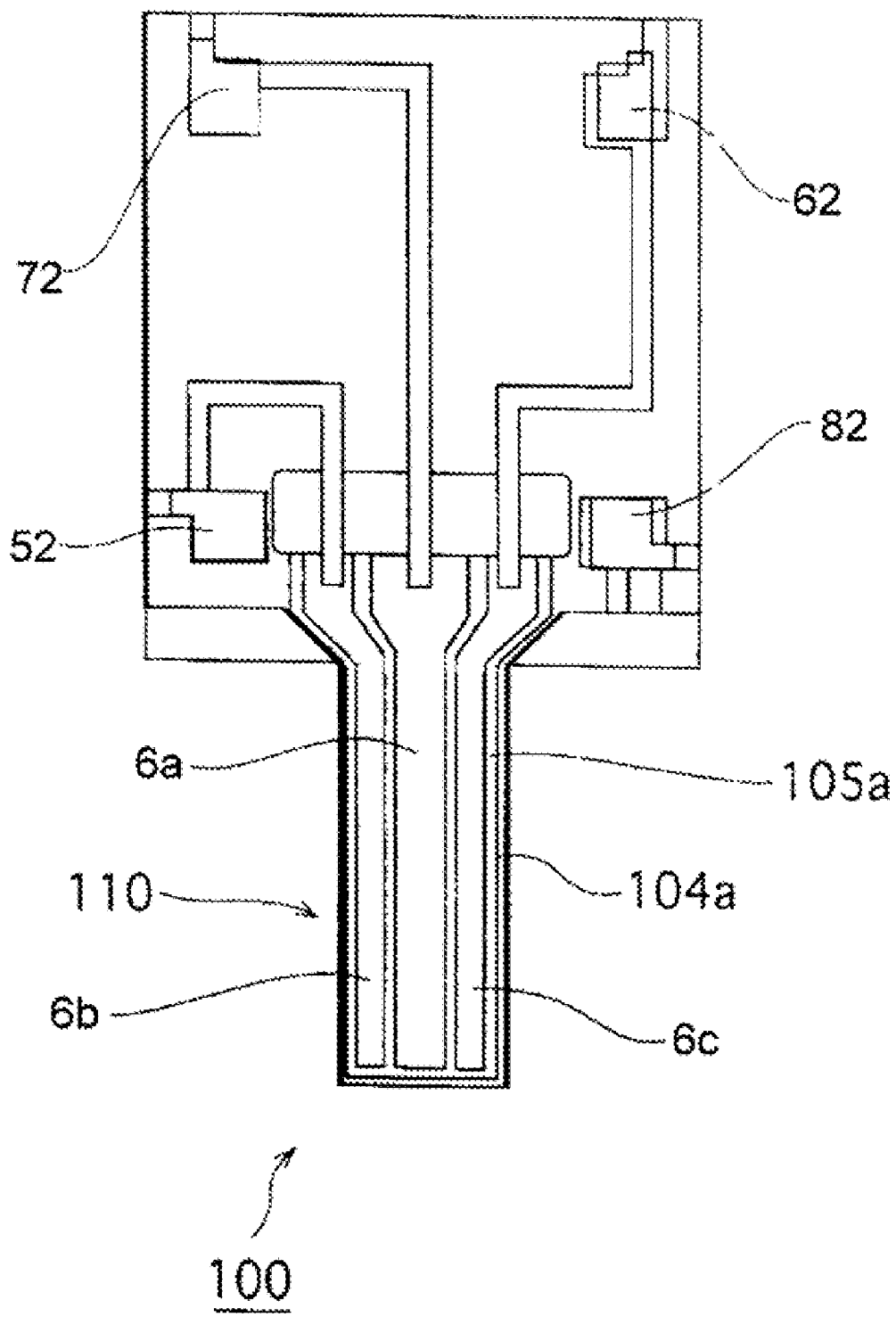
FIG. 2 is a schematic bottom view showing the piezoelectric device shown in FIG. 1A.

When the piezoelectric device 100 is used, it is mounted on an IC circuit board (not shown). FIG. 2 shows a mounting surface (bottom surface) of the piezoelectric device 100 that is mounted on the IC circuit board.

Successively formed on the front surface of the oscillator 110 are a reference electrode 104a and a piezoelectric substance (piezoelectric member) 105a. Formed on the piezoelectric substance 105a are a drive electrode 6a and a pair of detection electrodes 6b and 6c (that are also referred to as the first detection electrode 6b and the second detection electrode 6c, respectively) in parallel in the longitudinal direction of the oscillator 110 such that the drive electrode 6a and the detection electrodes 6b and 6c do not contact with each other. Disposed at the drive electrode 6a, the detection electrodes 6b and 6c, and the reference electrode 104a are terminals that are externally connected (the terminals are also referred to as pads 52, 62, 72, and 82).

The piezoelectric substance 105a is a piezoelectric film made of a piezoelectric ceramic such as lead zirconium titanate (PZT) or a piezoelectric single crystal such as crystal or $LaTaO_3$. The reference electrode 104a, the drive electrode 6a, and the detection electrodes 6b and 6c are metal electrodes, conductive oxide electrodes, or the like.

Figure 3:
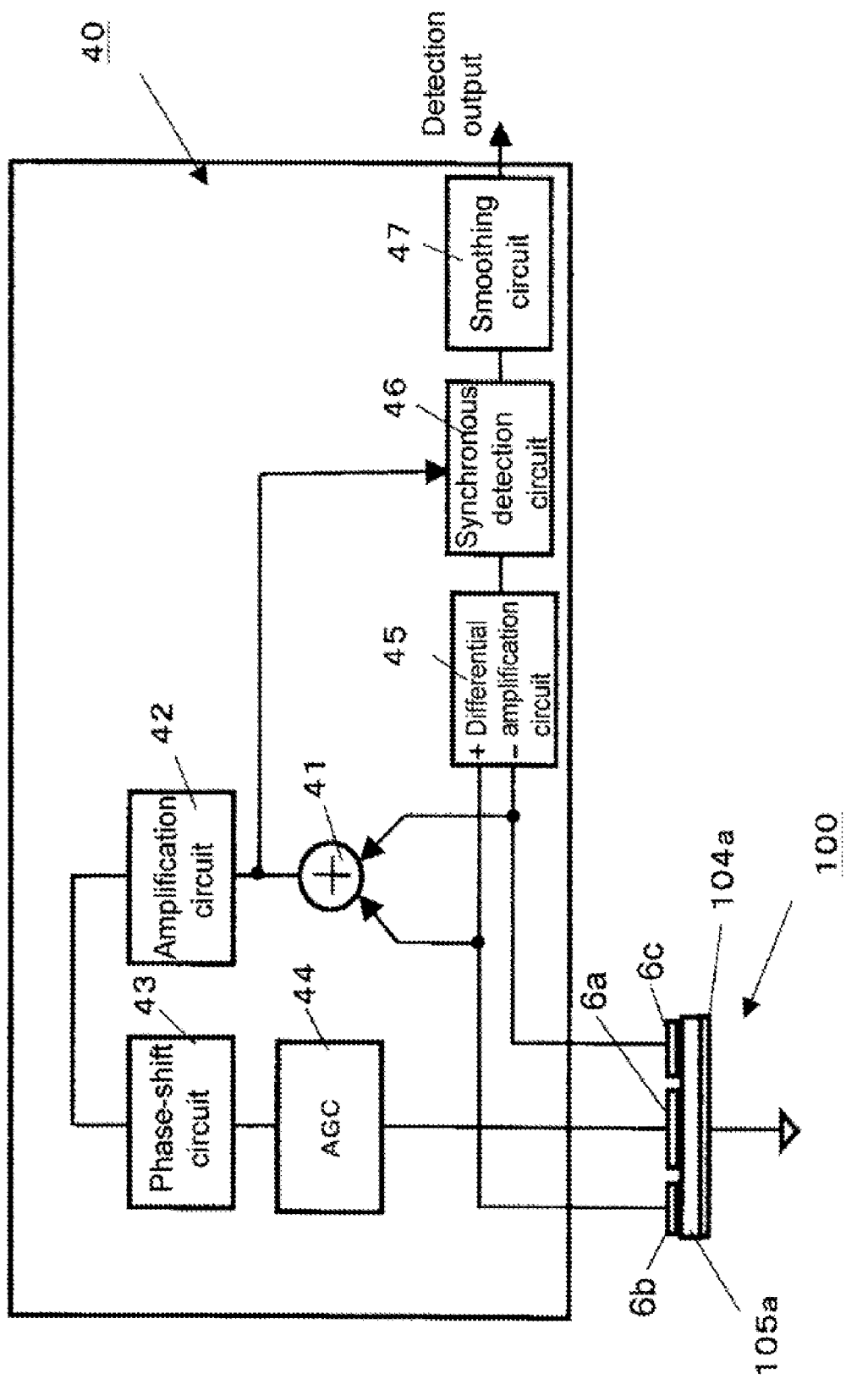
FIG. 3 is a block diagram showing the structure of an oscillation type gyro sensor according to an embodiment.

FIG. 3 is a block diagram showing the structure of an oscillation type gyro sensor in which the piezoelectric device 100 has been mounted. The piezoelectric device 100 is connected to an IC circuit 40 that is a control circuit. The oscillation type gyro sensor detects the Coriolis force that occurs corresponding to an angular velocity of the piezoelectric device 100. The IC circuit 40 is composed of an IC device and other electronic parts that are mounted on the IC circuit board together with the piezoelectric device 100.

The IC circuit 40 includes an addition circuit 41, an amplification circuit 42, a phase-shift circuit 43, an AGC (Automatic Gain Controller) 44, a differential amplification circuit 45, a synchronous detection circuit 46, and a smoothing circuit 47.

The pair of detection electrodes 6b and 6c of the piezoelectric device 100 are connected both to the addition circuit 41 and the differential amplification circuit 45. The drive electrode 6a of the piezoelectric device 100 is connected to an output terminal of the AGC 44.

The addition circuit 41, the amplification circuit 42, the phase-shift circuit 43, the AGC 44, and the piezoelectric device 100 compose a so-called phase-shift oscillation circuit. The phase-shift oscillation circuit applies a voltage between the reference electrode 104a and the drive electrode 6a of the piezoelectric device 100 to cause the piezoelectric device 100 to self oscillate. The oscillator 110 oscillates in the direction of the thickness.

As described above, the pair of detection electrodes 6b and 6c are connected both to the addition circuit 41 and the differential amplification circuit 45. An output terminal of the differential amplification circuit 45 is connected to the synchronous detection circuit 46. The synchronous detection circuit 46 is connected to the smoothing circuit 47. The differential amplification circuit 45, the synchronous detection circuit 46, the smoothing circuit 47, and the piezoelectric substance 105a function as a detection section that detects an angular velocity of the oscillator 110.

While the phase-shift oscillation circuit is causing the oscillator 110 of the piezoelectric device 100 to self oscillate, when an angular velocity occurs in the longitudinal direction of the oscillator 110, the Coriolis force causes the oscillation direction of the oscillator 110 to change. In this case, the output of one of the detection electrodes 6b and 6c increases, whereas the output of the other detection electrode decreases.

The IC circuit 40 measures the output of one of the detection electrodes 6*b* and 6*c* or the changes of both the outputs thereof and detects an input angular velocity in the longitudinal direction of the oscillator 110.

Figure 4:
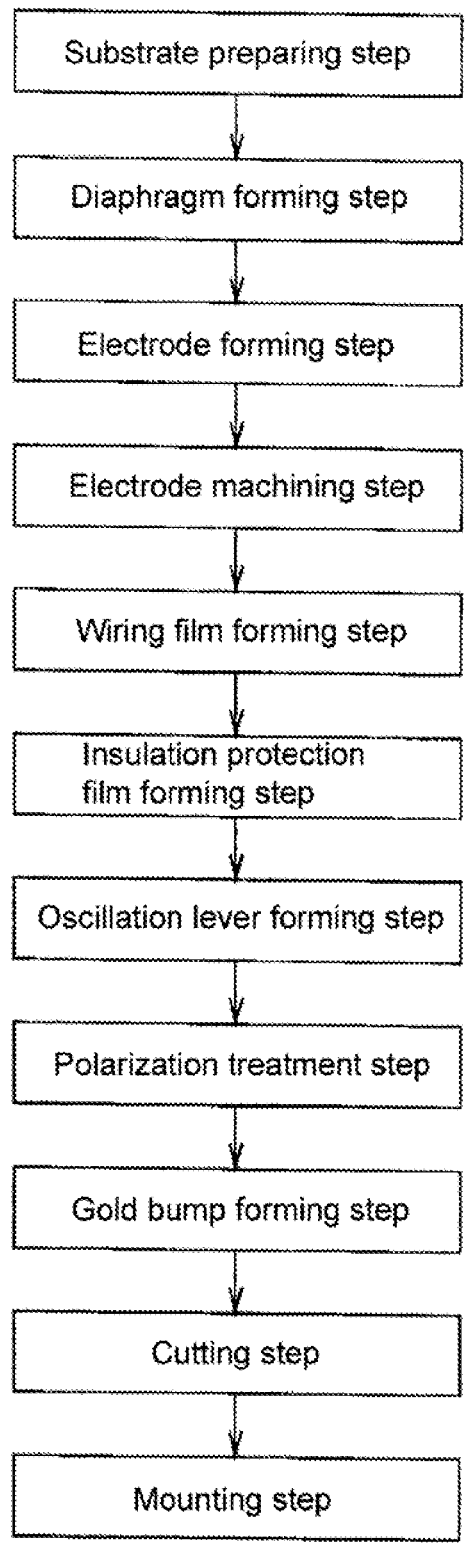
FIG. 4 is a flow chart showing major steps describing a method of manufacturing the piezoelectric device.

Next, a manufacturing example of the piezoelectric device 100 according to this embodiment will be described. FIG. 4 is a flow chart showing major steps describing a manufacturing method of the piezoelectric device 100.

[Substrate Preparation Step]

Figure 5A:
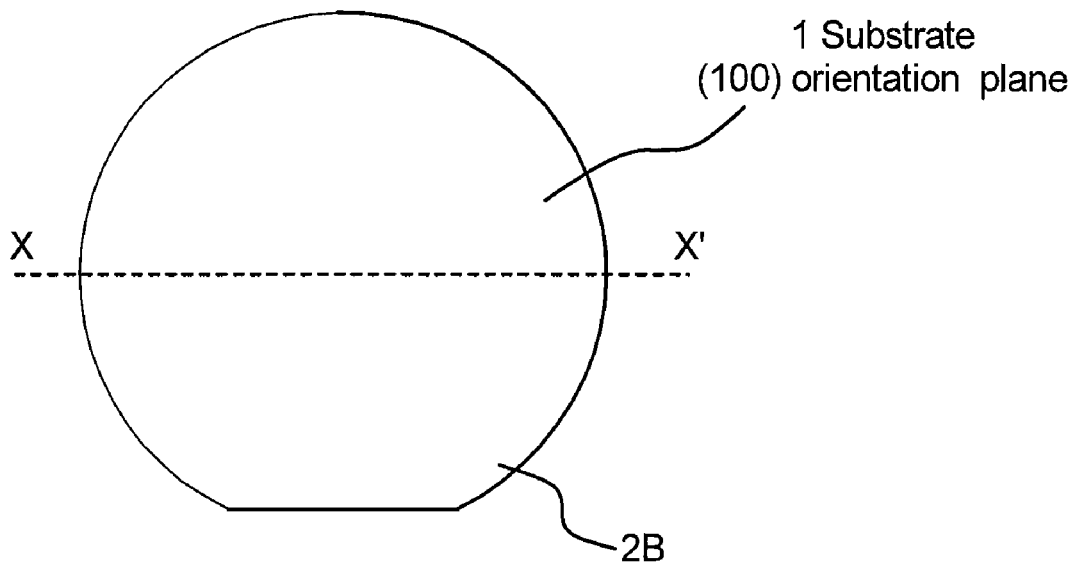
FIG. 5A and FIG. 5B are schematic diagrams describing a step of manufacturing the piezoelectric device.
Figure 5B:
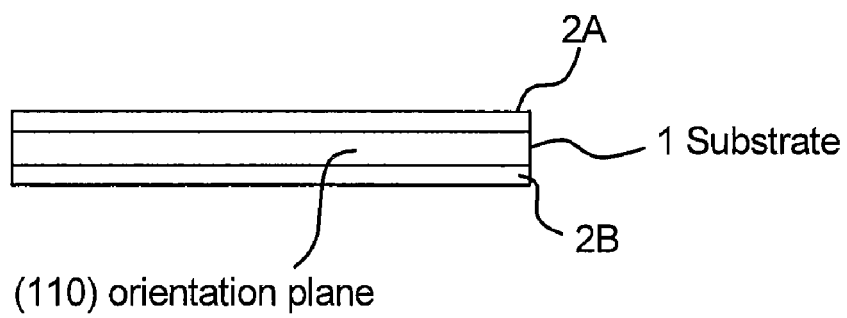

First, an Si substrate 1 as shown in FIG. 5A and FIG. 5B is prepared. The size of the substrate 1 is specified according to the manufacturing line of the prepared thin film process. In this embodiment, a wafer having a diameter of 4 inches is used. Although the thickness of the substrate 1 is decided depending on workability and cost, the thickness of the substrate 1 is necessary to exceed the thickness of the oscillator. In this embodiment, the thickness of the substrate 1 is 300 μm.

Thermally oxidized films ($SiO_2$ films) 2A and 2B as protection masks for anisotropically wet-etching are formed on both surfaces of the Si substrate 1. Although the film thicknesses of the thermally oxidized films 2A and 2B are not specified, in this embodiment the film thicknesses of the thermally oxidized films 2A and 2B are around 0.3 μm. In this embodiment, the Si substrate 1 is of the N type, but not limited thereto. The Si substrate 1 is cut such that the wide surface of the Si substrate 1 shown in FIG. 5A becomes (100) orientation plane and the surface of the Si substrate 1 (the section of the substrate 1) shown in FIG. 5B becomes (110) orientation plane.

[Diaphragm Forming Step]

Figure 6A:
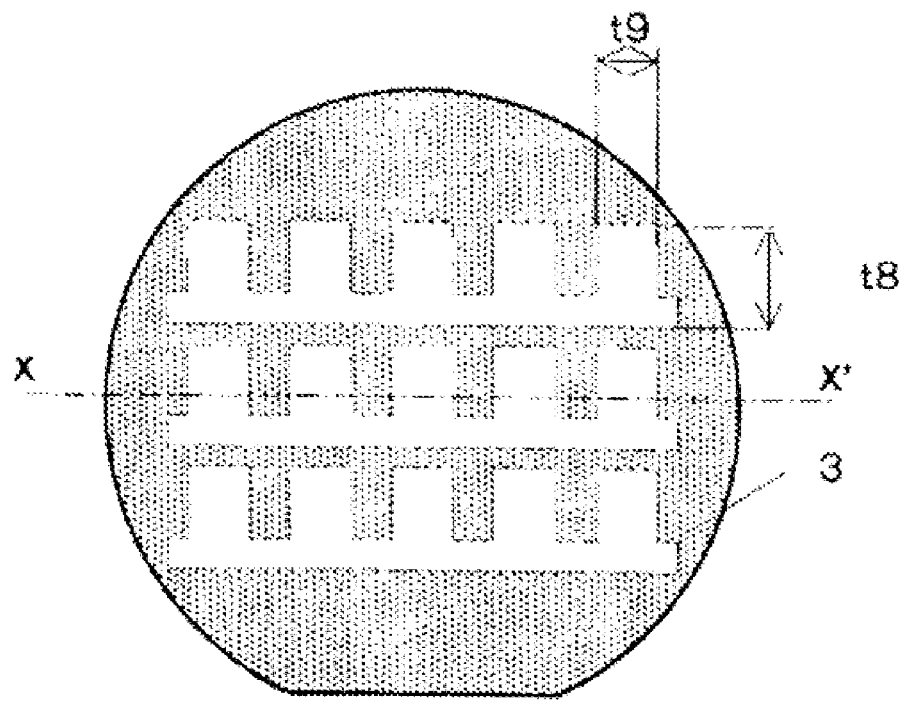
FIG. 6A and FIG. 6B are schematic diagrams showing a state of which a resist pattern film has been formed on the substrate.
Figure 6B:
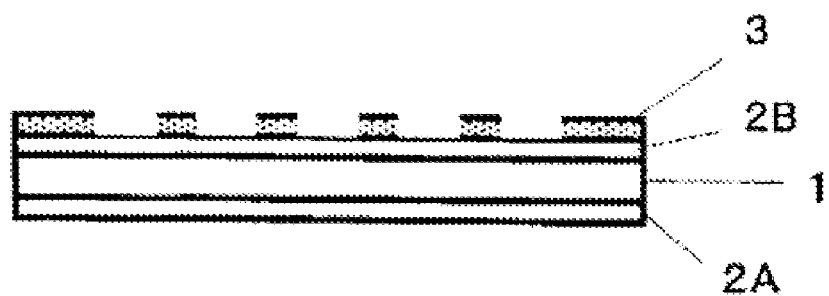

Next, as shown in FIG. 6A and FIG. 6B, a resist pattern film 3 is formed such that a part of the thermally oxidized film 2B on the rear surface of the substrate 1 is removed as an opening portion. The resist pattern film 3 is formed by the photolithography technique used in an ordinary semiconductor thin film forming process. As a resist material, OFPR-8600 made by Tokyo Ohka Kogyo Co., Ltd., is used, but not limited thereto. The photolithography technique is a technique that includes a resist material coating step, a pre-baking step, an exposing step, and a developing step that are used in an ordinary thin film treatment. Their details will be omitted. Although the photolithography technique will be used later, the description of its ordinary steps will be omitted except for their special use.

Each opening portion shown in FIG. 6A becomes one element. The shape of the opening portion is decided by the final lever shape, the thickness of the substrate 1, and the etching width that forms the lever shape (oscillator 110) (the etching width is designated by t7 in FIG. 34 and FIG. 35). The etching width t7 will be described later. In this embodiment, the etching width t7 is 200 μm.

Figure 9:
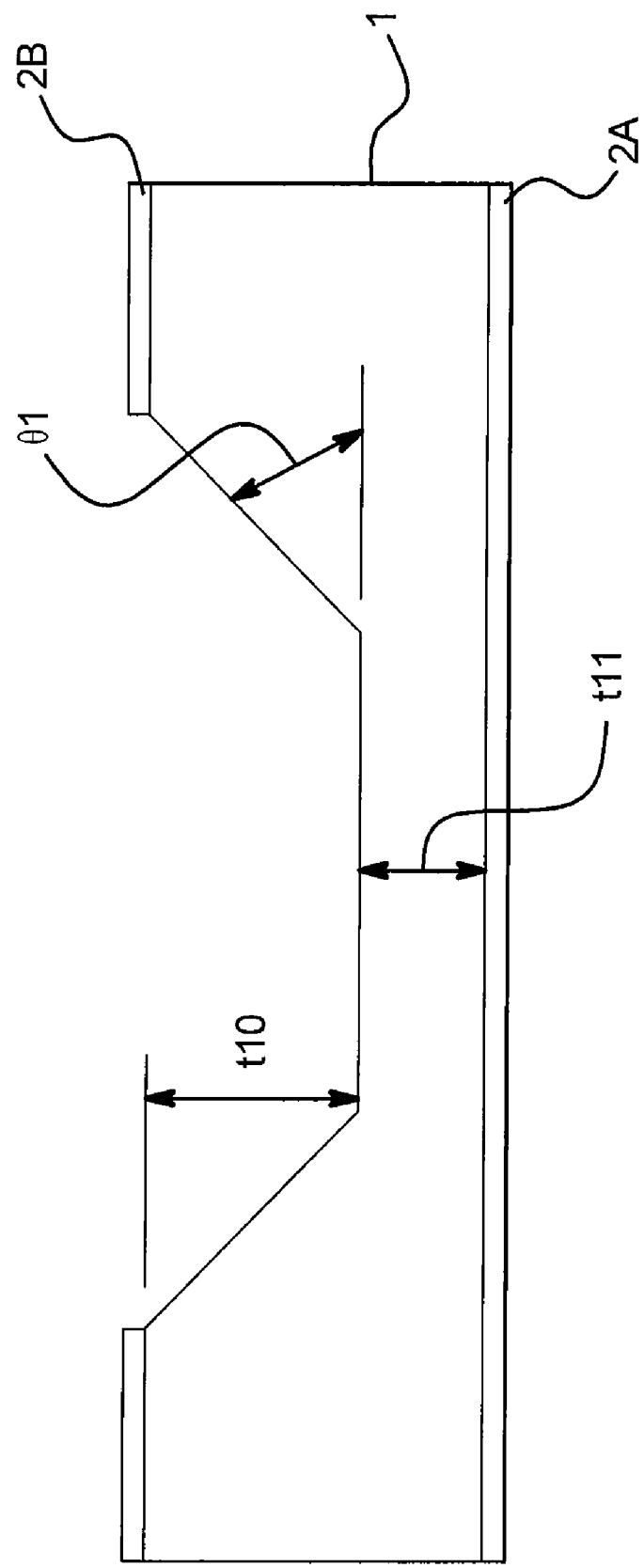
FIG. 9 is an enlarged view showing a W portion of the substrate shown in FIG. 8B.

With respect to the direction of the width of the opening portion (the width of the opening is referred to as the diaphragm width t9), the diaphragm width t9 is necessary to satisfy the oscillation lever width t6+etching width t7×2 (left and right portions). When the thickness of the substrate 1 is 300 μm, the thickness of the oscillation lever is 100 μm, and the substrate 1 whose thickness is 300 μm is ground for a thickness of 100 μm for the oscillation lever with the wet-etching method that follows, the diaphragm depth t10 as shown in FIG. 9 is 200 μm. At this point, the oscillation lever is ground at an angle of θ1=55°. Thus, it is necessary to add width t10×1/tan 55°=140 μm for left and right portions. As a result, the diaphragm width t9 becomes t6+t7×2+140×2=100+200×2+140×2=780 μm. Likewise, the diaphragm length t8 becomes oscillation lever length t5+lever space interval t7+140×2=2500+200+140×2=2980 μm.

Figure 7A:
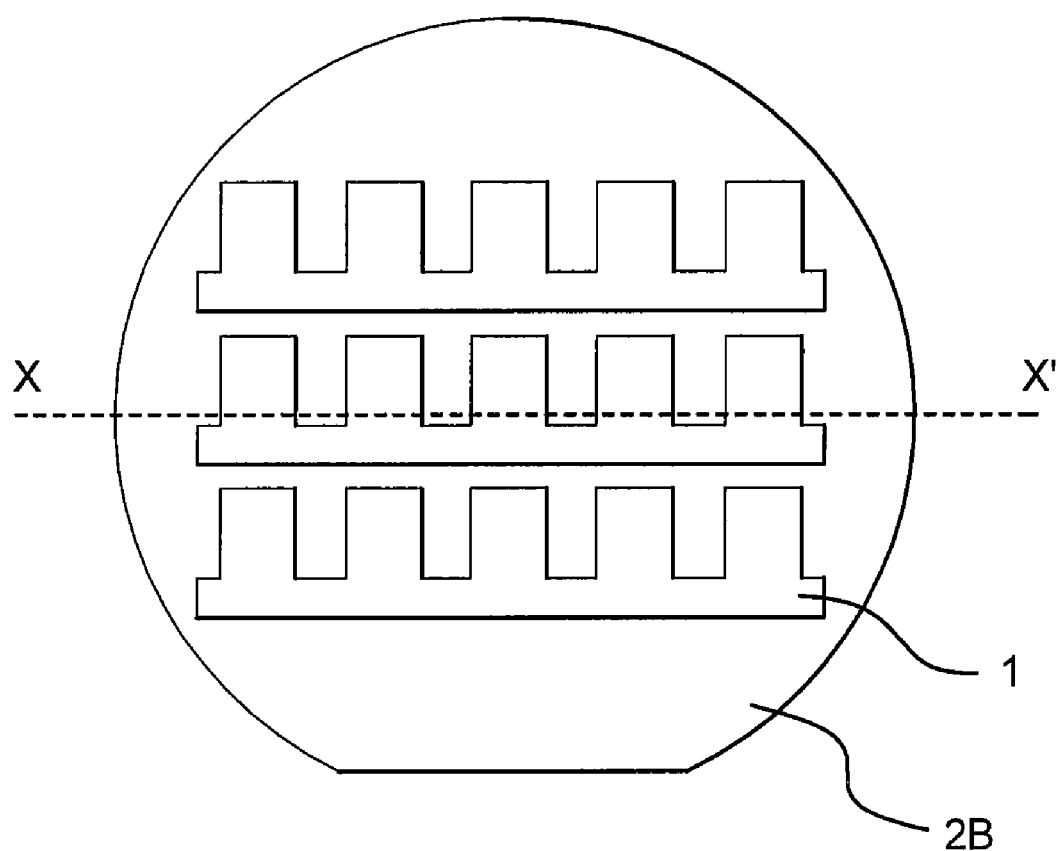
FIG. 7A and FIG. 7B are schematic diagrams showing a state of which a thermally oxidized film has been removed from the substrate.
Figure 7B:
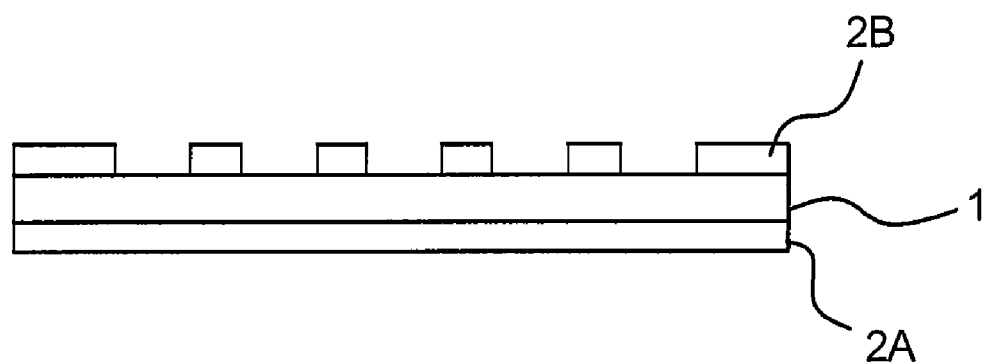

Next, as shown in FIG. 7A and FIG. 7B, the thermally oxidized film 2B corresponding to the opening portions is removed. The thermally oxidized film 2B may be removed either by a physical etching technique such as an ion-etching technique or a wet-etching technique. However, it is preferred to use a wet-etching technique of which only the thermally oxidized film 2B is removed taking into account of the smoothness of the interface of the substrate 1. In this embodiment, as a chemical for the wet-etching technique, ammonium fluoride is used. However, when the substrate 1 is wet etched for a long time, the side surface of the opening portion is largely etched (so-called side-etch results in). Thus, after the opening portion of the thermally oxidized film 2B has been removed, it is necessary to stop the etching treatment.

Figure 8A:
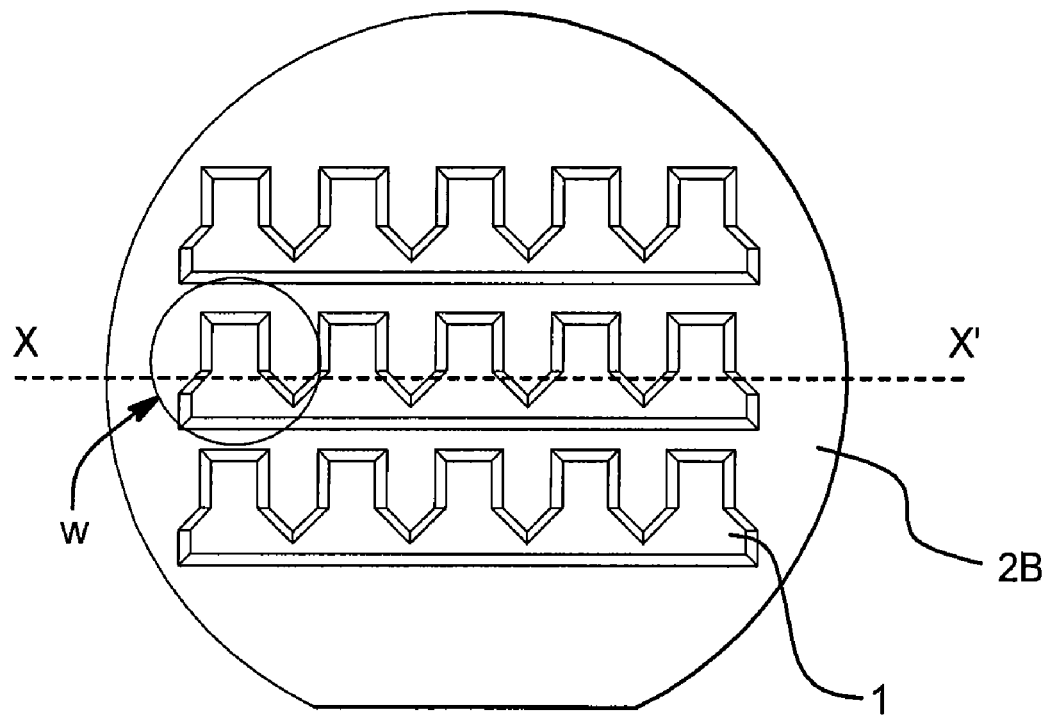
FIG. 8A and FIG. 8B are schematic diagrams showing a state of which the substrate has been anisotropically etched.
Figure 8B:
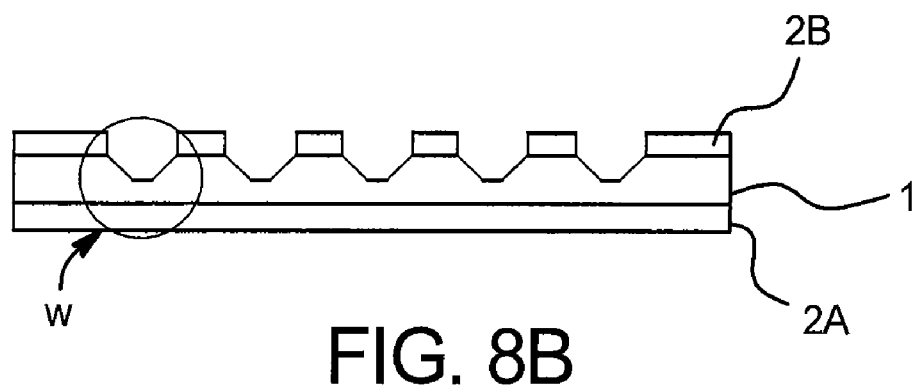

Next, as shown in FIG. 8A, FIG. 8B, and FIG. 9, the substrate 1 in which the opening portions has been exposed is wet-etched such that the thickness of the opening portions becomes the desired oscillation lever thickness t4. In this embodiment, the Si substrate 1 is etched with a 20% solvent of TMAH (tetramethylammonium hydroxide). At this point, while the solution temperature is kept at 80° C., the substrate 1 is immersion-etched.

FIG. 9 is an enlarged view showing a W portion shown in FIG. 8B. In the foregoing conditions, the substrate 1 is etched for around six hours such that the etching amount (diaphragm depth) t10 became 200 μm. As a result, as shown in FIG. 9, the edges of the opening portions of the substrate 1 are formed at a wet-etching angle θ1 (=55°). As a wet-etching chemical, KOH (potassium hydroxide) or EDP (ethylene diamine-pyrochatechol-water) solution may be used besides TMAH. In this embodiment, TMAH that has a higher selective ratio of etching rates of the thermally oxidized films 2A and 2B than the others is used.

In this embodiment, the substrate 1 is ground by the wet-etching technique using characteristics of Si until the thickness of the substrate 1 becomes the thickness of the oscillation lever. However, the grinding method is not limited to such a wet-etching technique, but any grinding method can be used.

In the foregoing method, a diaphragm is formed (left) in the opening portion. The thickness t11 of the diaphragm that has been left by the wet-etching technique finally becomes equal to the thickness t4 of the oscillation lever.

Figure 10A:
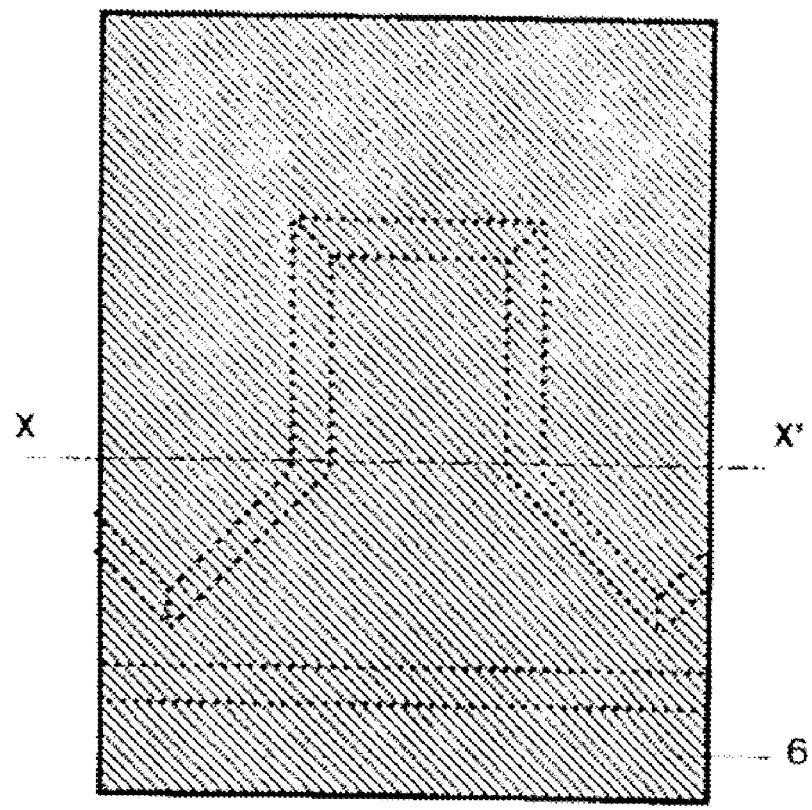
FIG. 10A and FIG. 10B are enlarged schematic diagrams showing a state of the substrate on which a lower layer electrode film, a piezoelectric film, and an upper layer electrode film have been formed.
Figure 10B:
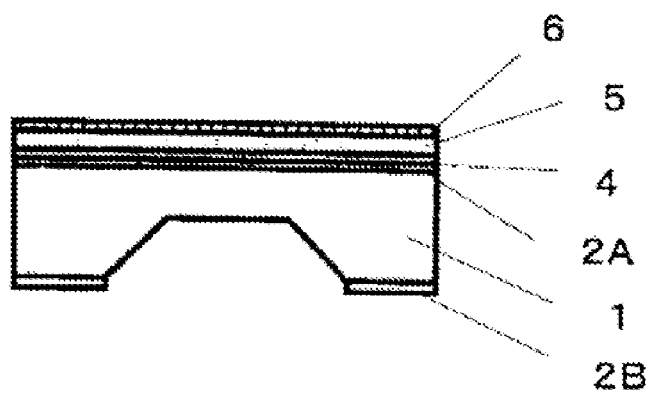

In the following description, one element designated by W in FIG. 8A and FIG. 8B will be described with reference to enlarged views of drawings that follow. For easy understanding of the description of the element, the dimensional ratio of the element illustrated in the following drawings may be different from the dimensional ratio of the real element. As shown in FIG. 10A and FIG. 10B, the element will be described assuming that the opening portion of the diaphragm and the thermally oxidized film 2B face downward.

[Electrode Film Forming Step]

Next, as shown in FIG. 10A and FIG. 10B, a lower layer electrode film 4, a piezoelectric film 5, and an upper electrode film 6 are formed. To improve the characteristics of the piezoelectric film, the lower layer electrode film 4 is a laminate composed of a Ti (titanium) film (film thickness=20 nm) as a base film and a Pt (platinum) film (film thickness=100 nm) formed above the Ti film. Besides Pt, another metal film such as Au, Rh (rhodium), or Re (rhenium) may be used. Besides Ti, another metal such as Ta (tantal) may be used.

In the forming step for the lower layer electrode film 4, a Ti film is formed for 20 nm by a magnetron spatter unit. A Pt film is formed for 100 nm on the Ti film by the magnetron spatter unit. The Ti film and the Pt film are formed by RF (Radio Frequency) powers (high-frequency powers) of 1 kW and 0.5 kW, respectively, at a gas pressure of 0.5 Pa. As a base film of lead zirconium titanate, the Pt film is used. To improve the adhesion of the Pt film, the Ti film is formed.

Next, the piezoelectric film 5 is formed. In the forming step for the piezoelectric film 5, the piezoelectric film 5 is formed for 1.4 μm with $Pb_{1.02}(Zr_{0.53}Ti_{0.47})O_3$ as an oxide target by the magnetron spatter unit at a room temperature in the conditions of which the oxygen gas pressure is 0.2 to 3 Pa and the RF power is 0.1 to 5 kW. The forming method for the piezoelectric film 5 will be described later in detail.

In the forming step for the upper electrode film 6, a Pt film is formed for 200 nm on the front surface of the piezoelectric film 5 formed in the foregoing manner. The Pt film is formed by the magnetron spatter unit in the conditions of which the gas pressure is 0.5 Pa and the RF power is 0.5 kW.

[Piezoelectric Film Forming Method]

In this embodiment, as a method of forming the piezoelectric film 5, a film forming step of forming a piezoelectric thin film that is made of lead zirconium titanate and that has a film thickness smaller than the thickness of the piezoelectric film 5 and a crystallizing thermal treatment (annealing) step of thermally treating the piezoelectric thin film and crystallizing it are repeated several times such that the piezoelectric film 5 having a predetermined thickness is formed. As a result, the piezoelectric film 5 having an equal crystalline orientation in the direction of the thickness of the layer is manufactured.

In the film forming step, unit piezoelectric thin films each of which has a thickness of 200 nm are layered seven times. In the crystallizing thermal treatment step, each unit piezoelectric thin film is heated and crystallized (annealed) for 30 minutes under an oxygen atmosphere at a temperature ranging from 700° C. to 800° C.

In piezoelectric devices of the related art, after a piezoelectric film having a desired piezoelectric characteristic has been formed at a time, it is annealed. However, if a piezoelectric film having a thickness of 1 μm or more is formed at a time, it is difficult to equalize the crystalline orientation of the piezoelectric film in the direction of the thickness of the layer. Thus, in this embodiment, as described above, by layering a plurality of unit crystallized piezoelectric thin films, the piezoelectric film 5 is formed such that the crystalline orientation of the piezoelectric film 5 is improved. As a result, the crystallize orientation of the piezoelectric film 5 is improved. In addition, since the patterning accuracy in a machining step for the piezoelectric film 5 (as a later step) is improved, the yield is improved.

Figures 11A, 11B:
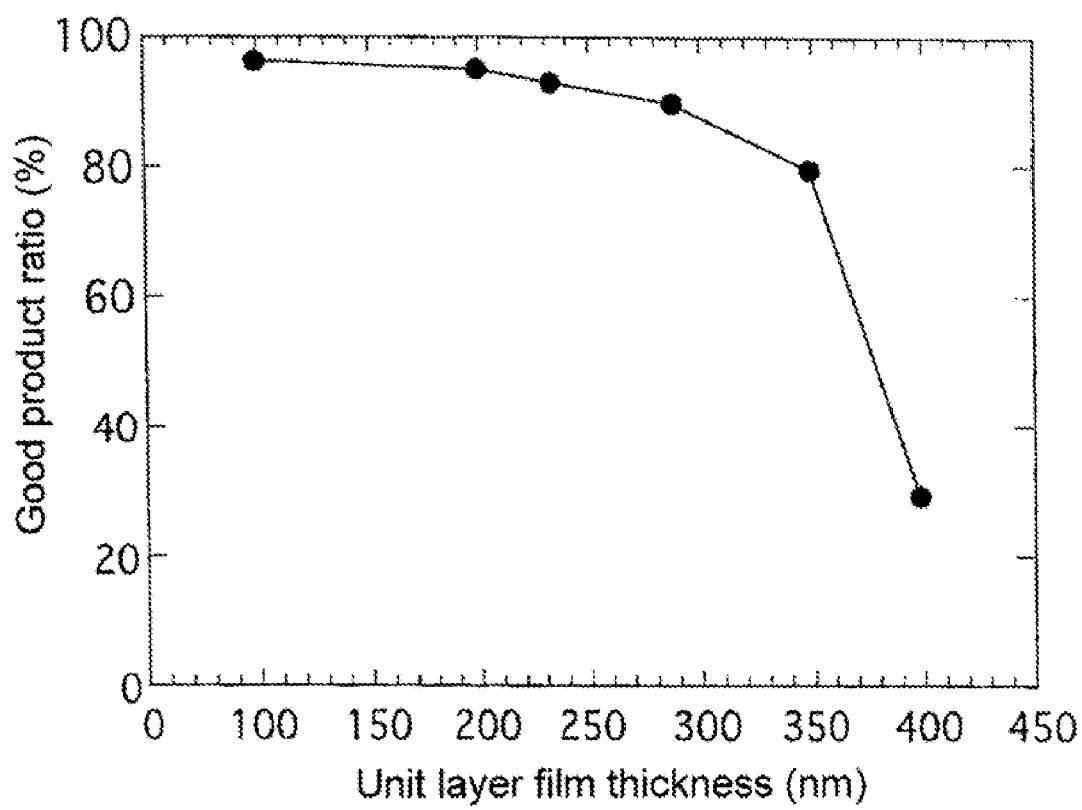
FIG. 11A and FIG. 11B are schematic diagrams showing the relationship between unit layer film thicknesses of a piezoelectric substance thin film that composes the piezoelectric film and good product ratios.

FIG. 11A is a graph showing an experimental result that represents the relationship between the film thicknesses of unit piezoelectric thin films that are changed and the good product ratios (wafer yields) in the case that the total layer thickness of the piezoelectric thin film (lead zirconium titanate) is 1.4 μm. FIG. 11B is a table of FIG. 11A. In this embodiment, the good product ratio is proportional to the piezoelectric characteristic. It is clear from FIG. 11A and FIG. 11B that the smaller the film thickness of each unit piezoelectric thin film is (for example, 100 nm times 14 or 200 nm times 7), the higher the good product ratio is. In addition, it is clear from these drawings, that when the film thickness of each unit piezoelectric thin film exceeds 350 nm (unit piezoelectric thin films are layered four times), the good product ratio sharply decreases. Thus, it is preferred that the film thickness of each unit piezoelectric thin film be 350 nm or less.

The total film thickness of unit piezoelectric thin films is not limited to the foregoing example. In other words, when the film thickness of each unit piezoelectric thin film is 350 nm, if the total film thickness of unit piezoelectric thin films is 1 μm, the number of layers of unit piezoelectric thin films is 3. In this case, if the total film thickness of the unit piezoelectric thin films is 700 nm, the number of layers of unit piezoelectric thin films is 2.

On the other hand, since oxygen loss is likely to occur while the lead zirconium titanate film is being formed, if oxygen is not sufficiently supplied, the insulation of the piezoelectric thin film deteriorates, resulting in not providing a good piezoelectric characteristic. To solve such a problem, in this embodiment, the piezoelectric thin film made of lead zirconium titanate is formed under an oxygen gas atmosphere. As used herein, "an oxygen gas atmosphere" refers to a mixed gas atmosphere of oxygen gas and inert gas (argon, etc.) or a pure oxygen gas atmosphere.

Table 1 shows oscillation amplitudes of oscillators having a piezoelectric film formed by changing a mixture ratio of oxygen and argon in film forming conditions of lead zirconium titanate. Table 1 shows that the larger the amplitude is, the better the piezoelectric characteristic is. In this example, an oscillator having an amplitude of 35 μm or more is treated as a sample having a good product ratio. Generally, the larger the mass or amplitude of the oscillator is, the higher the detection sensitivity of the Coriolis force is. In the piezoelectric device 100 having the foregoing element shape or element dimensions in this embodiment, since there is a limit of increasing the mass of the oscillator, the predetermined detection sensitivity is obtained by increasing the amplitude of the oscillator. In this example, the lower limit at which the predetermined detection sensitivity is obtained is 35 μm.

TABLE 1

| Film forming condition | Amplitude (μm) |
| --- | --- |
| Oxygen 100% film forming | 52 |
| Oxygen 95% and argon 5% film forming | 50 |
| Oxygen 90% and argon 10% film forming | 50 |
| Ar/oxygen 50% film forming | 35 |
| Ar/oxygen 15% film forming | 15 |

Thus, a piezoelectric device having a desired oscillation characteristic can be manufactured when a partial pressure of oxygen gas is 50% or higher. In particular, the higher the partial pressure of oxygen gas is, the better the oscillation characteristic is.

When a piezoelectric thin film is formed under a 100% oxygen gas atmosphere, the content of Pb as a target is important. It is clear from Table 2 that when the amount of Pb is 1.01 against the amount of Zr/Ti, the piezoelectric film that has been formed is not a perovskite layer that represents a piezoelectric characteristic, but a pyrochlore layer that deteriorates the piezoelectric characteristic.

TABLE 2

| Content of Pb | Presence/absence of pyrochlore layer |
| --- | --- |
| 1.1 | Absence |
| 1.02 | Absence |
| 1.01 | Presence |
| 1 | Presence |

In addition, as shown in Table 3, when a target containing excessive Pb whose amount is 1.2 or more against the amount of Zr/Ti is used, the dielectric loss that represents insulation increases because the film structure of lead zirconium titanate becomes sparse.

TABLE 3

| Content of Pb | Dielectric loss |
| --- | --- |
| 1.3 | 0.25 |
| 1.2 | 0.2 |
| 1.1 | 0.1 |
| 1 | 0.09 |

Figure 12:
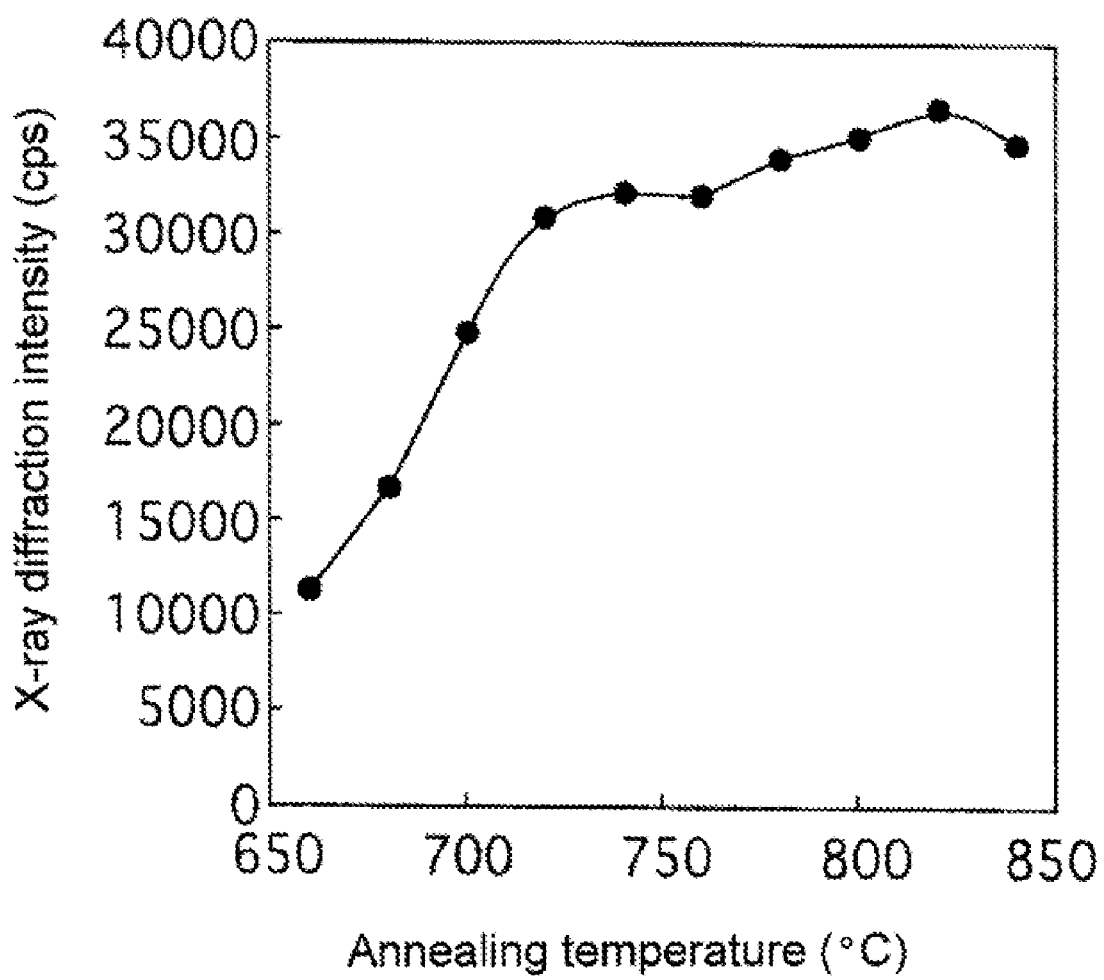
FIG. 12 is a graph showing the relationship between annealing temperatures of the piezoelectric film and X ray diffraction intensities.

FIG. 12 is a graph showing a measurement result that represents the relationship between the X ray diffraction intensities of the (111) orientation plane of the perovskite layer of the piezoelectric thin films (lead zirconium titanate) and their annealing temperatures that has been changed. The X ray diffraction intensity represents a peak intensity of an X ray diffraction pattern. At an annealing temperature of around 700° C., the diffraction intensity does not largely vary. This means that when the annealing temperature is 700° C. or higher, crystallization of the piezoelectric thin film is nearly saturated. At an annealing temperatures of 750° C. or higher, the diffraction intensity increases again. This means that since the Pt layer (lower layer electrode film) as a base layer has been progressively crystallized, it influences the crystallization of the piezoelectric thin film.

Figure 13:
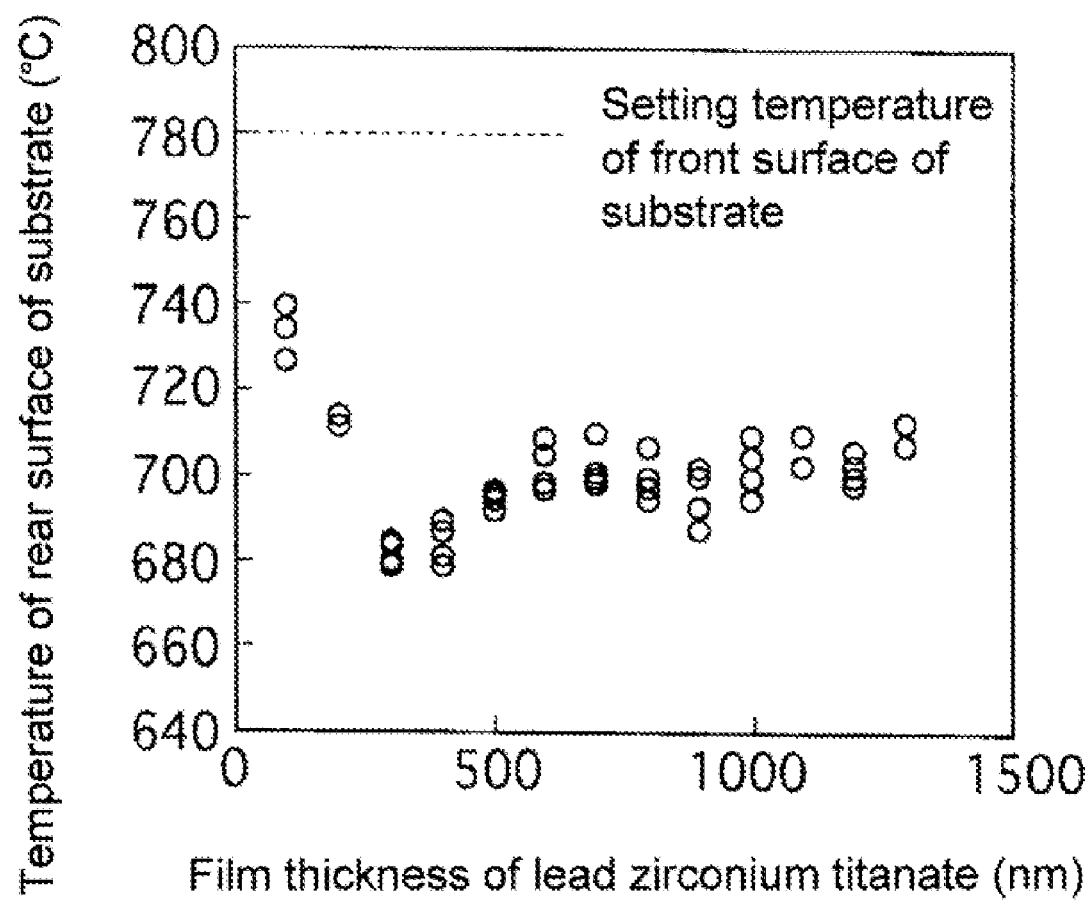
FIG. 13 is a schematic diagram showing the relationship between film thicknesses of the piezoelectric film and rear surface temperatures of the substrate.

FIG. 13 shows the relationship between the film thicknesses of the piezoelectric thin film and the temperatures of the rear surface of the substrate that is crystallized and annealed. In FIG. 13, a dotted line represents a setting value (780° C.) of a temperature controlling thermocouple on the front surface of the substrate. The temperature of the rear surface of the substrate depends on the film thickness of lead zirconium titanate on the front surface of the substrate. This is because the color, namely the absorption index of infrared ray, of lead zirconium titanate on the front surface of the substrate changes corresponding to the film thickness thereof. Thus, when the thicknesses of the piezoelectric films are different, their annealing temperatures are different. To solve this problem, in this embodiment, when the crystallization annealing treatment is performed, the annealing temperature is controlled corresponding to the temperature on the rear surface of the substrate.

Figure 14:
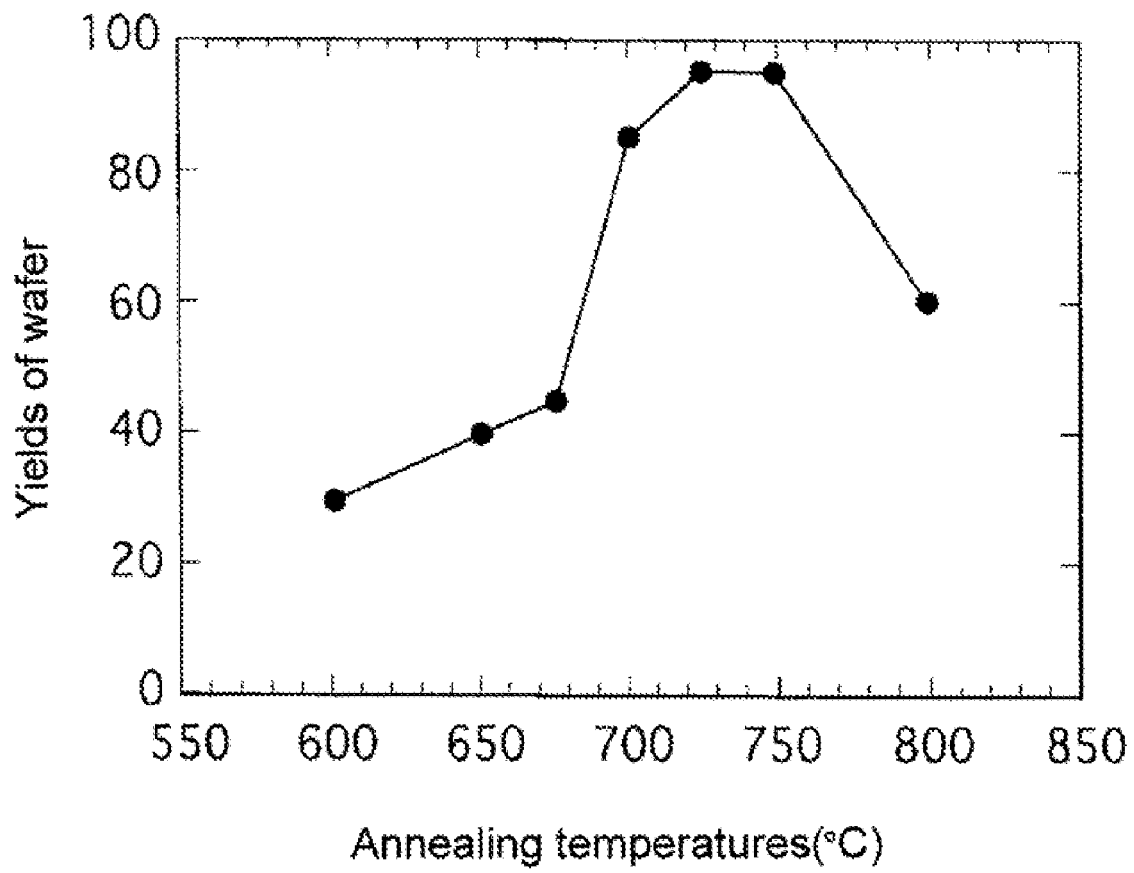
FIG. 14 is a schematic diagram showing the relationship between annealing temperatures of the piezoelectric film and the yields of the piezoelectric film.

FIG. 14 shows the relationship between the good product ratios (wafer yields) and the annealing temperatures. As used herein, the term "good product ratio" refers to the ratio of elements having a predetermined piezoelectric characteristic in a plurality of elements manufactured from one wafer. It is clear from FIG. 14 that the good product ratio is low when the annealing temperature is 700° C. or lower. It appears that since lead zirconium titanate is not sufficiently crystallized at an annealing temperature of 700° C. or below, its piezoelectric characteristic deteriorates. In addition, the good product ratio is also low at an annealing temperature of around 800° C. It may appear that the pyrochlore phase deposits. In addition, it may appear that the etch residue of piezoelectric film deteriorates the good product ratio. It is clear from FIG. 14 that the optimum range of the annealing temperature is from 700° C. to 800° C., preferably from 700° C. to 750° C., more preferably from 725° C. to 750° C.

As described above, it is preferred that the annealing temperature of lead zirconium titanate be in the range from 700° C. to 800° C. In addition, it is preferred that the annealing treatment for lead zirconium titanate be performed under an oxygen gas atmosphere.

[Electrode Film Machining Treatment]

Figure 15A:
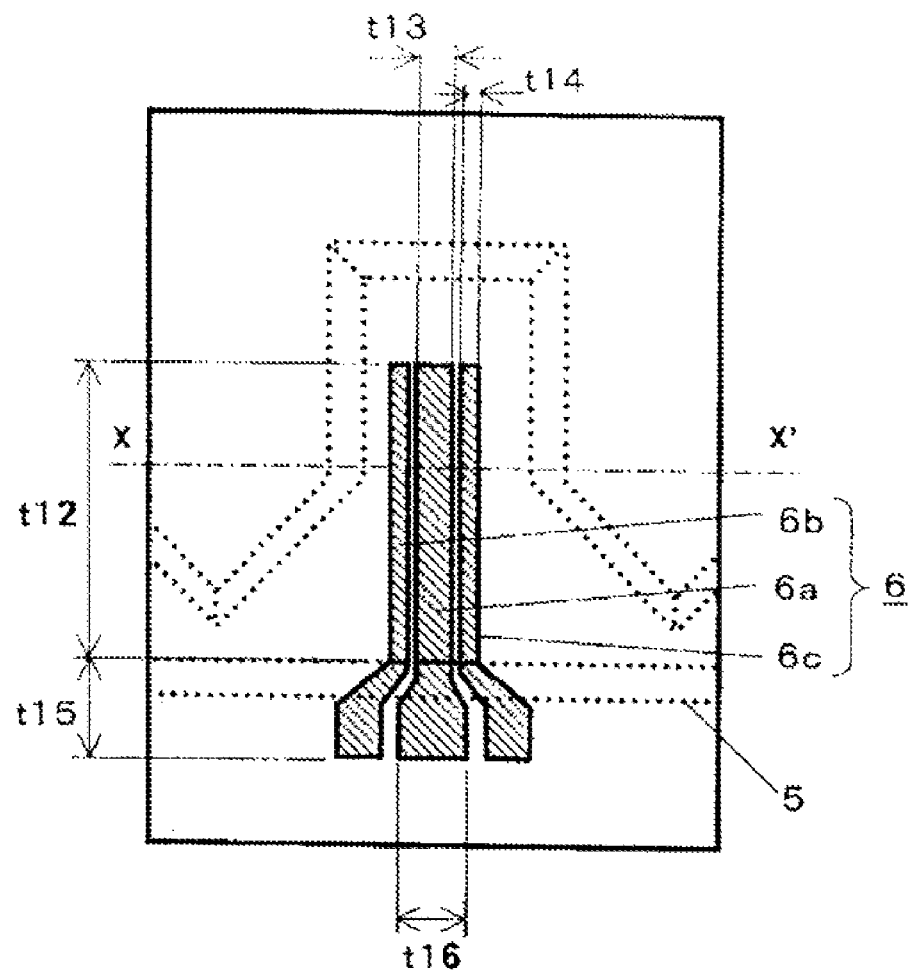
FIG. 15A and FIG. 15B are enlarged schematic diagrams showing a state of the substrate on which a drive electrode and detection electrodes have been formed.
Figure 15B:
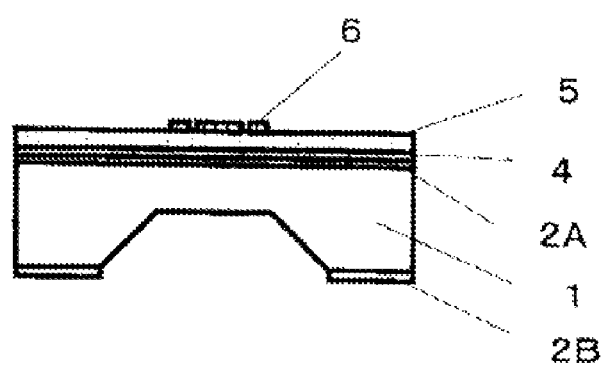

Next, as shown in FIG. 15A and FIG. 15B, the formed upper electrode film 6 is machined in a predetermined shape. As shown in FIG. 15A, the upper electrode film 6 is divided into three portions. The center portion of these portions is the drive electrode 6a that generates a motion that moves the oscillation lever. The left and right portions around the center portion are the detection electrodes 6b and 6c that detect the Coriolis force. The center in the direction of the width of the drive electrode 6a matches the center of the oscillation lever. The left and right detection electrodes are symmetrically formed. Formed at an end portion of the linear portion of the upper electrode film 6 are wiring connection portions 106a, 106b, and 106c. In the later steps, a portion formed below the upper electrode film 6 becomes an arm portion 1a of the substrate 1 (see FIG. 37).

In this embodiment, the width t13 of the drive electrode is 50 μm. The width t14 of the detection electrodes is 10 μm. The length t12 of the upper electrode is 2 mm. The distance between the drive electrode 6a and each of the detection electrodes 6b and 6c is 5 μm, but not limited thereto. However, they are necessary not to exceed the size of the oscillation lever. As the shape of a connection portion of the wiring pattern (described later), in this embodiment, the width t16 of the connection portion is 50 μm and the length t15 of the connection portion is 50 μm, but not limited thereto.

The upper electrode film 6 is machined by the photolithography technique in such a manner that after a predetermined resist pattern film is formed, etch reside of the upper electrode film 6 is removed by the ion-etching technique. The machining method for the upper electrode film 6 is not limited to these techniques.

Figure 16A:
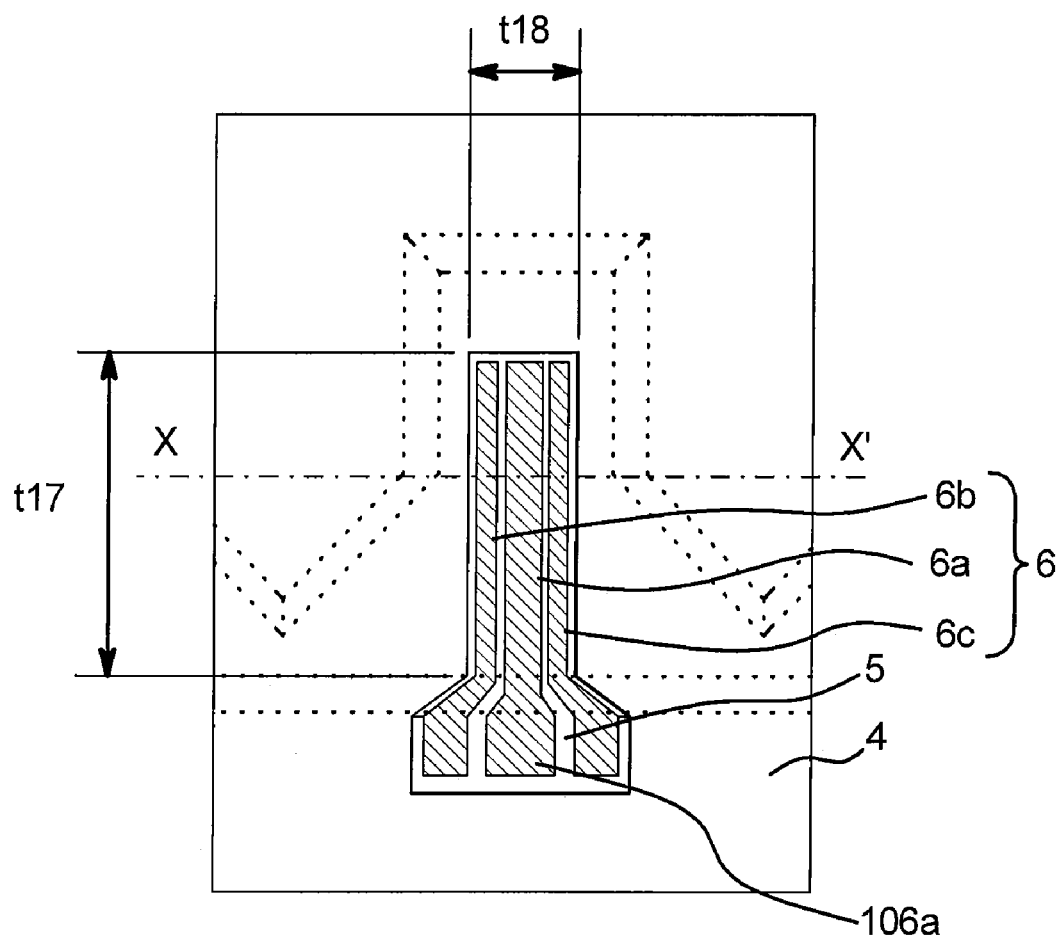
FIG. 16A and FIG. 16B are enlarged schematic diagrams showing a state of the substrate on which a piezoelectric film has been formed.
Figure 16B:
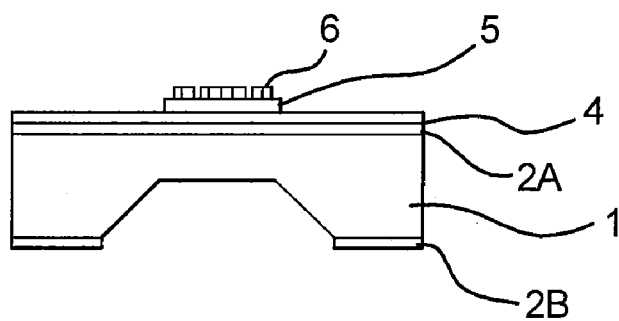

Next, as shown in FIG. 16A and FIG. 16B, the piezoelectric film 5 is machined in a predetermined shape. The piezoelectric film 5 can be machined in any shape as long as the piezoelectric film 5 covers the upper electrode film 6. In this embodiment, the length t17 of the piezoelectric film is 2.2 mm and the width t18 of the piezoelectric film is 90 μm. At this point, the center of the piezoelectric film width is matched with the center of the oscillation lever. The width t18 of the piezoelectric film is necessary to be equal to or smaller than the width t4 of the oscillation lever. The piezoelectric film 5 is machined with a margin of a width of 5 μm to the outer periphery of the upper electrode film 6. The width of the piezoelectric film 5 can be freely specified corresponding to the size of the entire element.

Figure 17:
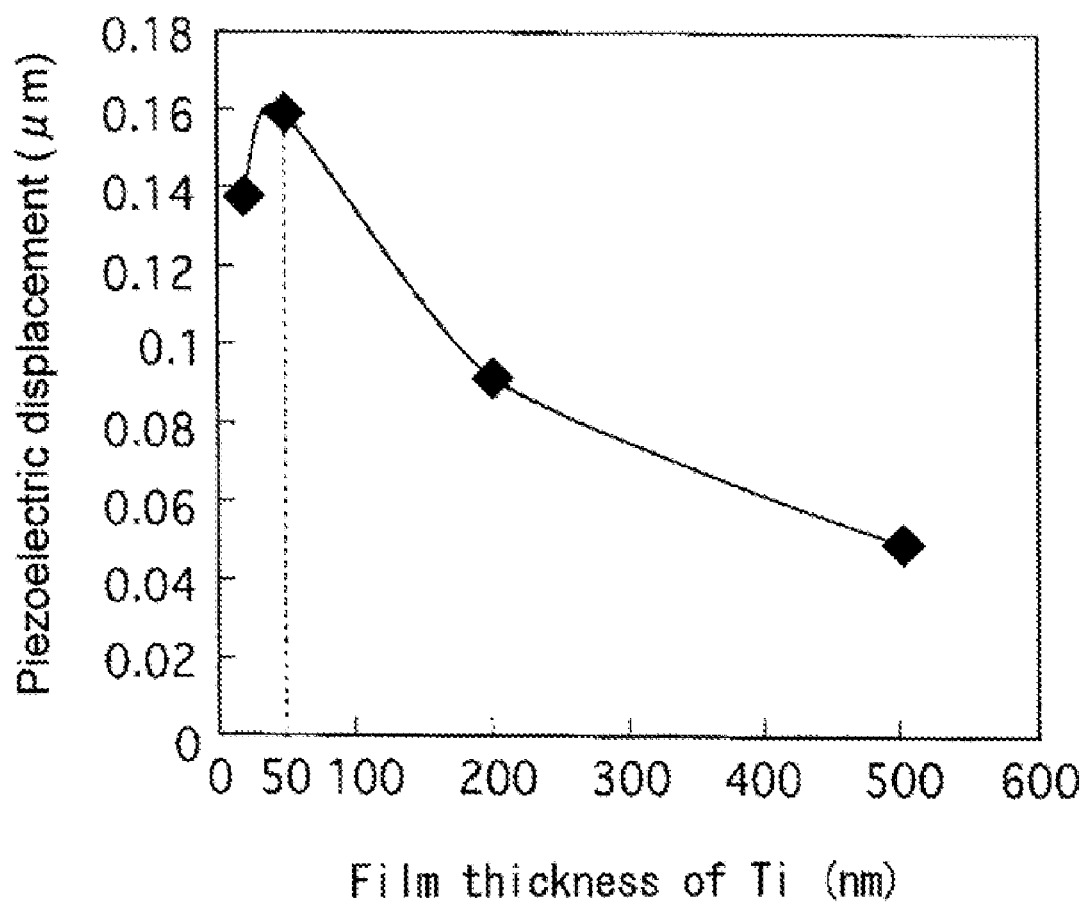
FIG. 17 is a graph showing the relationship between film thicknesses of a Ti layer and piezoelectric displacement amounts.

In this embodiment, as a base film (lower layer electrode film) of lead zirconium titanate, a Pt film is used. To improve adhesion of the Pt film and the silicon substrate, a Ti film is formed. FIG. 17 shows an aging test result of a piezoelectric device using a clean oven at 260° C. (for 10 minutes). The test result shows that the smaller the Ti film thickness is, the smaller the variations of the piezoelectric displacement before and after the aging test are. Thus, the piezoelectric device is not sensitive against environmental temperature changes. As a result, a piezoelectric device having high reliability at high temperatures can be manufactured.

Figure 18:
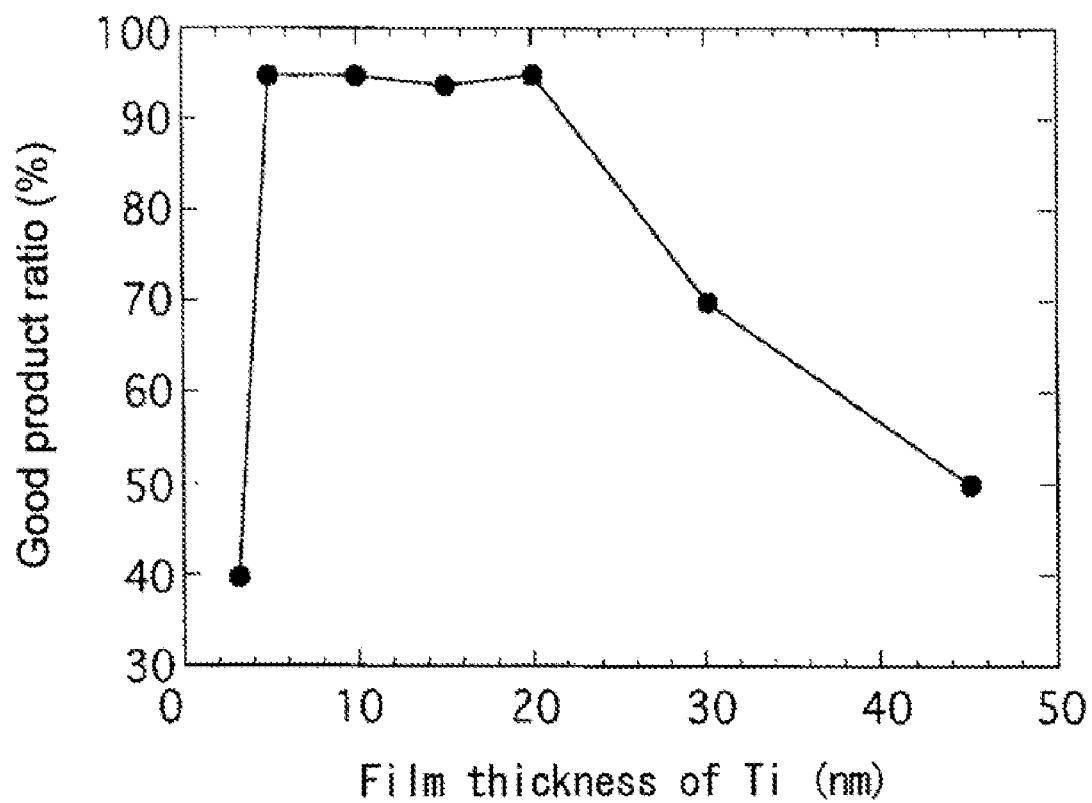
FIG. 18 is a graph showing the relationship between the film thicknesses of the Ti layer and the good product ratios thereof.

FIG. 17 shows the relationship between the film thicknesses of the Ti film and variations of the piezoelectric displacement. As shown in FIG. 17, when the film thickness of the Ti layer exceeds 50 nm, the piezoelectric displacement sharply decreases. FIG. 18 shows the relationship between the film thicknesses of the Ti layer and the good product ratios (yields of the wafer). FIG. 18 shows that when the film thickness of the Ti layer is in the range from 5 nm to 20 nm, a high good product ratio can be obtained. Thus, when the Ti layer having a film thickness in the foregoing range is formed, since the crystallization orientation of the piezoelectric film is improved, the pattern can be etched with high accuracy.

In contrast, the reason why the yield decreases when the film thickness of the Ti layer is smaller than 5 nm or larger than 20 nm is based on the fact that since the crystallization orientation characteristic of the piezoelectric film decreases, the Zr component of lead zirconium titanate is not etched, but left. As a result, when the lower layer electrode film is etched, since the etch residue of the Zr component functions as a cover agent (mask), the electrode pattern is not formed in the desired shape, resulting in causing a shortcircuit to occur between electrodes.

In this embodiment, as a machining method of the piezoelectric film 5, after the resist pattern film is formed in the shape of the piezoelectric device by the photolithography technology, the resist pattern film is removed by the wet-etching technique with fluoronitric acid solution. However, the resist pattern film may be removed by any technique. For example, the resist pattern film may be removed by a physical ion-etching technique or a chemical RIE (Reactive Ion-etching) technique.

Figure 19A:
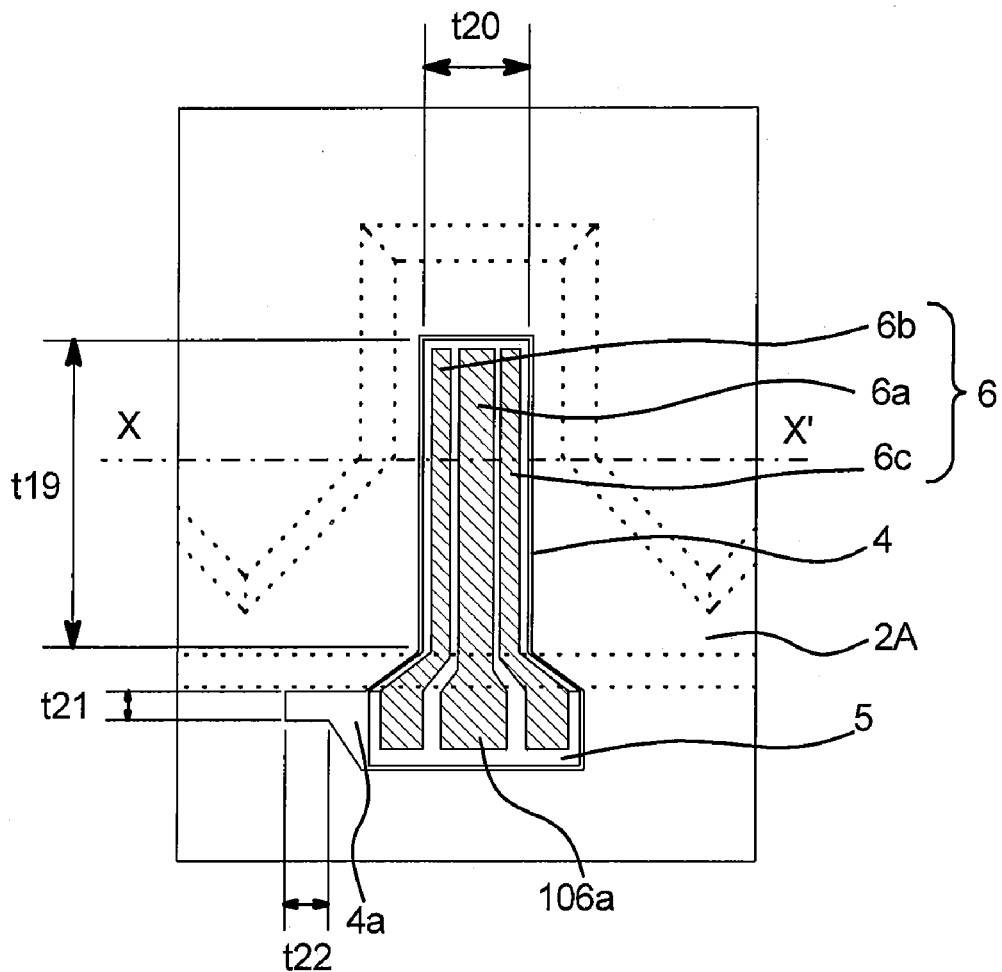
FIG. 19A and FIG. 19B are enlarged schematic diagrams showing a state of the substrate on which a lower layer electrode film has been formed.
Figure 19B:
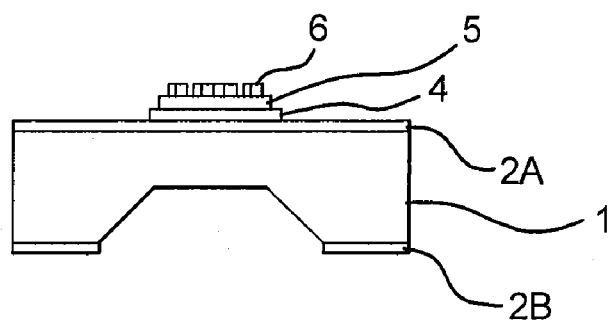

Next, as shown in FIG. 19A and FIG. 19B, the lower layer electrode film 4 is machined in a predetermined shape. The lower layer electrode film 4 can be machined in any shape as long as the lower layer electrode film 4 covers the piezoelectric film 5. In this embodiment, the length t19 of the lower layer electrode is 2.3 mm and the width t20 of the lower electrode is 94 µm. In this embodiment, the center of the lower layer electrode is matched with the center of the oscillation lever. The width t20 of the lower layer electrode is necessary to be equal to or smaller than the width t4 of the oscillation lever. In addition, the lower layer electrode film 4 is machined with a margin of a width of 5 µm to the outer circumference of the piezoelectric film 5. The width of the lower layer electrode film 4 can be freely specified corresponding to the size of the entire element. To electrically connect the lower layer electrode film 4 to the outside, as shown in FIG. 19A, a lower layer electrode connection portion 4A is formed. The lower layer electrode connection portion 4A is necessary to have an area for the wiring pattern. In this embodiment, the length t21 of the lower layer electrode connection portion is 200 µm and the width t22 of the lower layer electrode connection portion is 100 µm.

As a machining method of the lower layer electrode film 4, after the resist pattern film is formed in the shape of the lower layer electrode by the photolithography technique, an unnecessary portion of the resist pattern film is removed by the ion-etching technique. The lower layer electrode film 4 may be machined in any technique, not limited to the ion-etching technique.

[Wiring Film Forming Step]

Figure 20:
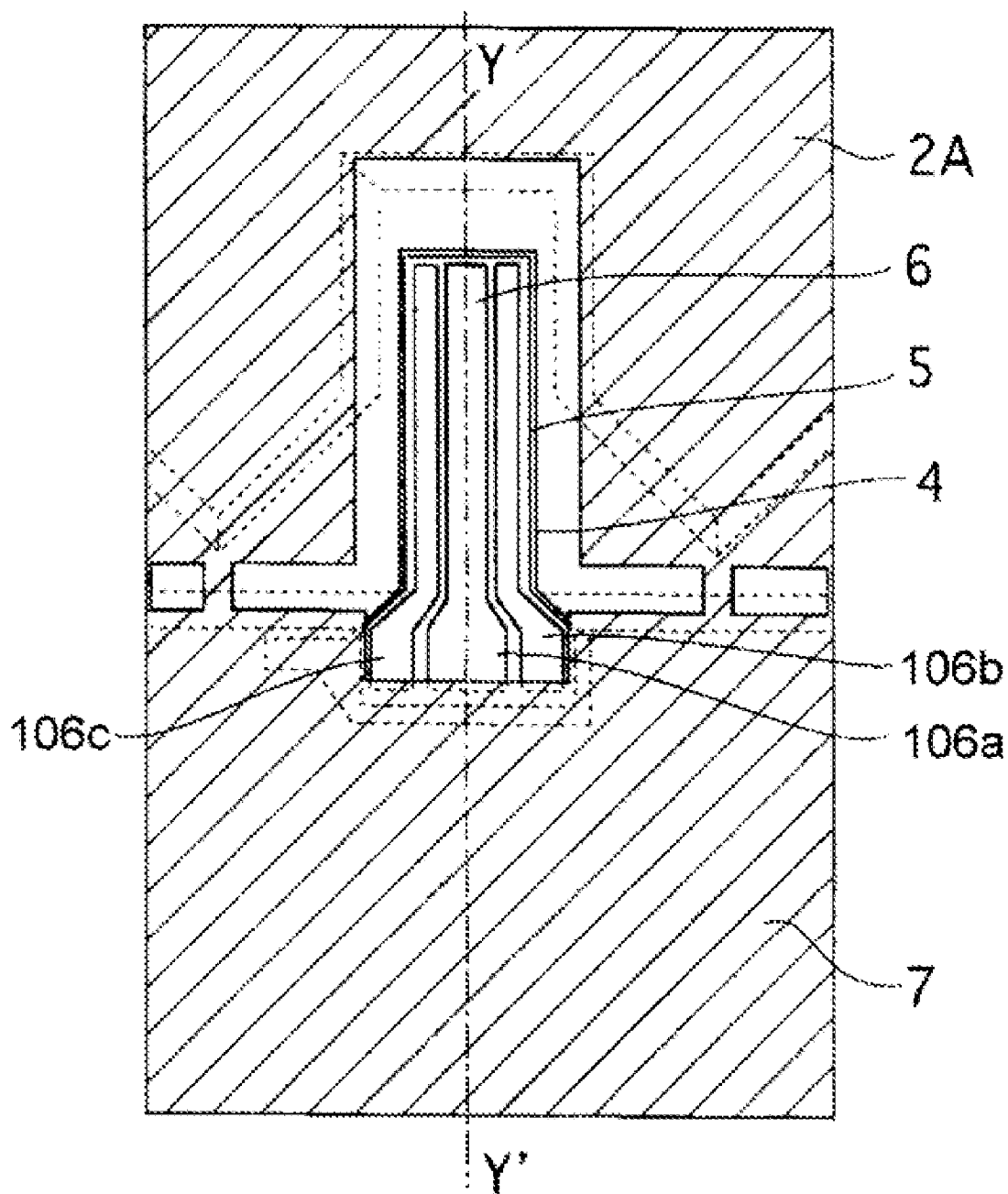
FIG. 20 is an enlarged plan view showing a state of the substrate on which a wiring base film has been formed.
Figure 21:
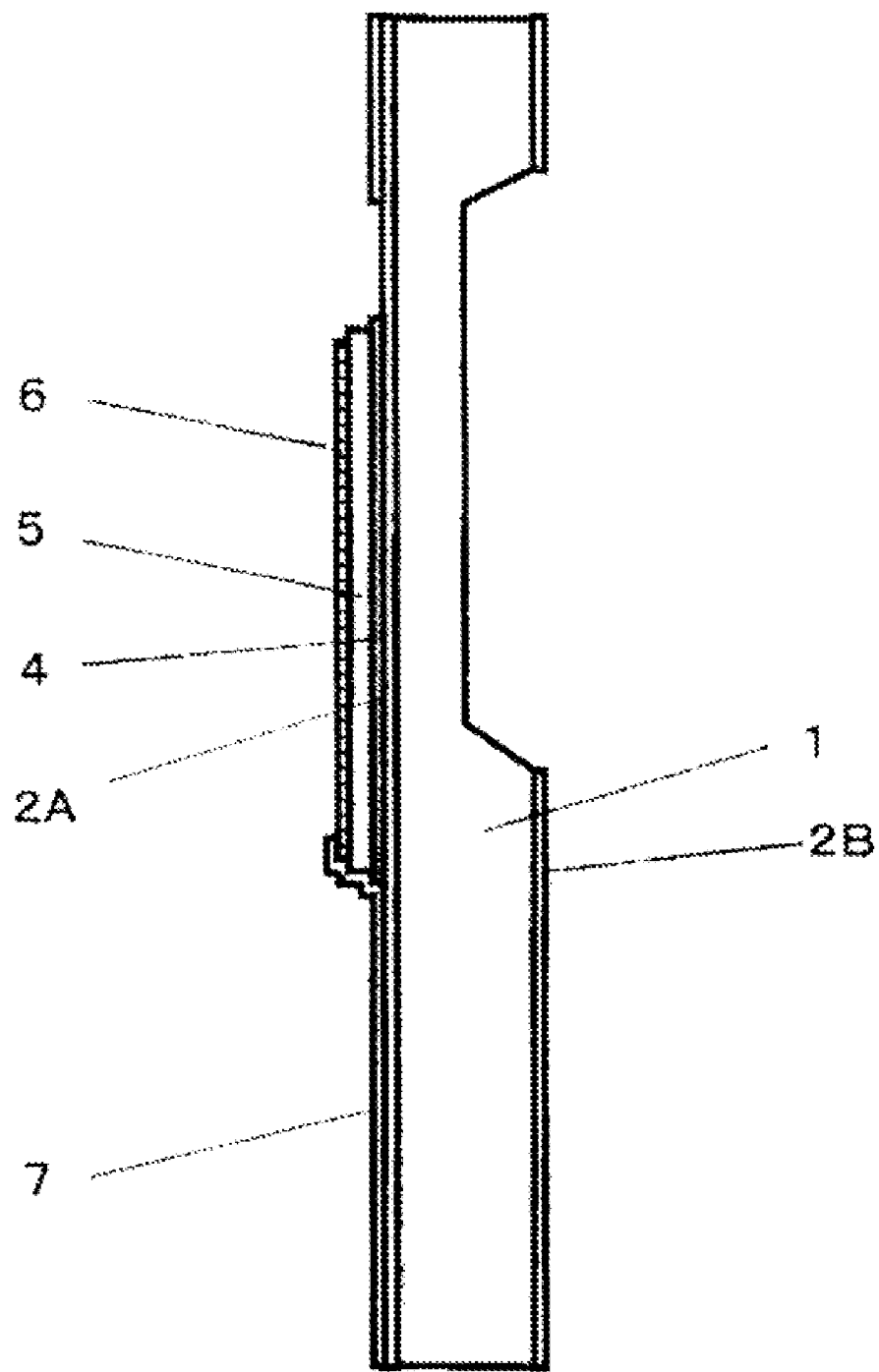
FIG. 21 is a sectional view taken along line Y-Y' of FIG. 20.

Next, as shown in FIG. 20 and FIG. 21, a wiring base film 7 is formed to secure adhesion of a wiring film 9 as will be described later. The wiring base film 7 is made of an insulation material. The wiring base film 7 can be formed in any shape as long as it is not formed on the oscillator, the electrode connection portions 106a, 106b, and 106c, and the etch area around the oscillator. In this embodiment, to secure adhesion of the electrode film, the upper electrode film 6 and the lower layer electrode film 4 have a margin of 5 µm wide to the wiring base film 7.

As a forming method of the wiring base film 7, after a resist pattern film is formed in a desired shape having an opening portion by the photolithography technique, the wiring base film 7 is formed by the spattering technique. A spattered film that has adhered to the unnecessary portion is removed together with the resist pattern film by a so-called lift-off technique. As a material of the wiring base film 7, alumina is used and deposited for 75 nm. The material of the wiring base film 7 and the forming method thereof are not limited to the foregoing material and technique.

Figure 22:
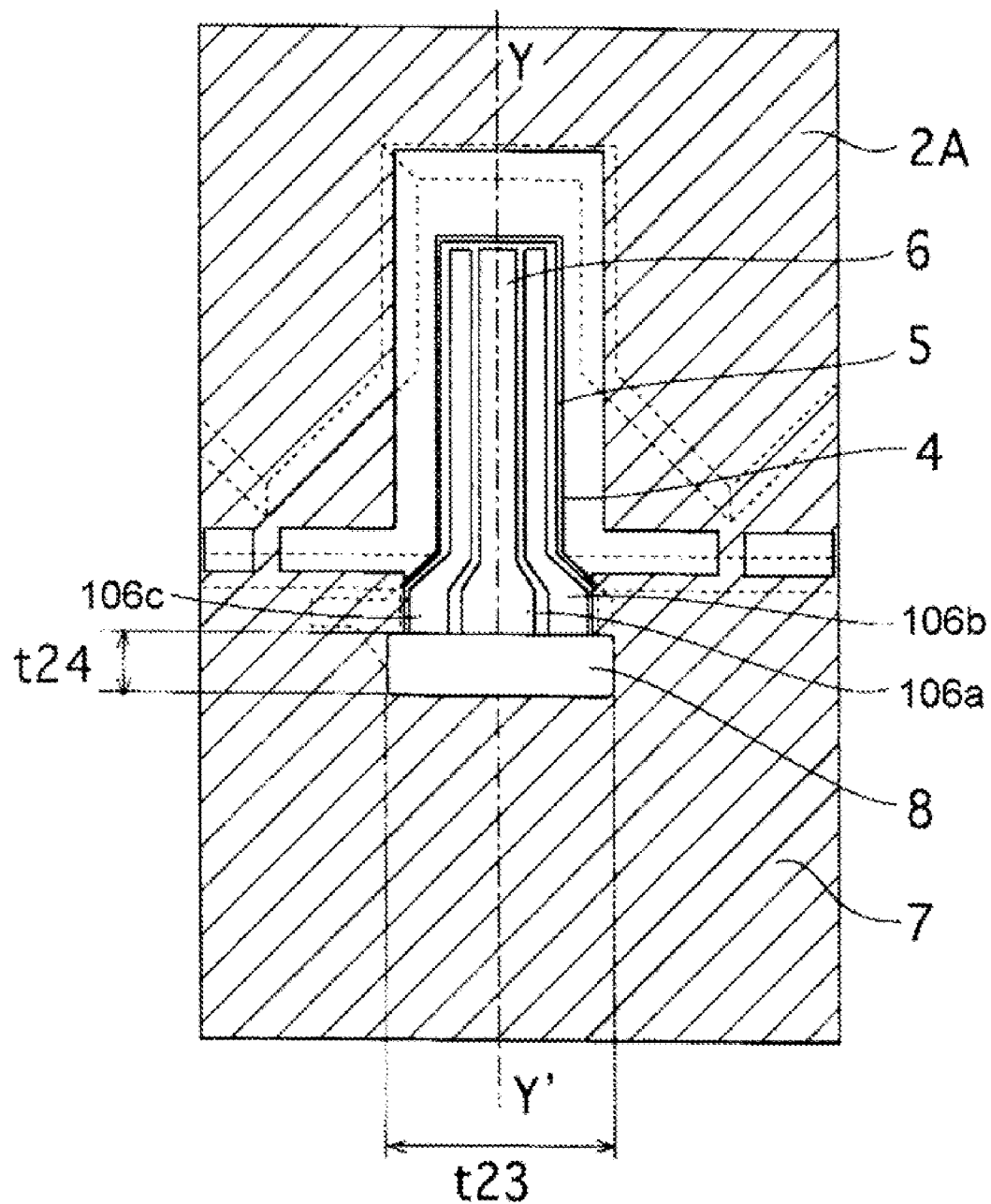
FIG. 22 is an enlarged plan view showing a state of the substrate on which a planarized resist film has been formed.
Figure 23:
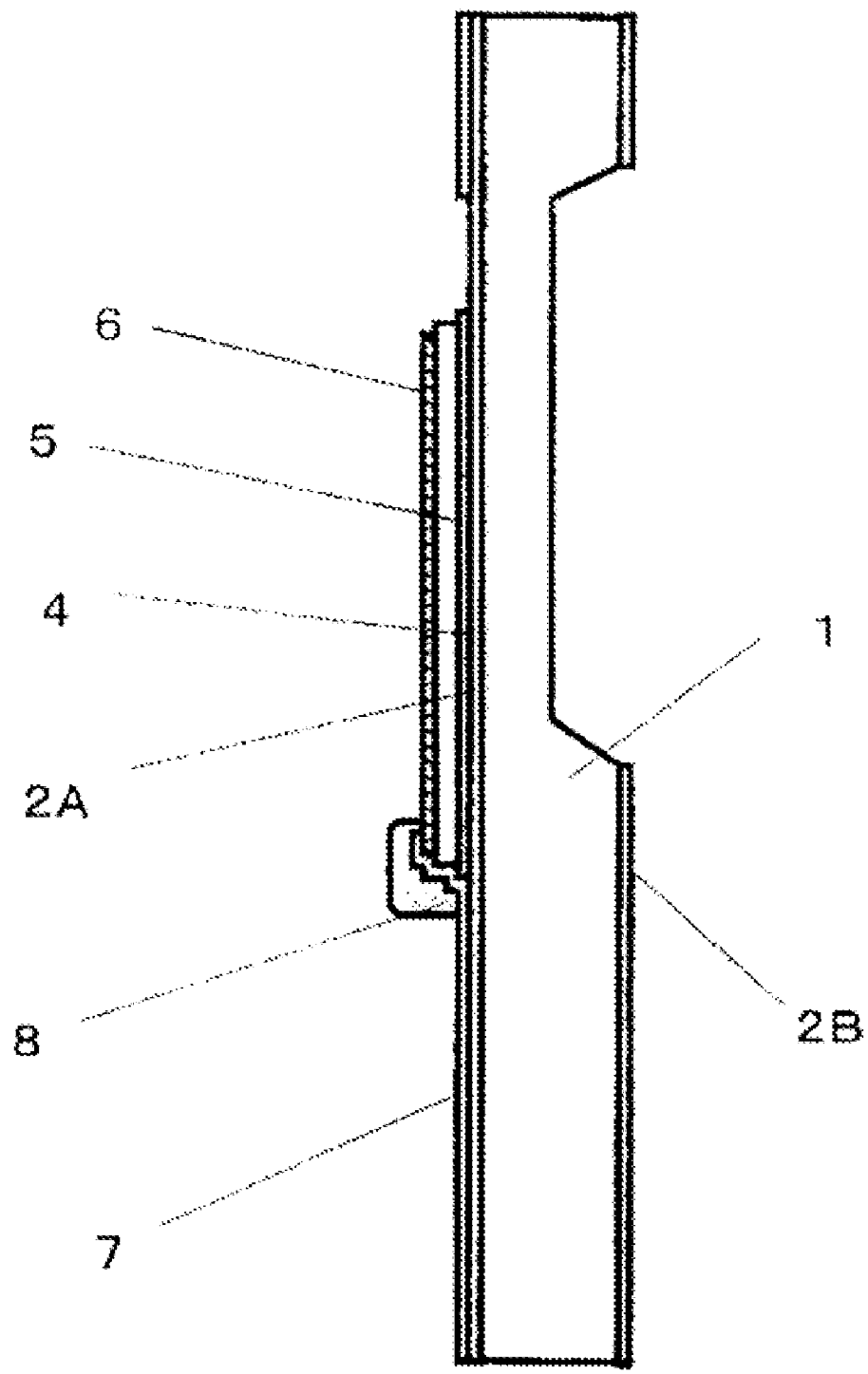
FIG. 23 is a sectional view taken along line Y-Y' of FIG. 22.

Next, as shown in FIG. 22 and FIG. 23, a planarized resist film 8 is formed on the electrode connection portions 106a, 106b, and 106c. The planarized resist film 8 is used to smoothen electrical connections of the wiring film 9 (that will be described later) and the upper electrode film 6. When the wiring film 9 and the upper electrode film 6 are physically connected, it is necessary to cause the wiring film 9 to be formed through end portions of the piezoelectric film 5 and the lower layer electrode film 4. In this embodiment, since the piezoelectric film 5 is formed by the wet-etching technique, the end portion thereof is reversely tapered or vertically edged. Thus, if wirings are made without the planarized resist film 8, they may be broken at the end portion. In addition, since the lower layer electrode film 4 is exposed, if it is not insulated by the planarized resist film, the lower layer electrode film 4 may be electrically short-circuited. From the foregoing point of view, in this embodiment, the planarized resist film 8 is formed.

The planarized resist film 8 can be formed in any shape as long as the planarized resist film 8 covers the wiring film 9 (that will be described latter). In this embodiment, the width t23 of the planarized resist film is 200 µm and the length t24 of the planarized resist film is 50 µm.

As a forming method of the planarized resist film 8, after the resist film is patterned in a desired shape by the photolithography technique, the patterned planarized resist film 8 is heated at a temperature in the range from 280° C. to 300° C. so as to harden the patterned resist film. At this point, in this embodiment, the film thickness of the resist film is around 2 µm. It is preferred that the resist film have a thickness exceeding the total of the thickness of the piezoelectric film 5 and the thickness of the lower layer electrode film 4.

In this embodiment, as the planarized resist film 8, a photosensitive film is used, but not limited thereto. The planarized resist film 8 may be any nonconductive material and may be formed by any forming technique as long as the material and the forming method satisfy the foregoing object.

Figure 24:
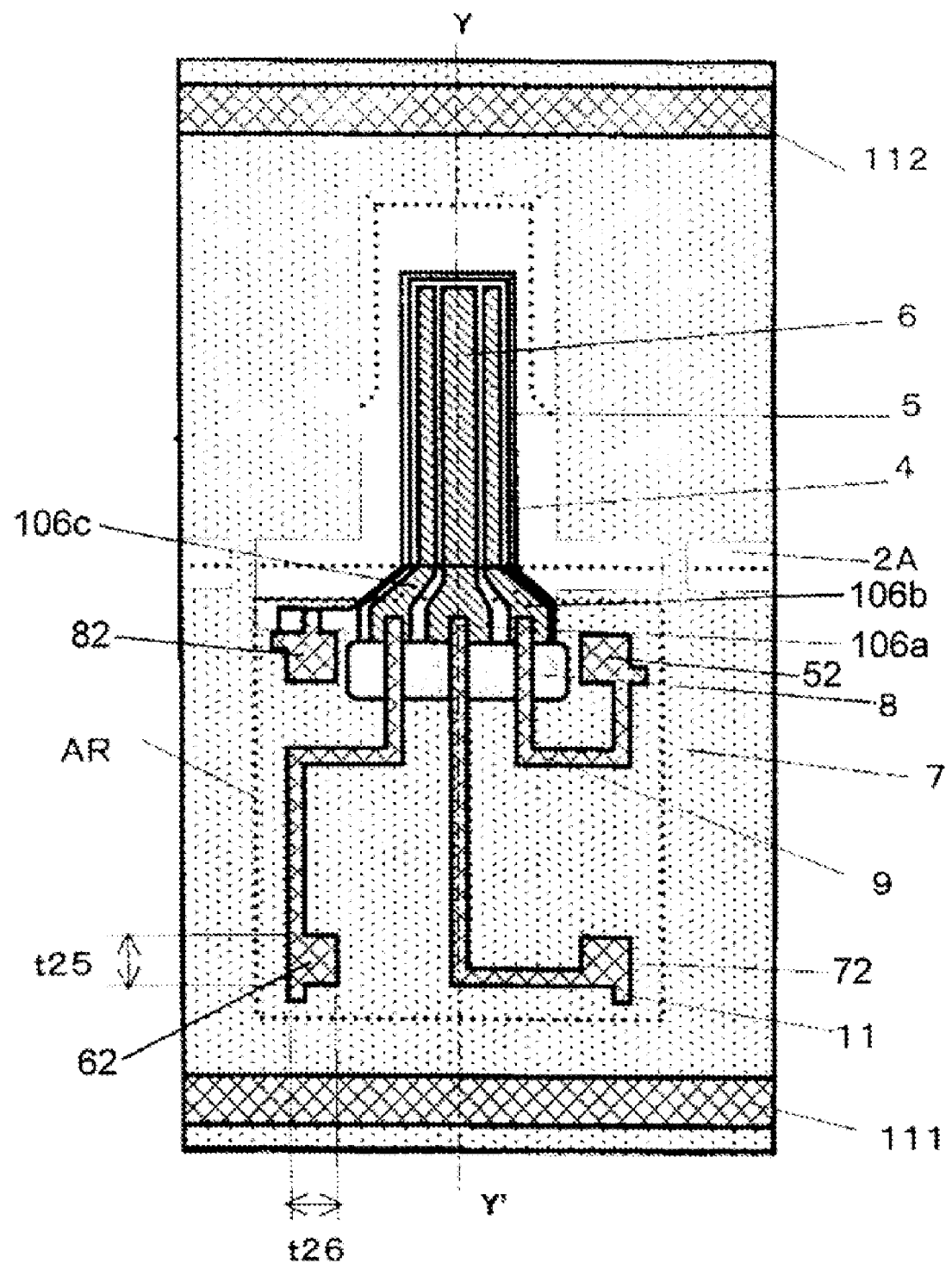
FIG. 24 is an enlarged plan view showing a state of the substrate on which wiring connection terminals have been formed.
Figure 25:
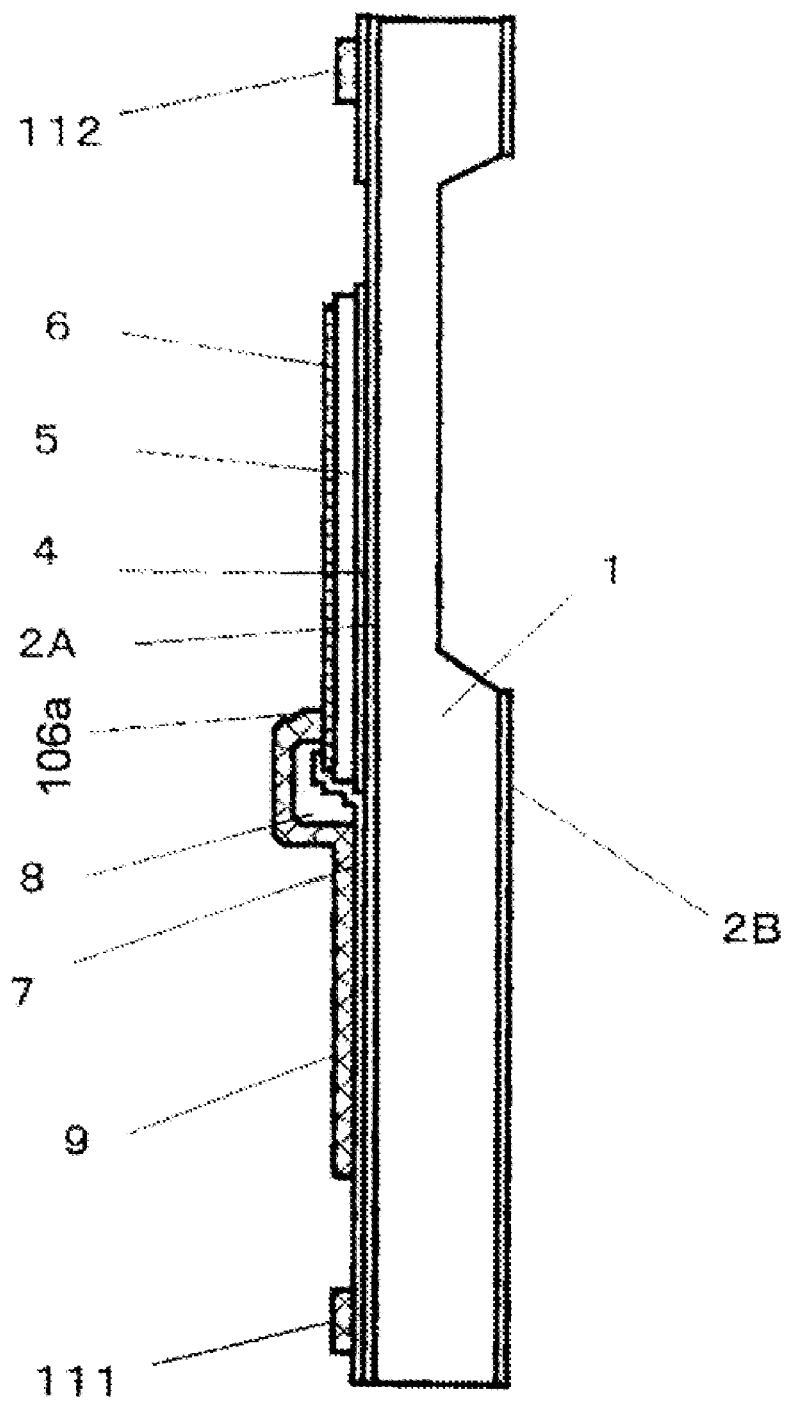
FIG. 25 is a sectional view taken along line Y-Y' of FIG. 24.

Next, as shown in FIG. 24 and FIG. 25, the wiring film 9 is formed such that the upper electrode film 6 can be easily and electrically connected to the outside. The wiring film 9 is connected to the connection portion of the upper electrode film 6 through the upper surface of the planarized resist film 8. Although the electrode connection portions 106a, 106b, and 106c are formed in any shape, it is preferred that the size of one side of the electrode connection portions 106a, 106b, and 106c be 5 µm or larger to decrease the electrical contact resistance. In this embodiment, since the flip-chip technique is used for electrical connections to the outside, Au bumps are used. Thus, as shown in FIG. 24, electrode pads 52, 62, 72, and 82 are formed for the electrodes as Au bump regions.

It is necessary to provide areas for the Au bumps to form the electrode pads 52, 62, 72, and 82. In this embodiment, the length t25 of the electrode pads is 120 µm and the width t26 of the electrode pads is 120 µm. To electrically connect the drive electrode 6a and the left and right detection electrodes 6b and 6c of the upper electrode film 6 and the lower layer electrode film 4 to the outside, the wiring film 9 is necessary to be independently formed corresponding to them. The electrode pads 52, 62, 72, and 82 are formed in an element area AR.

Figure 26:
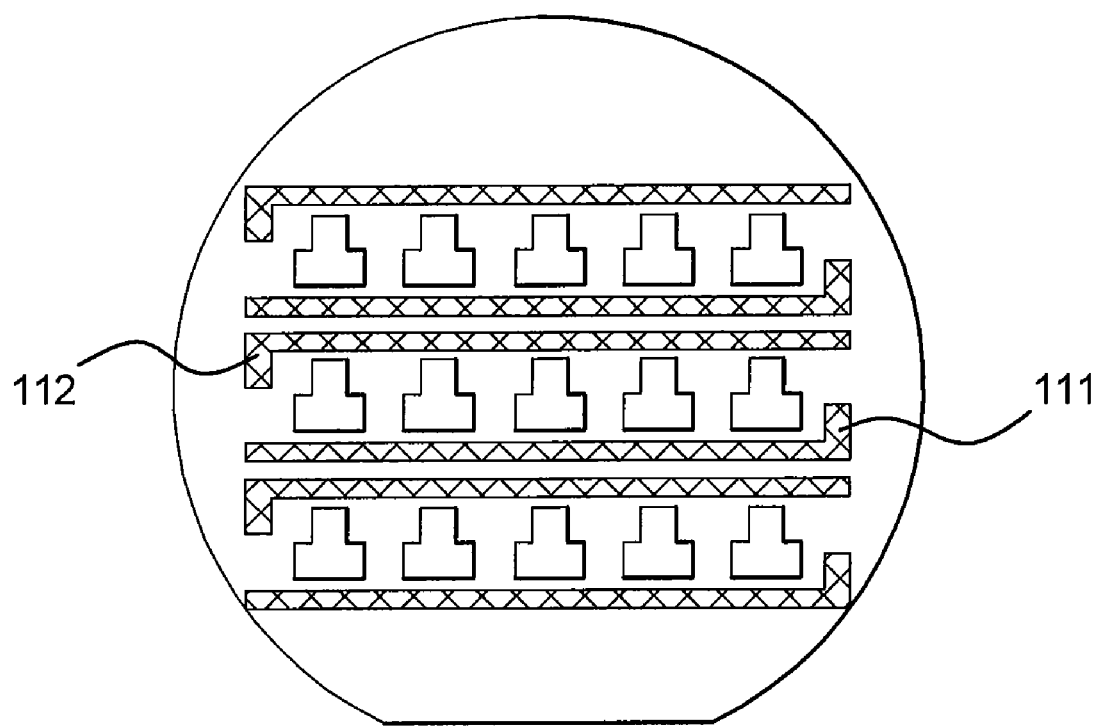
FIG. 26 is a plan view showing a state of the entire substrate on which polarization rails have been formed.

In this step, polarization rails are also formed. In this embodiment, the oscillator is finally polarized to stabilize the piezoelectric characteristic. To effectively perform the polarization treatment, elements of each row are polarized at a time. To polarize elements at a time, it is necessary to form wirings on the voltage applying side and the GND side in advance. In this embodiment, as shown in FIG. 26, the wirings are formed as polarization rails 111 and 112 that are horizontal lines. At this point, although the elements are separated from the rails, when Cu wirings 11 are formed, the wirings on the voltage applying side and the GND side are connected.

As a forming method of the wiring film 9, after a resist pattern film is formed in a desired shape having an opening portion by the photolithography technique, the wiring film 9 is formed by the spattering technique. A spattered film that has adhered to the unnecessary portion is removed together with the resist pattern film by the lift-off technique. To improve adhesion of the wiring film, Ti is deposited as a material of the wiring film 9 for 20 nm. Thereafter, Cu that has a low electric resistance and that is inexpensive is deposited for 300 nm. Thereafter, to allow the wiring film 9 to be easily connected to the Au bumps, Au is deposited for 500 nm. The material and forming method of the wiring material 9 are not limited to the foregoing material and method.

[Insulation Protection Film Forming Step]

Figure 27:
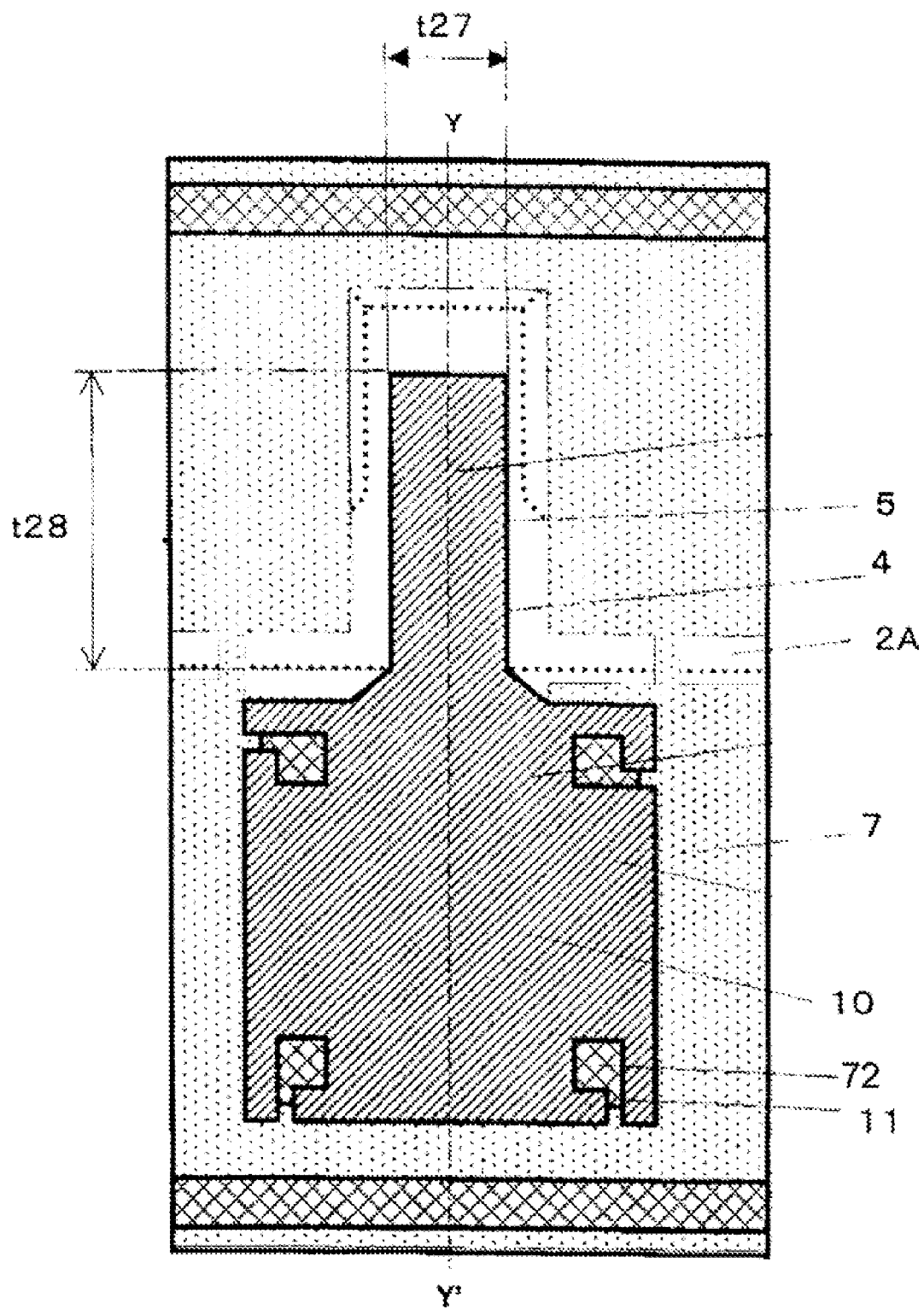
FIG. 27 is an enlarged plan view showing a state of the substrate on which an insulation protection film has been formed.
Figure 28:
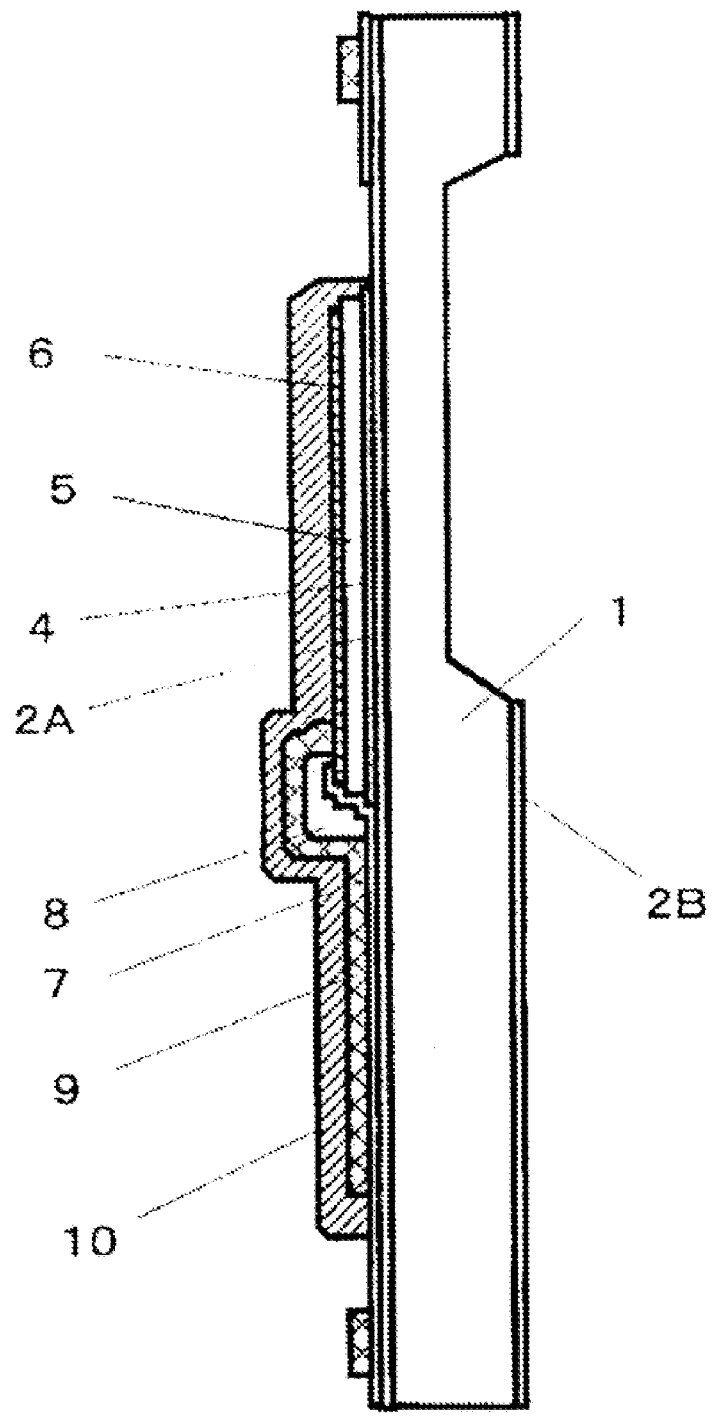
FIG. 28 is a sectional view taken along line Y-Y' of FIG. 27.

Next, as shown in FIG. 27 and FIG. 28, an insulation protection film 10 is formed on the oscillation lever and wirings so as to prevent electricity from leaking between electrodes due to an external factor such as humidity and prevent the electrode film from being oxidized. The width t27 of the protection film on the oscillator is necessary to be larger than the width t20 of the lower electrode and be smaller than the width t6 of the oscillation lever. In this embodiment, t27 is 98 μm. The length t28 of the protection film on the oscillation lever is necessary to be larger than the length t19 of the lower electrode and smaller than the length t5 of the oscillator. In this embodiment, t28 is 1.95 mm. The insulation protection film 10 on the wiring film 9 is a pattern that covers the entire wiring film 9. However, the insulation protection film 10 is necessary not be formed at four positions of the electrode pads for the Au bumps and four positions of the connection portions of the Cu wirings 11.

As a forming method of the insulation protection film 10, after a resist pattern film is formed in a desired shape having an opening portion by the photolithography technique, the insulation protection film 10 is formed by the spattering technique. A spattered film that has adhered to the unnecessary portion is removed together with the resist pattern film by the lift-off technique. To improve adhesion of the insulation protection film 10, $Al_2O_3$ is deposited as a material of the insulation protection film 10 for 50 nm.

Thereafter, $SiO_2$ having high insulation characteristic is deposited for 750 nm. As the top layer, $Al_2O_3$ is deposited for 50 nm so as to improve adhesion of resist for the oscillation lever. Although the thickness of $SiO_2$ that functions as an insulation protection film is necessary to be at least twice as large as the thickness of the upper electrode, if the thickness of $SiO_2$ exceeds 1 μm, burring tends to occur at lift-off. Thus, in this embodiment, the thickness of $SiO_2$ is 750 nm. The $SiO_2$ film is formed in the condition of which the pressure of argon is 0.4 Pa that is the lowest discharging pressure as to increase the film density of the $SiO_2$ film.

Figure 29:
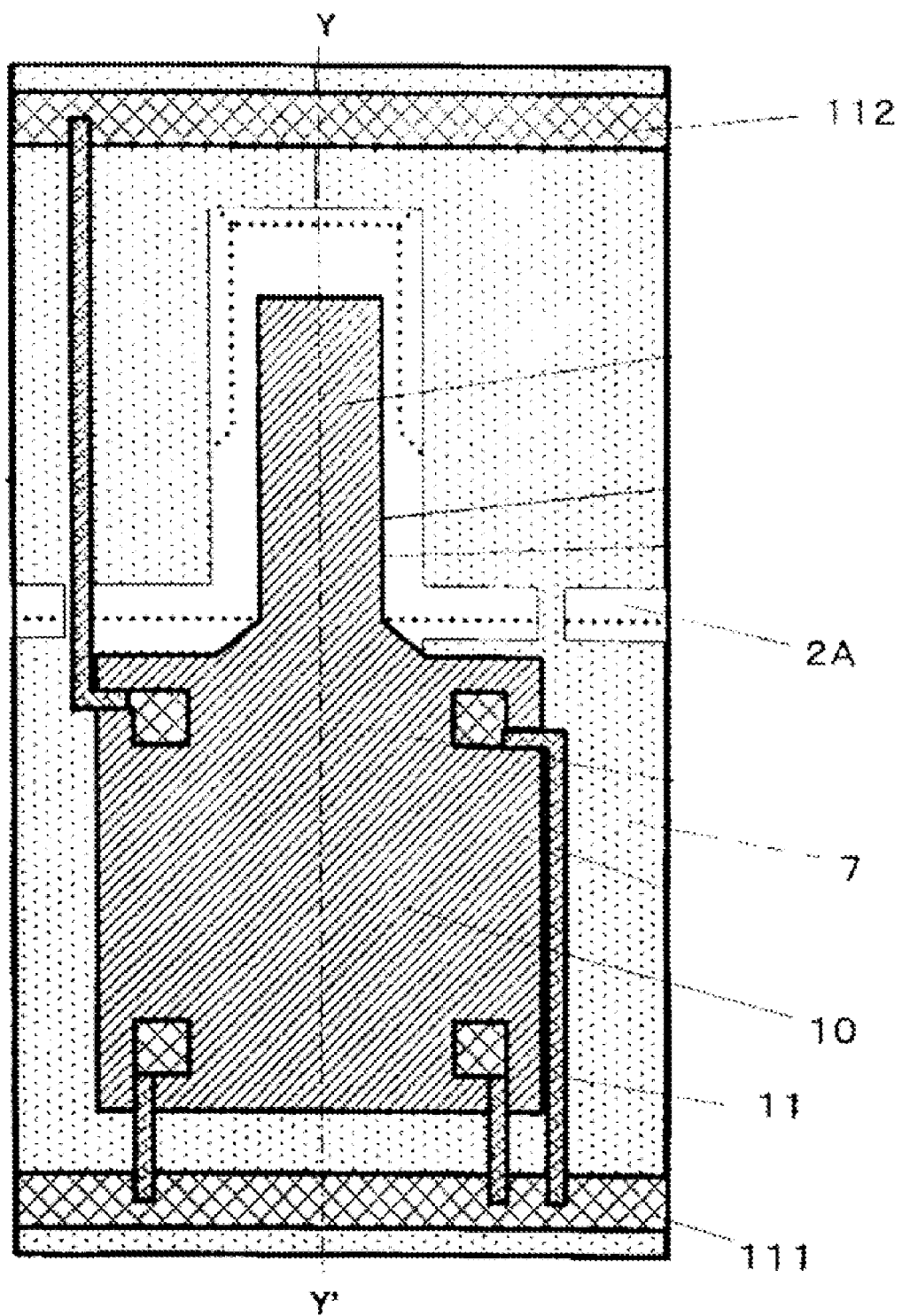
FIG. 29 is an enlarged plan view showing a state of the substrate on which Cu wirings have been formed.
Figure 30:
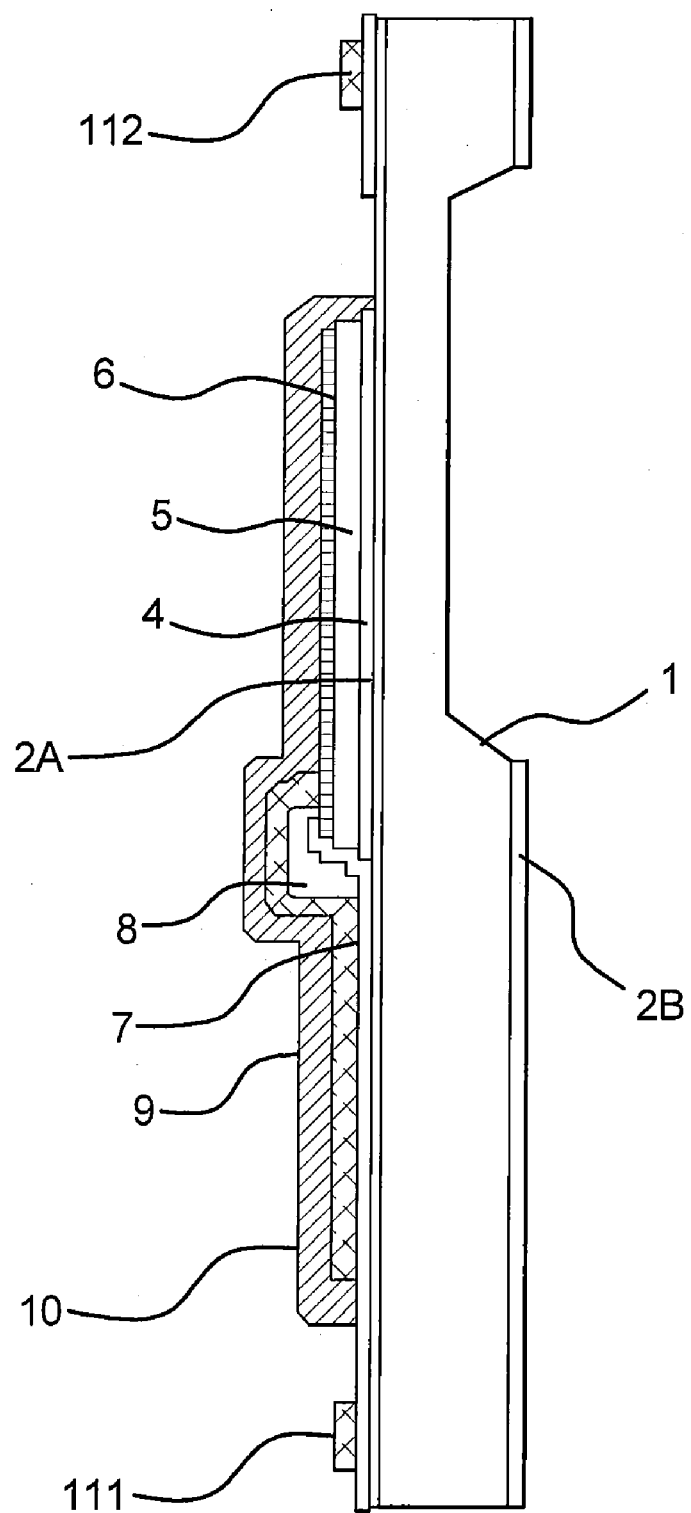
FIG. 30 is a sectional view taken along line Y-Y' of FIG. 29.
Figure 31:
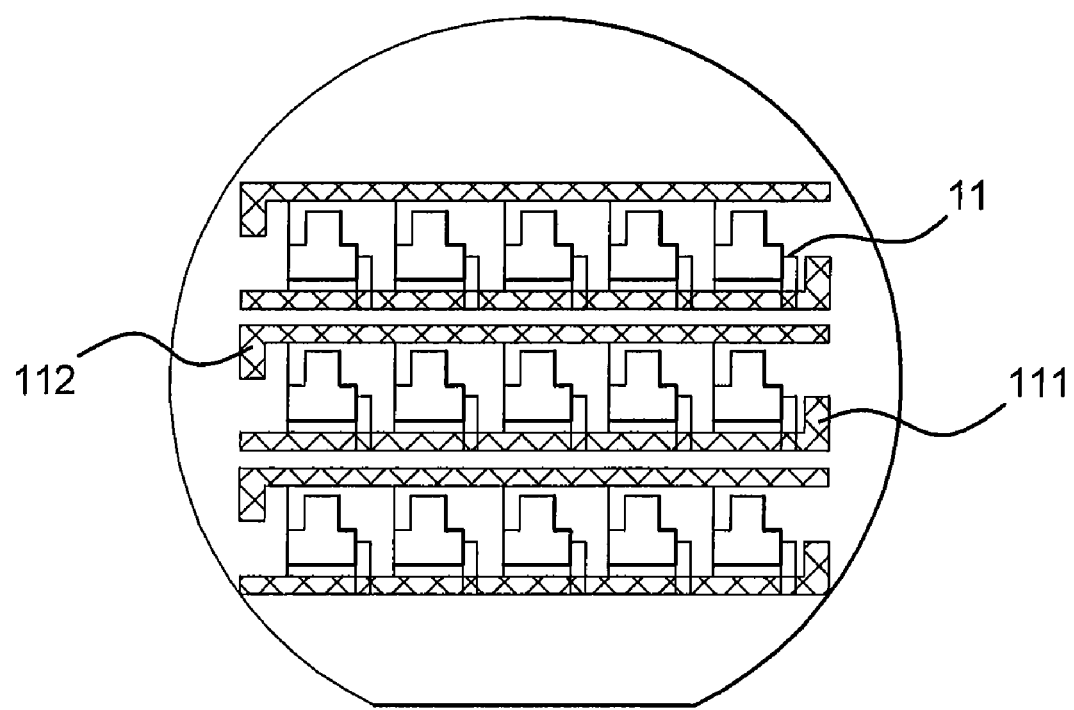
FIG. 31 is a plan view showing the entire substrate on which Cu wirings have been formed.

Next, as shown in FIG. 29 and FIG. 30, the Cu wirings 11 are formed so as to connect the drive electrode 6a and the left and right detection electrodes 6b and 6c of the upper electrode film 6 to the rail 111 on the voltage applying side and connect the lower layer electrode film 4 to the rail 112 on the GND side. As shown in FIG. 31, the Cu wirings 11 are formed for all elements. The Cu wirings 11 are used because they are easily melted by the wet-etching technique after the polariza-tion treatment has been performed and the elements can be separated without damage. Thus, instead of the Cu wirings 11, any material may be used as long as it is a conductor that can be easily removed from the elements without damage. It is preferred that the width t29 of the wirings (see FIG. 33) be 30 μm or more so as to secure conductivity upon polarization treatment.

As a forming method of the Cu wirings 11, after a resist pattern film is formed in a desired shape having an opening portion by the photolithography technique, the Cu wirings 11 are formed by the spattering technique. A spattered film that has adhered to the unnecessary portion is removed together with the resist pattern film by the lift-off technique. To secure conductivity upon polarization treatment, the film thickness of the Cu film is 400 nm. The wiring film can be formed in any technique, not limited to the foregoing technique.

Figure 32:
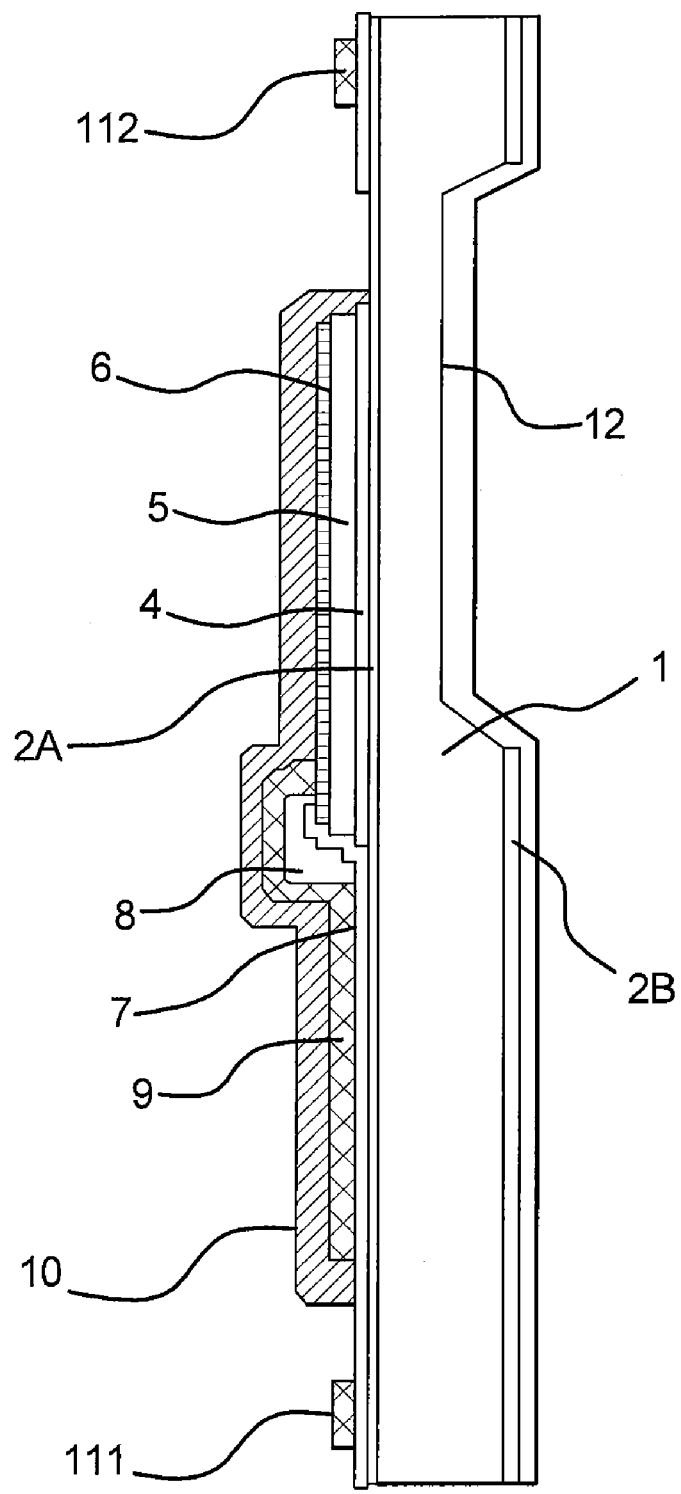
FIG. 32 is a sectional view showing a state of the substrate on which a rear surface stopper film has been formed.

Next, as shown in FIG. 32, a rear surface stopper film 12 is formed so as to prevent concentrated plasmas on the bottom surface from adversely affecting the edge shape of an oscillation lever that is through-etched (that will be described later). In this embodiment, $SiO_2$ is spattered on the entire rear surface for 500 nm.

[Oscillation Lever Forming Step]

Figure 33:
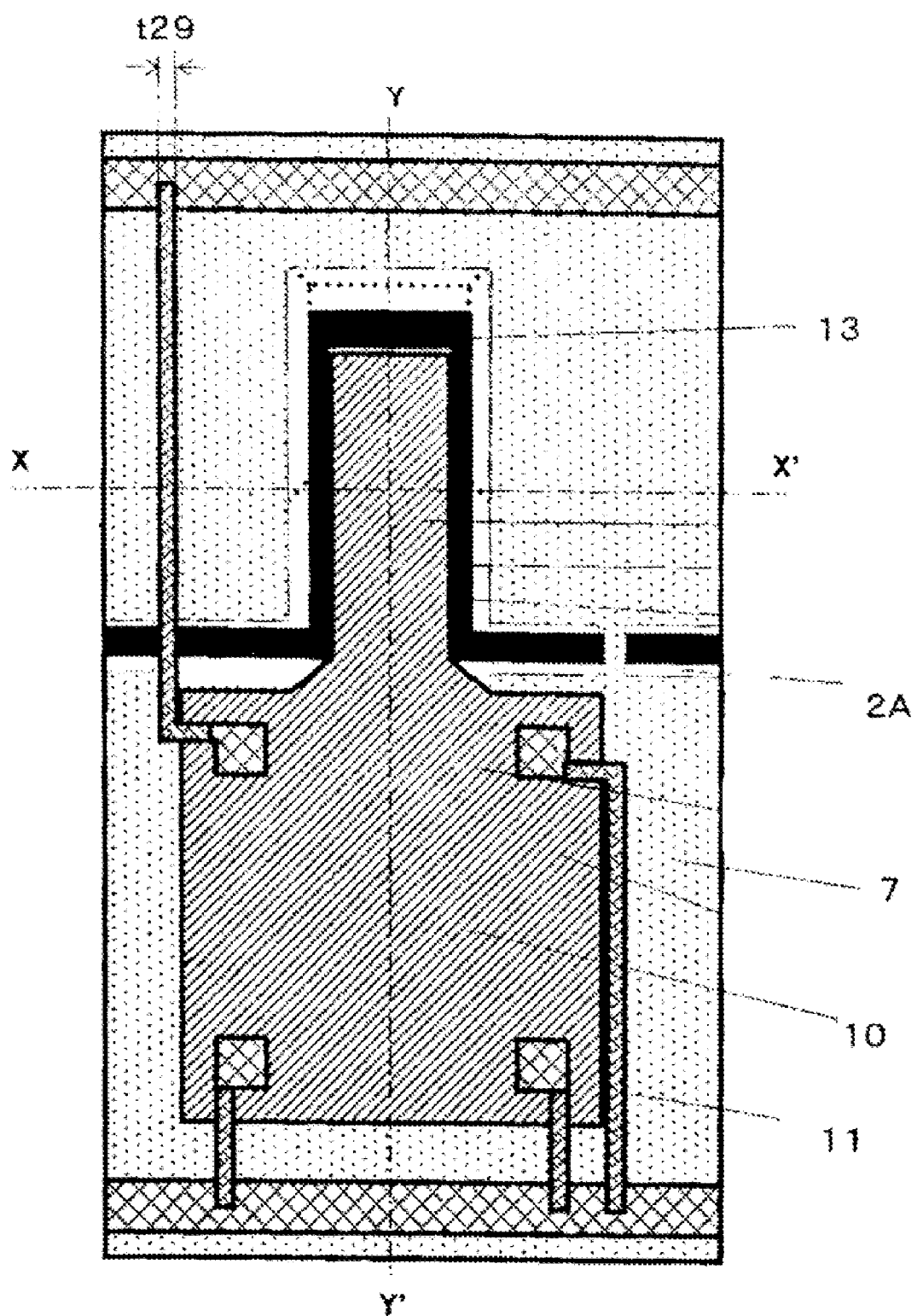
FIG. 33 is an enlarged plan view showing a state of the substrate on which a lever space has been removed and an oscillation lever has been formed.
Figure 34:
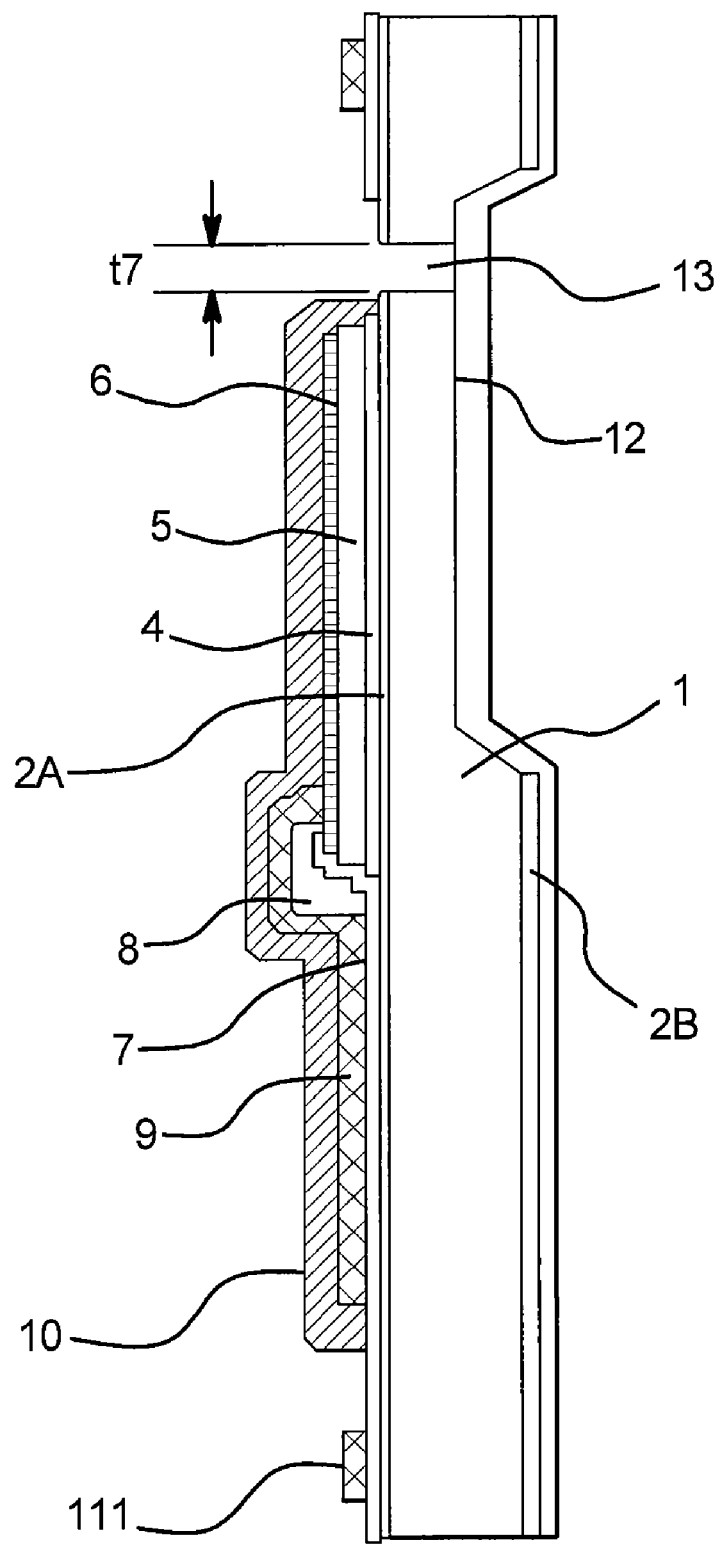
FIG. 34 is a sectional view taken along line Y-Y' of FIG. 33.
Figure 35:
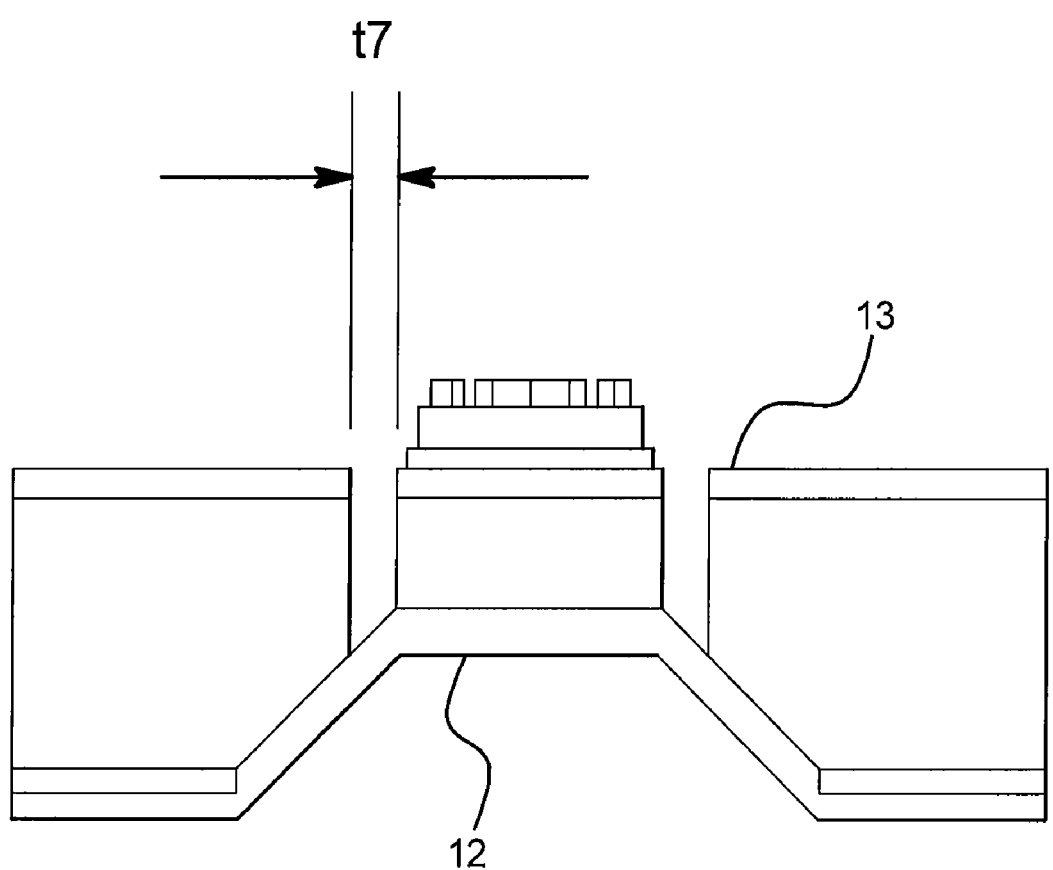
FIG. 35 is a sectional view taken along line X-X' of FIG. 33.

Next, as shown in FIG. 33, FIG. 34, and FIG. 35, a lever space is removed so as to form an oscillation lever. FIG. 34 is a sectional view taken along line Y-Y' of FIG. 33. FIG. 35 is a sectional view taken along line X-X' of FIG. 33.

As a forming method of the lever space, after a resist pattern film is formed in a desired shape having an opening portion of the through portion 13 by the photolithography technique, the thermally oxidized film 2A is removed and then substrate 1 is pierced by the ion-etching technique. Although the thermally oxidized film 2A may be removed by the wet-etching technique, it is preferred that the thermally oxidized film 2A and the substrate 1 be etched by the ion-etching technique taking into account of dimensional errors due to side etch.

In this embodiment, it is necessary to pierce the Si substrate 1 for the thickness t14 of the oscillation lever (thickness t11 of the diaphragm) (t14, t11=100 μm). Since it is difficult to specify the selective ratio of the substrate 1 and the resist film and leave it as a vertical wall surface, in this embodiment, an oscillation lever having a vertical side wall surface is formed by a unit having ICP (Inductively Coupled Plasma) and a Bosch process that cycles an etching treatment and a side wall protection film forming treatment (with $SF_6$ gas in the etching treatment and $C_4F_8$ gas in the film forming treatment). Since a technique of vertically grinding an Si material has been generally established, in this embodiment, a commercially available unit is used. However, the lever space can be removed in any technique, not limited to the foregoing technique. It is necessary to satisfy the etching width t7 for the ICP etching technique. In this embodiment, the etching width t7 is 200 μm. In addition, the Cu wirings 11 are not pierced.

Figure 36:
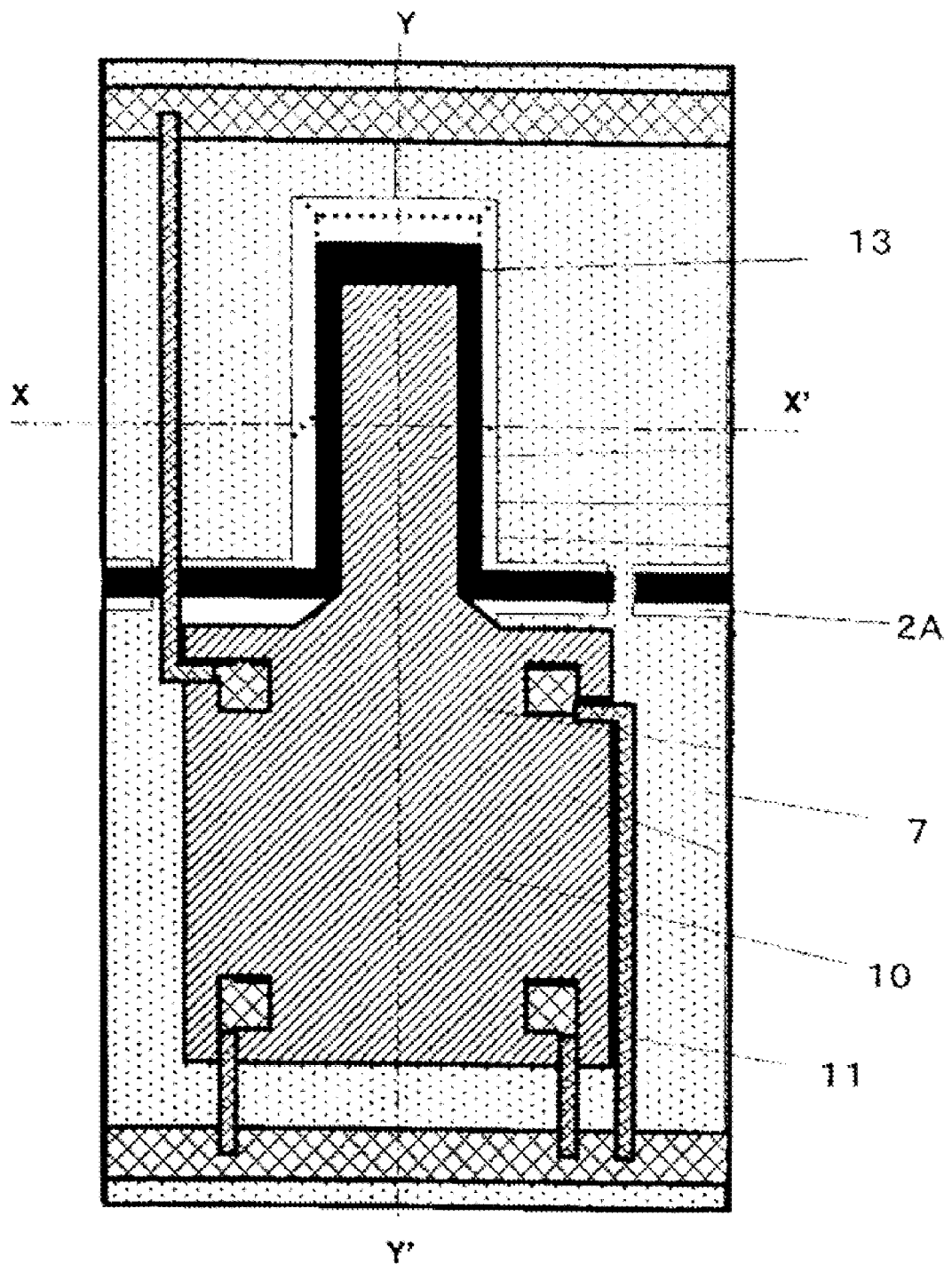
FIG. 36 is an enlarged plan view showing a state of the substrate on which the stopper layer has been removed.
Figure 37:
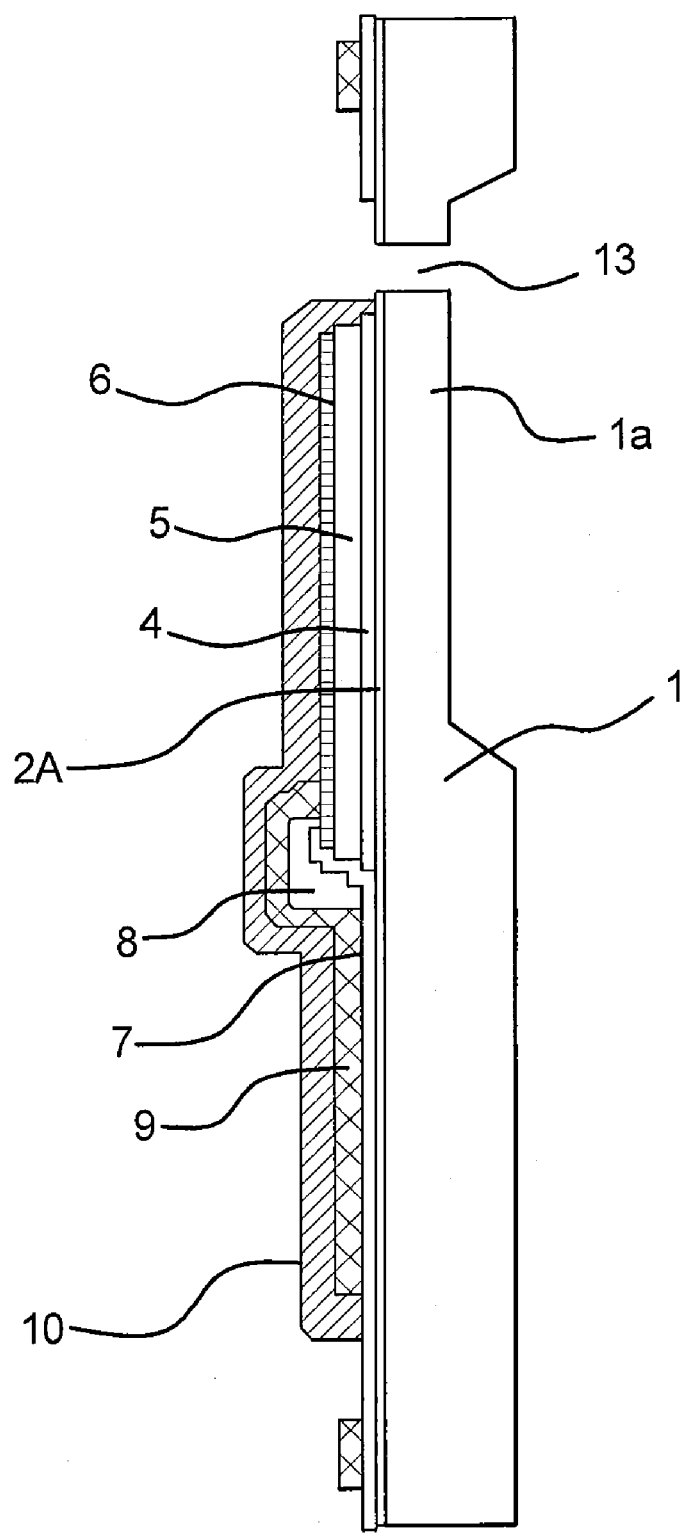
FIG. 37 is a sectional view taken along line Y-Y' of FIG. 36.
Figure 38:
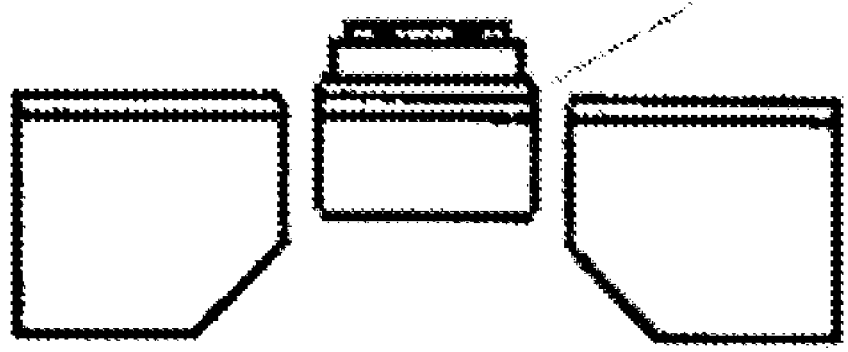
FIG. 38 is a sectional view taken along line X-X' of FIG. 36.

After the substrate 1 has been ICP-etched, the rear surface stopper film 12 is removed in any technique. In this embodiment, the rear surface stopper film 12 is removed by the wet-etching technique using ammonium fluoride. At this point, before the rear surface stopper film 12 is removed, if the resist of the through-hole pattern has been removed, the insulation protection film 10 disappears. Thus, after the stopper film is removed, the resist is removed. FIG. 36 to FIG. 38 show the state of which the rear surface stopper film 12 and the resist have been removed. As shown in FIG. 37, the arm portion 1a is formed on the substrate 1.

[Polarization Treatment Step]

Figure 39A:
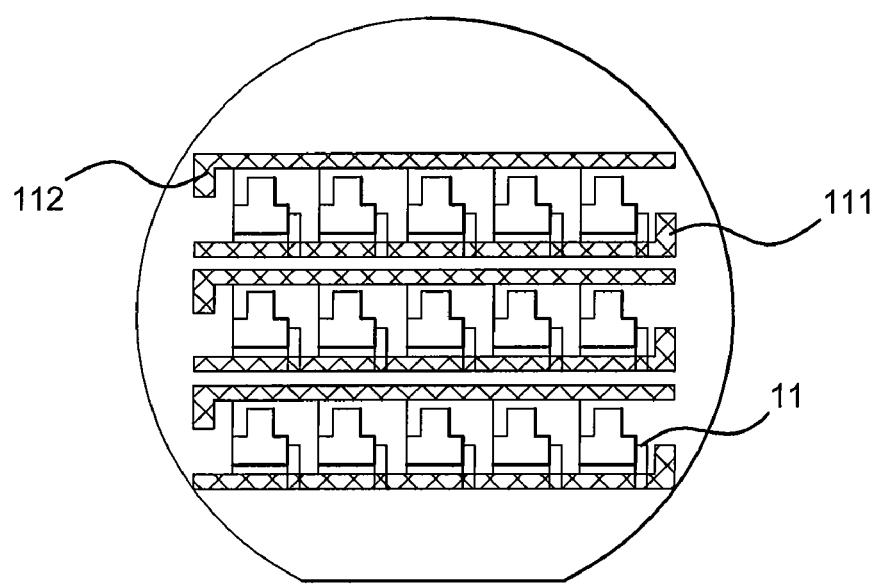
FIG. 39A and FIG. 39B are schematic diagrams showing a step of a polarization treatment of stabilizing a piezoelectric characteristic.
Figure 39B:
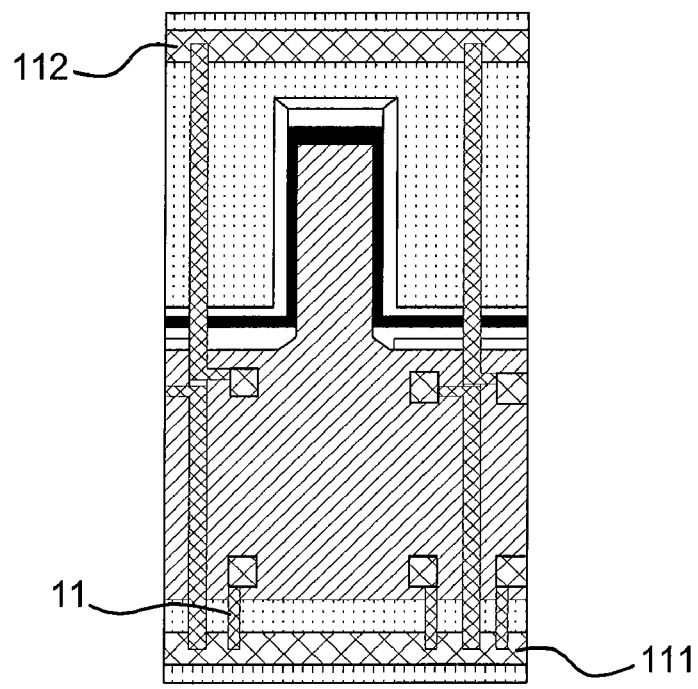

Next, a polarization treatment is performed for an element shown in FIG. 39A and FIG. 39B so as to stabilize the piezoelectric characteristic. To polarize elements of each row at a time, the substrate is connected to an external power supply through pads on the voltage applying side and the GND side. Although any connection technique and polarization technique can be used, in this embodiment, the polarization treatment is performed by connecting the substrate to the external power supply by the wire bonding technique.

Figure 40A:
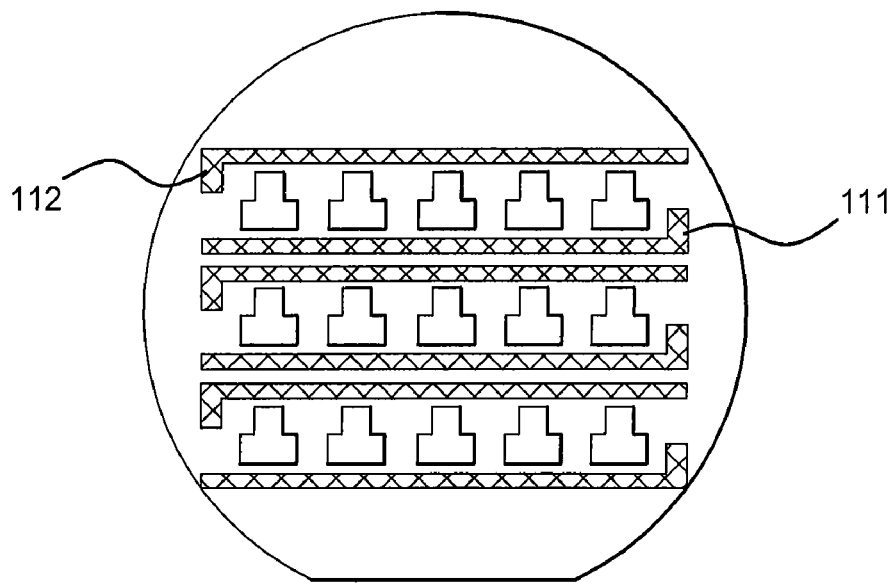
FIG. 40A and FIG. 40B are schematic diagrams showing a state of the substrate on which unnecessary Cu wirings have been removed after the polarization treatment has been performed.
Figure 40B:
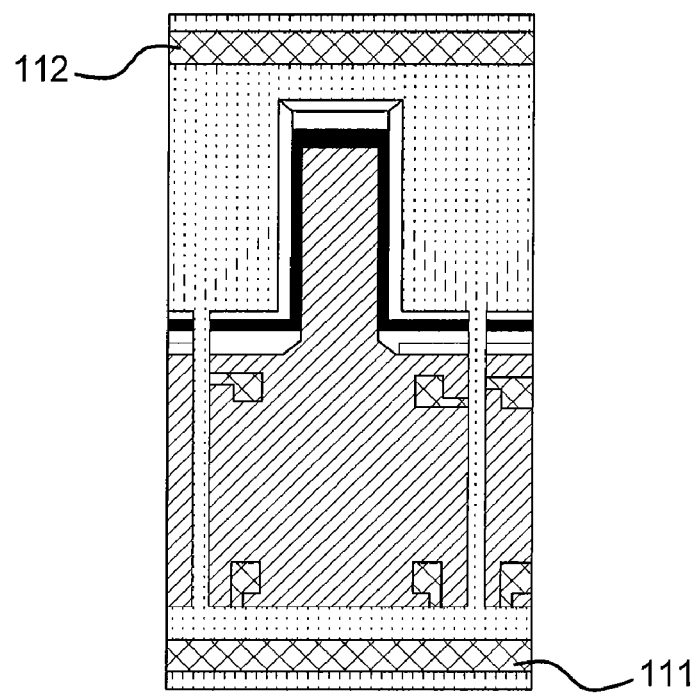

Next, as shown in FIG. 40A and FIG. 40B, after the polarization treatment has been performed, the Cu wirings 11 that have become unnecessary are removed. If the elements are cut with the Cu wirings 11 left, the cut surface causes electricity to flow between the Cu wirings 11 and the substrate 1. Thus, it is preferred that the Cu wirings 11 be chemically removed. In this embodiment, the Cu wirings 11 are melted and removed by the wet-etching technique using an Enstrip solution (made by Meltex Inc.) to prevent the elements from being damaged.

When the piezoelectric devices 100 are formed by a thin film process and a plurality of piezoelectric device 100 are polarized at a time through wirings of a thin film formed by the thin film process, a lot of thin film gyros can be inexpensively and stably manufactured.

The Cu wirings 11 may be removed by other than the foregoing wet-etching technique. In the element cut step that follows, the elements are cut along the Cu wirings 11. Thus, when the elements are cut by a dicer, the Cu wirings 11 may be ground thereby. In this case, the forming width t29 of the Cu wiring 11 is necessary to be equal to or smaller than the width of a cutting grinder. In this embodiment, since elements are cut by a dicer having a grinder of 40 μm wide, the forming width t29 of the Cu wirings 11 is necessary to be in the range from 20 μm to 40 μm. If the forming width t29 is smaller than 20 μm, when a polarization voltage is applied, the resistance of the Cu wirings 11 generates heat, resulting in melting them. In contrast, if the forming width t29 exceeds 40 μm, since it becomes larger than the width of the grinder, after the elements are separated, the Cu wirings 11 are left on the elements.

[Gold Bump Forming Step]

Figure 41A:
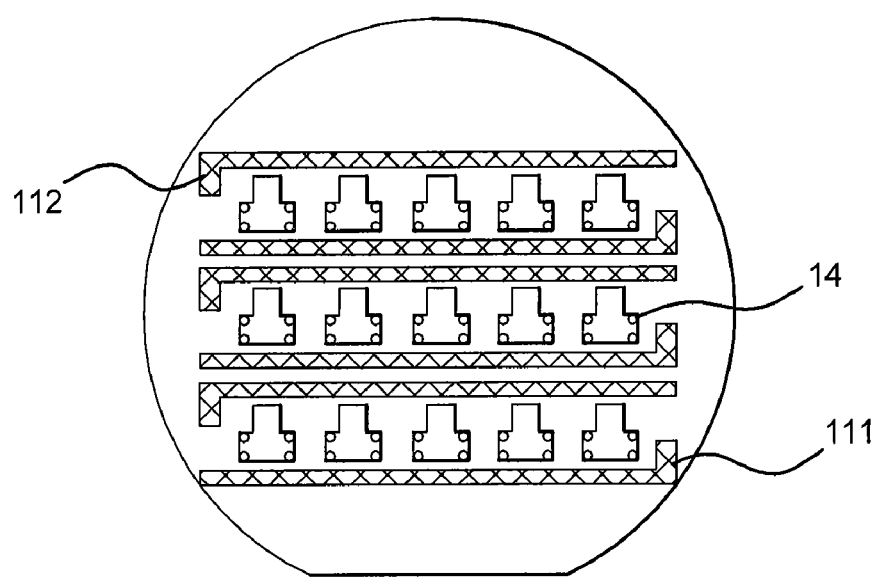
FIG. 41A and FIG. 41B are schematic diagrams showing a state of the substrate on which Au bumps have been formed by a flip-chip mounting technique.
Figure 41B:
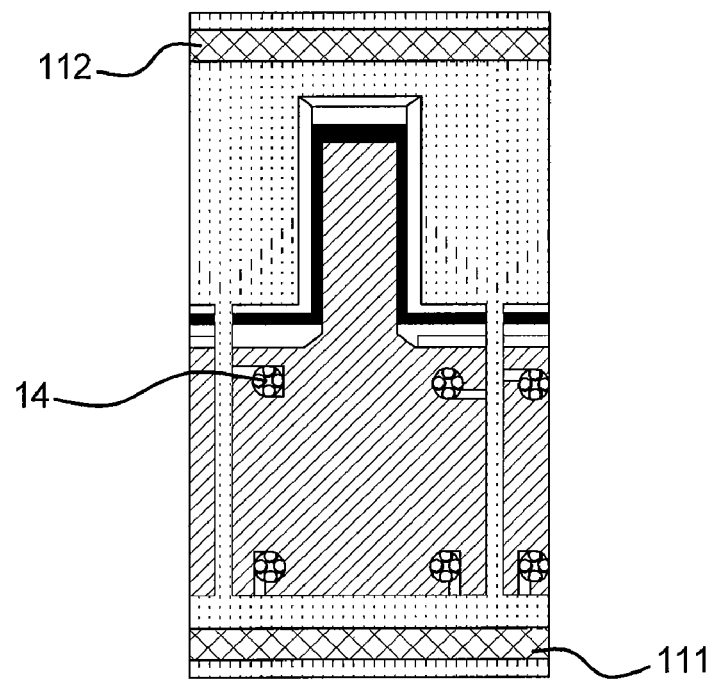

Next, as shown in FIG. 41A and FIG. 41B, Au bumps 14 are formed by the flip-chip technique. The Au bumps 14 are formed on the four electrode pads.

[Cutting Step]

Figure 42A:
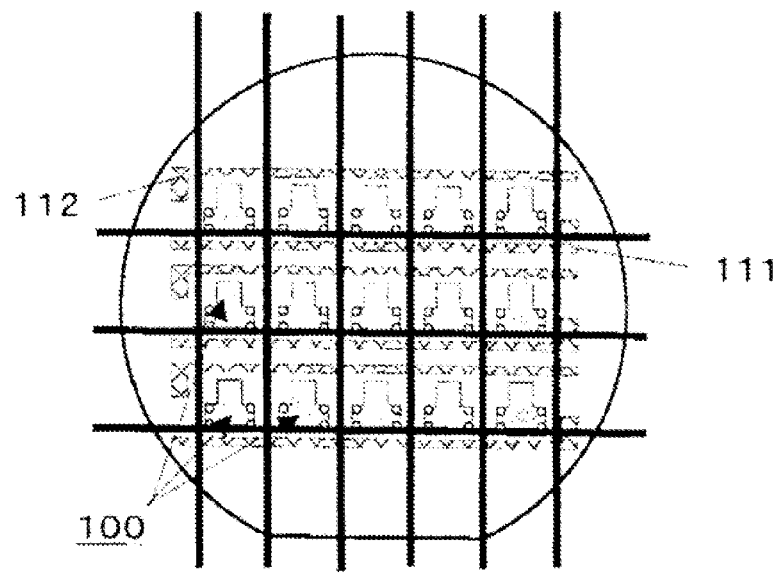
FIG. 42A and FIG. 42B are schematic diagrams showing separation lines along which piezoelectric devices formed as piezoelectric thin film sensors are separated.
Figure 42B:
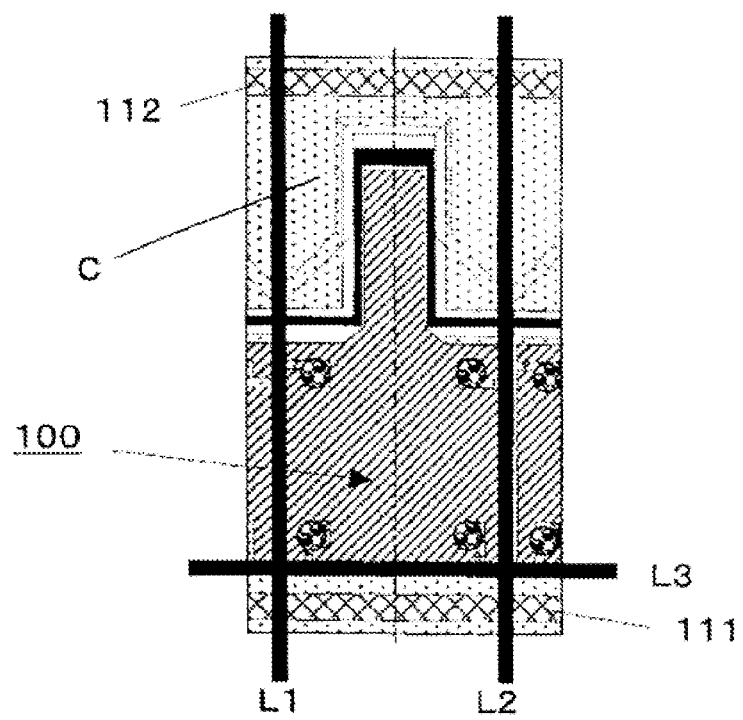
Figure 43:
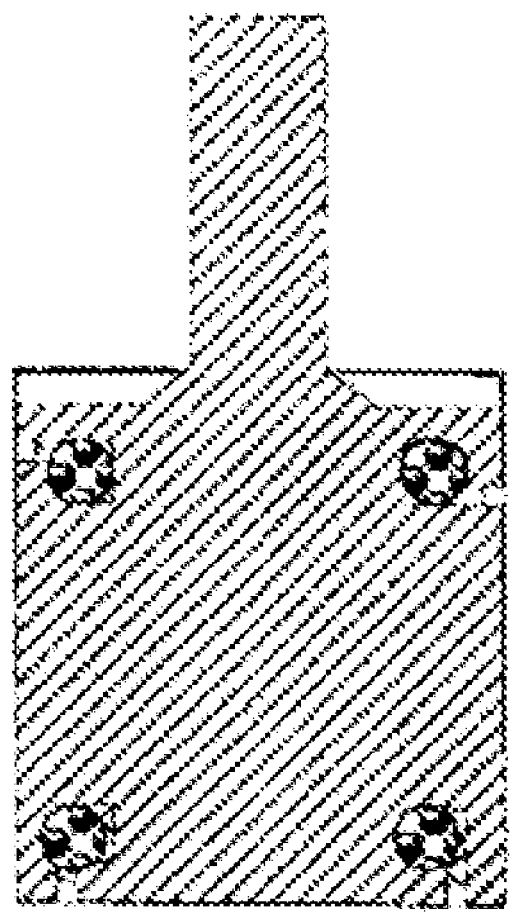
FIG. 43 is a plan view showing a piezoelectric device formed as a piezoelectric thin film sensor.
Figure 43:
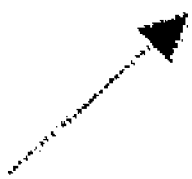

Next, as shown in FIG. 42A and FIG. 42B, 15 piezoelectric devices 100 formed as piezoelectric thin film sensors on the substrate 1 are separately cut. As shown in FIG. 42B, the piezoelectric devices 100 are cut along cut lines L1, L2, and L3 according to the element size. As a result, as shown in FIG. 43, the piezoelectric device 100 as a piezoelectric thin film sensor that has been separated by the pierced portion 13 and the cut surfaces has been manufactured. Portion C shown in FIG. 42B becomes an unnecessary portion.

[Mounting Step]

Figure 44:
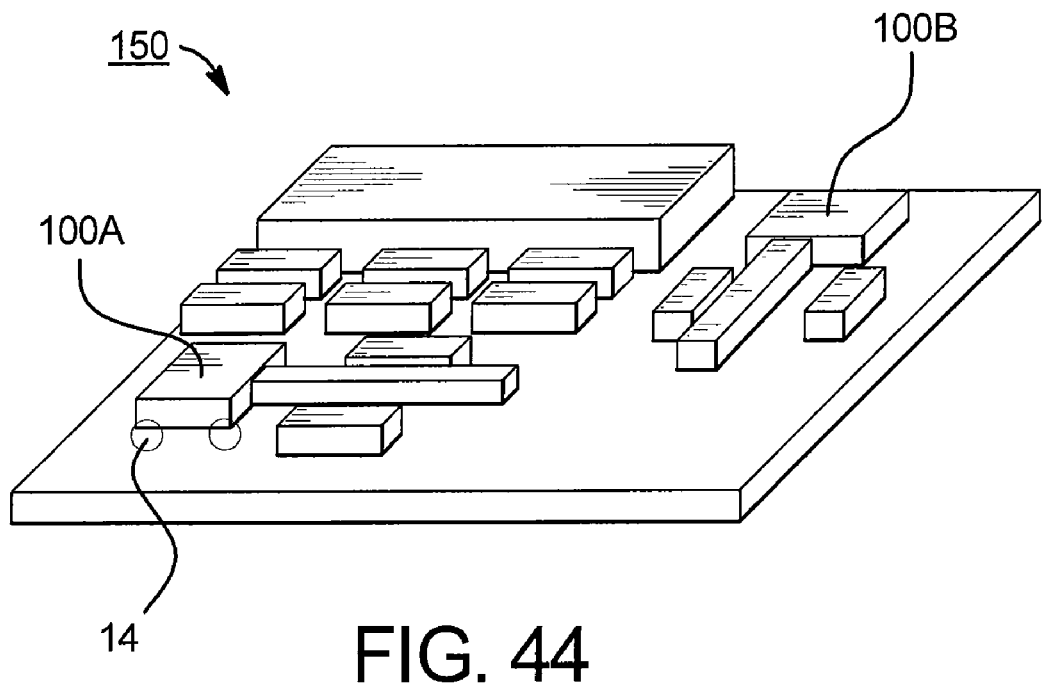
FIG. 44 is a schematic perspective view showing a state of which a piezoelectric device has been mounted on an IC circuit board.

As shown in FIG. 44, the piezoelectric device 100 that has been separately cut is mounted on a support circuit board such as an IC circuit board by the flip-chip technique. The IC circuit board is designed such that electric connections are made corresponding to the position of the element. In the example shown in FIG. 44, by mounting two piezoelectric devices 100 in the X and Y directions, for example piezoelectric devices 100A and 100B in the X and Y directions, a two-axis oscillation type gyro sensor 150 is manufactured.

Figure 45:
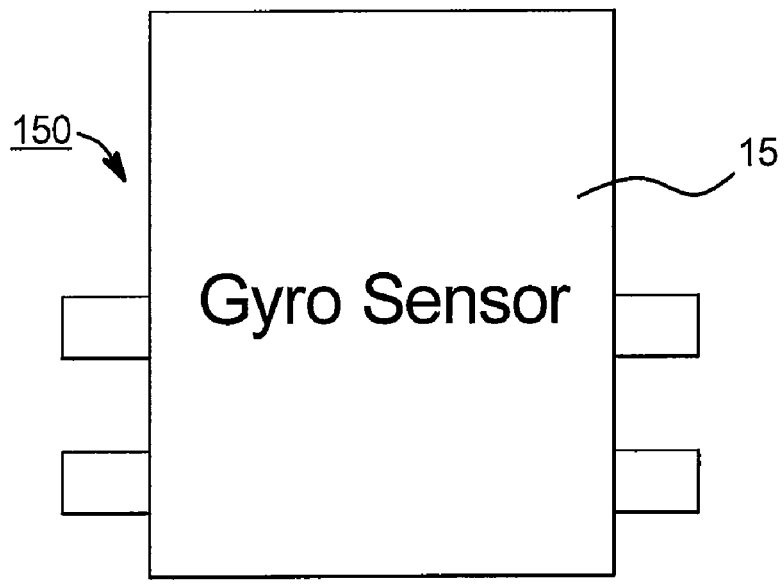
FIG. 45 is a plan view showing a state of which a cover member has been mounted on an oscillation type gyro sensor having piezoelectric devices.

As shown in FIG. 45, the oscillation type gyro sensor 150 is airtightly protected by a cover member 15 such that the elements and the circuit are not exposed to the outside. Although the cover member 15 may be made of any material, taking into account of influence of external noise, it is preferred to use a material having a shield effect such as a metal. The cover member 15 is formed in a shape that does not prevent the oscillation lever from oscillating.

Figure 46:
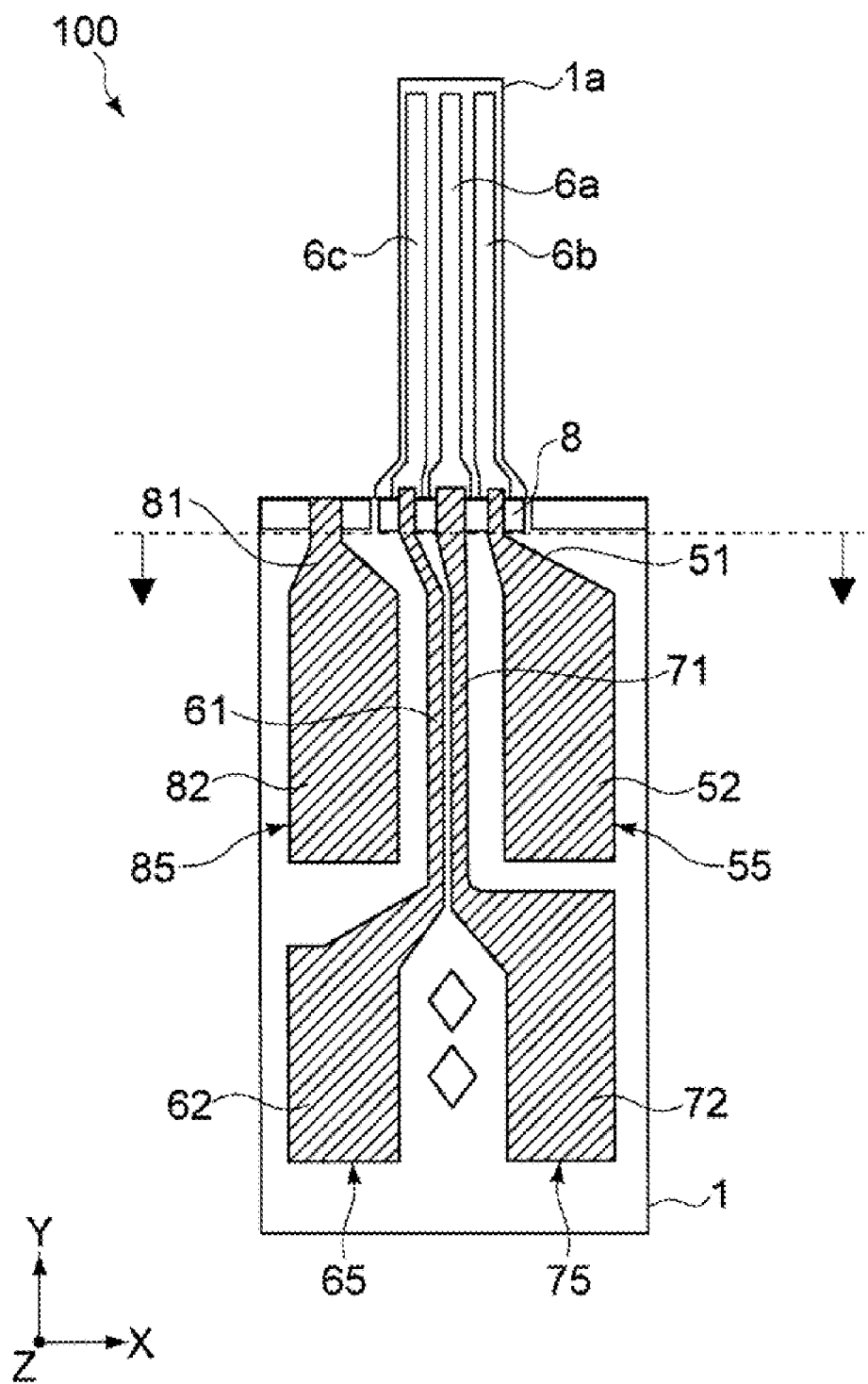
FIG. 46 is a schematic diagram showing a more practical mode of the wiring film shown in FIG. 24.

FIG. 46 is a schematic diagram showing a more specific shape of the pads 52, 62, 72, and 82, the wiring film 9, and so forth shown in FIG. 24. In the following description, even if the piezoelectric device 100 has not been completed as shown in FIG. 24, it will be described as "piezoelectric device 100".

The piezoelectric device 100 has a first lead electrode 55 connected to the first detection electrode 6b, a second lead electrode 65 connected to the second detection electrode 6c, a third lead electrode 75 connected to the drive electrode 6a, and a reference lead electrode 85 connected to the reference electrode 104a (see FIG. 3). The first lead electrode 55 is composed of a first lead wire 51 and a first pad 52. The second lead electrode 65 is composed of a second lead wire 61 and a second pad 62. The third lead electrode 75 is composed of a third lead wire 71 and a third pad 72. The reference lead electrode 85 is composed of a fourth lead wire 81 and a fourth pad 82. In this embodiment, the first to third lead electrodes 55, 65, and 75 and the reference lead electrode 85 represent conductive portions disposed below the planarized resist film 8 (portions disposed below a horizontal broken line in an arrow direction) shown in FIG. 46.

The first lead electrode 55 and the second lead electrode 65 are asymmetrically formed in the longitudinal direction of the arm portion 1a, namely with respect to the Y axis. In other words, the composite shape of the first lead wire 51 and the first pad 52 is asymmetrical to the composite shape of the second lead wire 61 and the second pad 62. Thus, the degree of freedom of the positions of the first lead electrode 55, the second lead electrode 65, the third lead electrode 75, and the reference lead electrode 85 is improved.

Typically, the length of the second lead wire 61 is larger than the length of the first lead wire 51. In contrast, the length of the third lead wire 71 is nearly the same as or the same as the length of the second lead wire 61.

In this embodiment, the area of the first lead electrode 55 (the total area of the first lead wire 51 and the first pad 52 (hereinafter referred to as area A) is substantially the same as the area of the second lead electrode 65 (the total area of the second lead wire 61 and the second pad 62 (hereinafter referred to as area B). Since area A is substantially the same as area B, the difference between a leak current that flows from the third lead electrode 75 to the first lead electrode 55 and a leak current that flows from the third lead electrode 75 to the second lead electrode 65 can be decreased.

As will be described later, the term "area A is substantially the same as area B" means that the area ratio is within ±8%.

To dispose the first lead electrode 55 and the second lead electrode 65 in a narrow area of one piezoelectric device on the substrate 1 without crosses, as in this embodiment, it is preferred that the first lead electrode 55 be asymmetrical to the second lead electrode 65. Even if the first lead electrode 55 is asymmetrical to the second lead electrode 65, when area A is substantially the same as area B, the difference between their leak currents can be decreased.

As described in the foregoing, since the first lead electrode 55 is asymmetrical to the second lead electrode 65, the degree of freedom of the positions of the first lead electrode 55 and the second lead electrode 65 is improved. In particular, as shown in FIG. 29, the degree of freedom of the routing of the Cu wirings 11 is improved. In other words, the Cu wirings 11 connected for example to the first to third lead electrodes 55, 65, 75, and the reference lead electrode 85 can be connected to the polarization rails 111 and 112 (see FIG. 39) without crosses. In other words, when a plurality of piezoelectric devices 100 are manufactured from one substrate 1 by the MEMS technique or the like, the polarization treatment for the plurality of piezoelectric devices 100 can be performed at a time.

Figure 47:
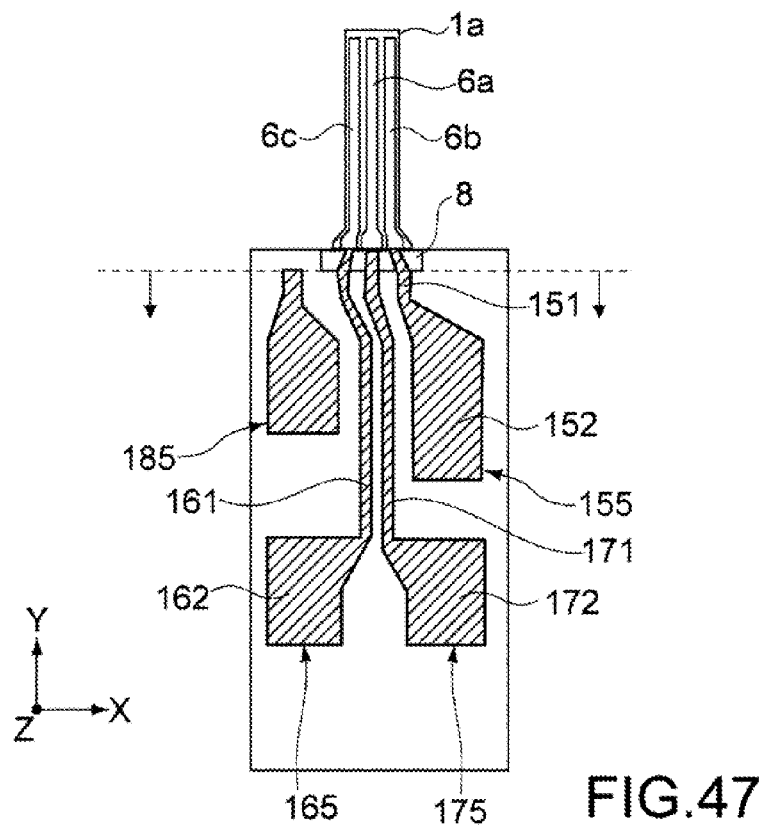
FIG. 47 is a schematic diagram showing a piezoelectric device of which the area ratio of a first lead electrode and a second lead electrode is 0.9.
Figure 48:
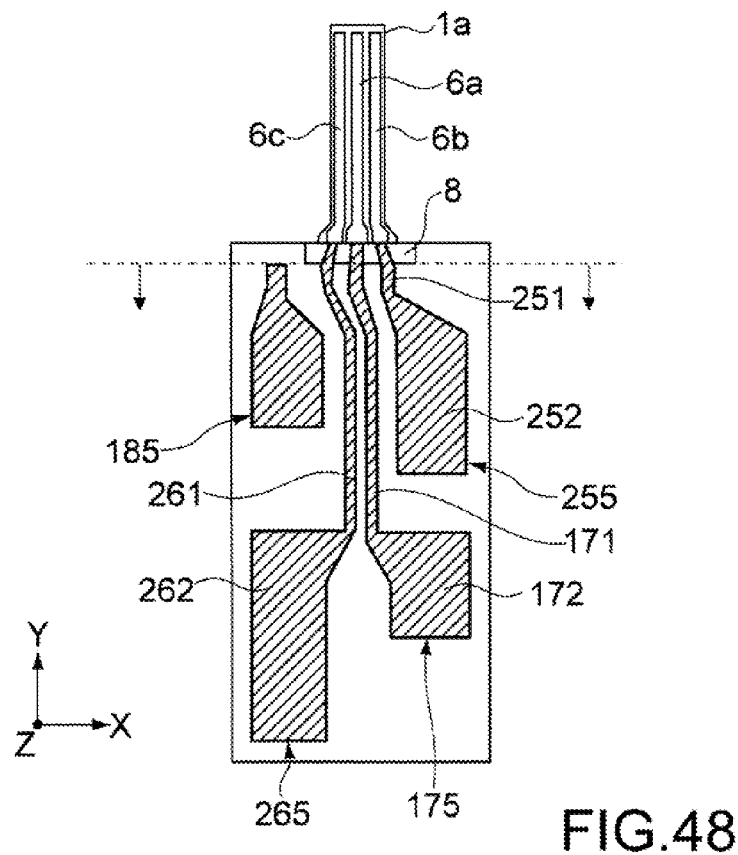
FIG. 48 is a schematic diagram showing a piezoelectric device of which the area ratio of a first lead electrode and a second lead electrode is 1.2.
Figure 49:
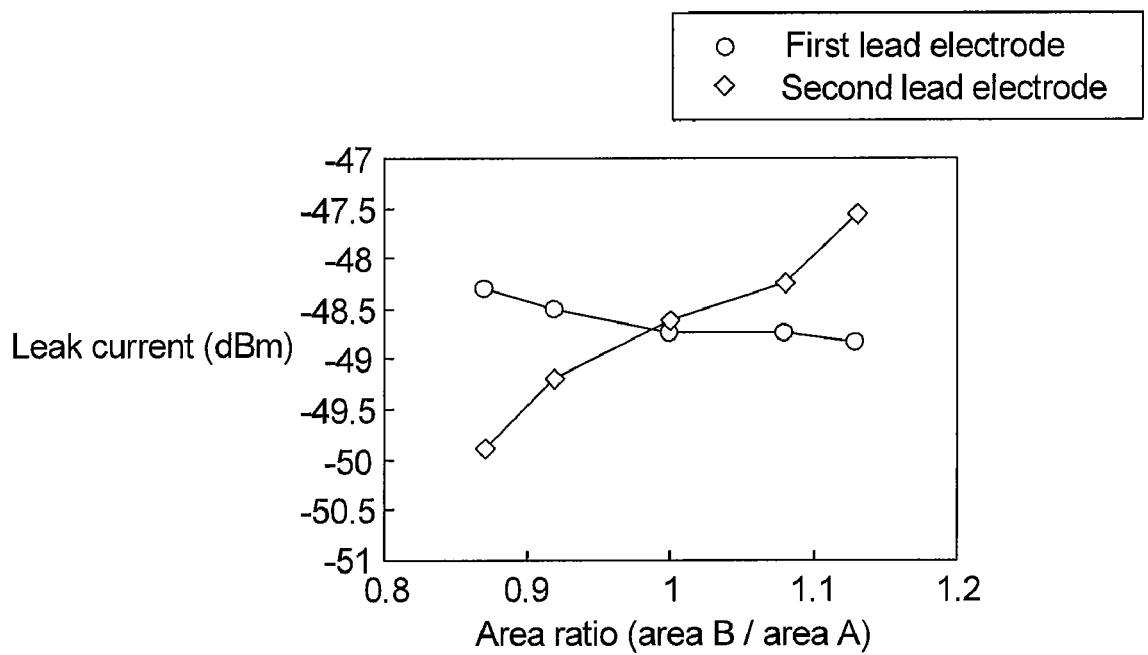
FIG. 49 is a graph showing measured results of leak currents.

As shown in FIG. 47 and FIG. 48, the inventors of the present patent application manufactured two or more types of patterns of a first lead electrode 155 (255) and a second lead electrode 165 (265) and measured leak currents that flow from a third lead electrode 175. FIG. 47 shows the case of which area ratio (area B/area A)=0.9. FIG. 48 shows the case of which area ratio (area B/area A)=1.2. The inventors of the present patent application also manufactured piezoelectric devices 100 having various area ratios and measured leak currents thereof. FIG. 49 is a graph showing measured results of the leak currents. The graph shows the leak currents of the first lead electrode and the second lead electrode. It is clear from FIG. 49 that the leak currents are simply proportional to area ratios of area B and area A. When the area ratio is 1, namely area B is the same as area A, the leak currents that flow to the first lead electrode and the second lead electrode are nearly the same.

Figure 50:
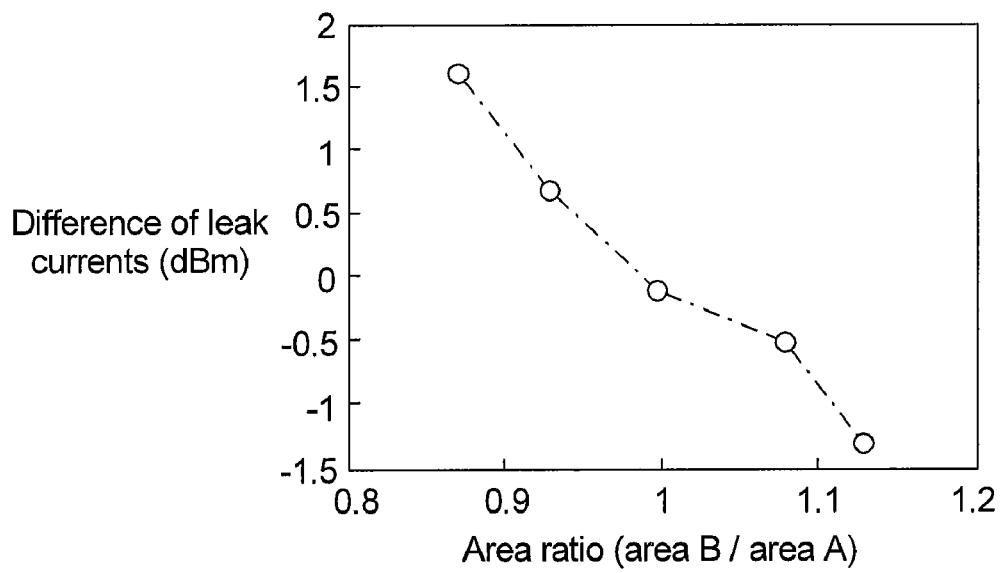
FIG. 50 is a graph showing the difference of leak currents against the area ratios of the first lead electrode and the second lead electrode.

FIG. 50 is a graph that more clearly shows the relationship between the leak currents and area ratios than that of the graph shown in FIG. 49. It is clear from FIG. 50 that the difference between leak currents is the minimum when area A is the same as area B.

Figure 51:
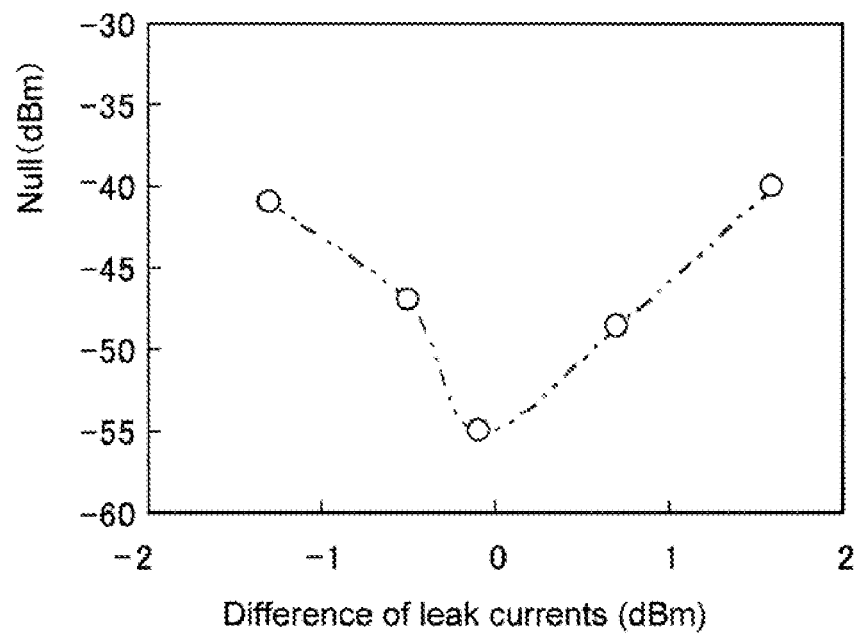
FIG. 51 is a graph showing the relationship between the differences of leak currents and the differences of signals from the first and second detection electrodes (null voltages) in the state that the Coriolis force has not been applied.

FIG. 51 is a graph showing the relationship between the differences of the leak currents and the differences of signals from the first detection electrode 6b and the second detection electrode 6c in the state that the Coriolis force is not applied (hereinafter, these differences are referred to as null voltages). It is clear from FIG. 51 that the leak currents are proportional to the null voltages regardless of the directions of the detection signals from the first detection electrode 6b and the second detection electrode 6c.

Figure 52:
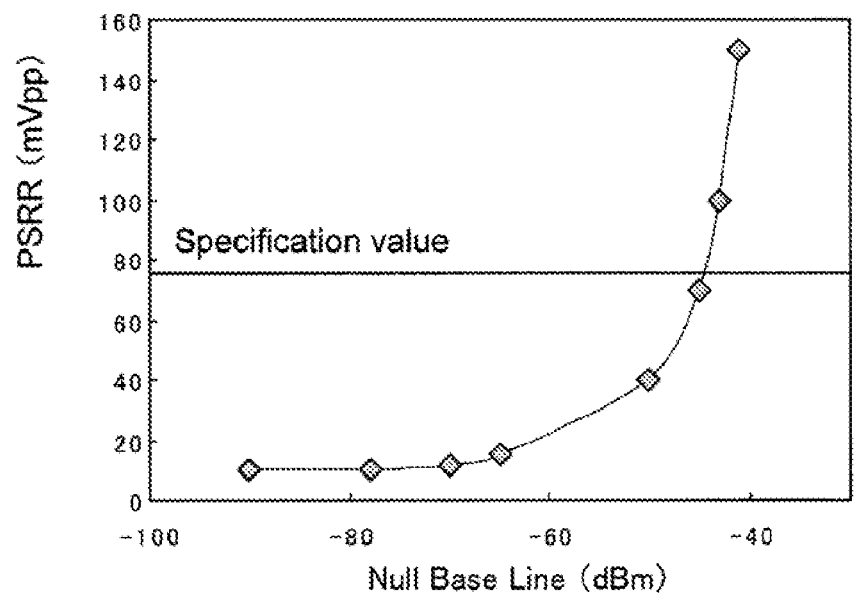
FIG. 52 is a graph showing the relationship between the null voltages and the PSRRs.

FIG. 52 is a graph showing the relationship between the null voltages and PSRRs. It is clear from FIG. 52 that the PSRRs are largely proportional to the null voltages. When an electronic device to which an oscillation type gyro sensor according to this embodiment is mounted is a digital camera and the specification value of the PSRR is 80 mV or less, the null voltage becomes −45 dBm or less (−50 dBm or less).

Figure 53:
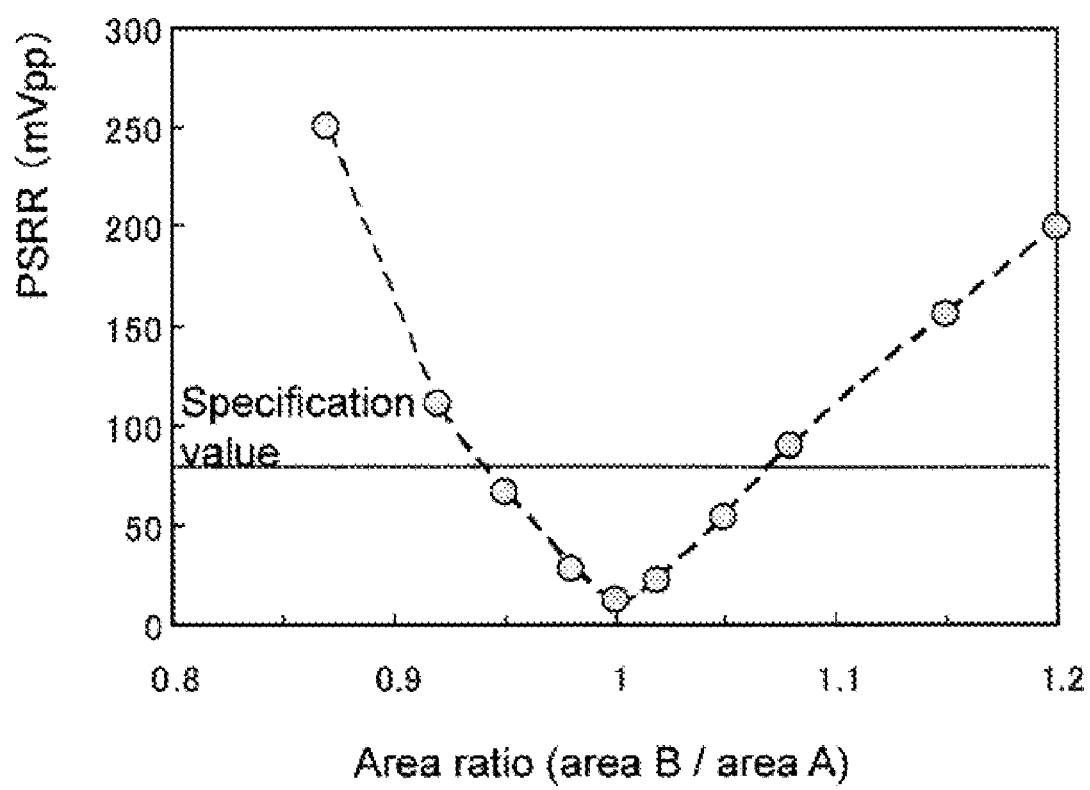
FIG. 53 is a graph showing the relationship between the area ratios of the first and second lead electrodes and the PSRRs.

FIG. 53 is a graph showing the relationship between the PSRRs and the area ratios of the first and second lead electrodes. It is clear from FIG. 53 that when the PSRR is 80 mV or less, the area ratio of the first and second lead electrodes is necessary to be 8% or less (5% or less).

As described above, it is clear that when the area of the first lead electrode 55 is substantially the same as the area of the second lead electrode 65, the difference between the leak currents becomes small. The inventors of the present patent application studied whether or not the leak current varies depending on the difference between the distance from the third lead electrode to the first lead electrode 55 and the distance from the third lead electrode to the second lead electrode 65 as another factor other than the area ratio.

Figure 54:
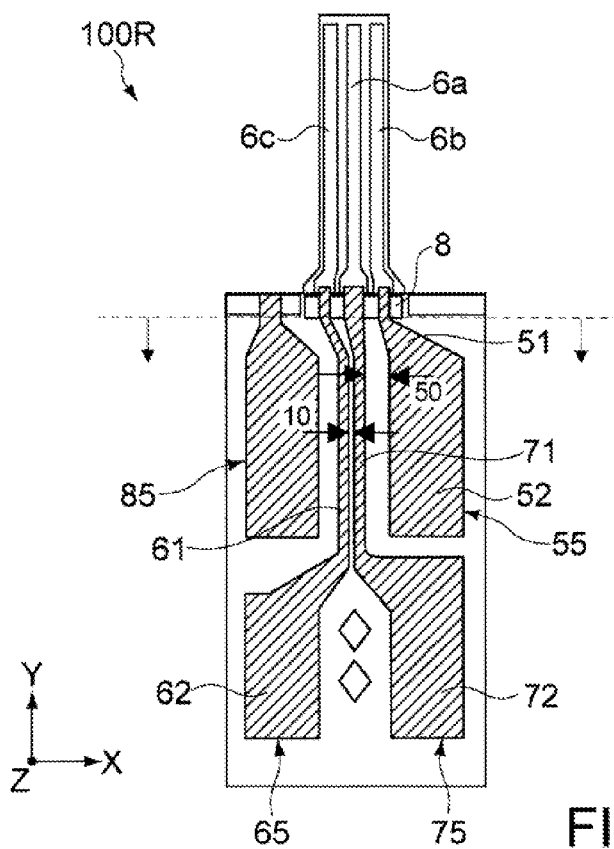
FIG. 54 is a schematic diagram showing an example of a piezoelectric device of which the distance between electrodes is different.
Figure 55:
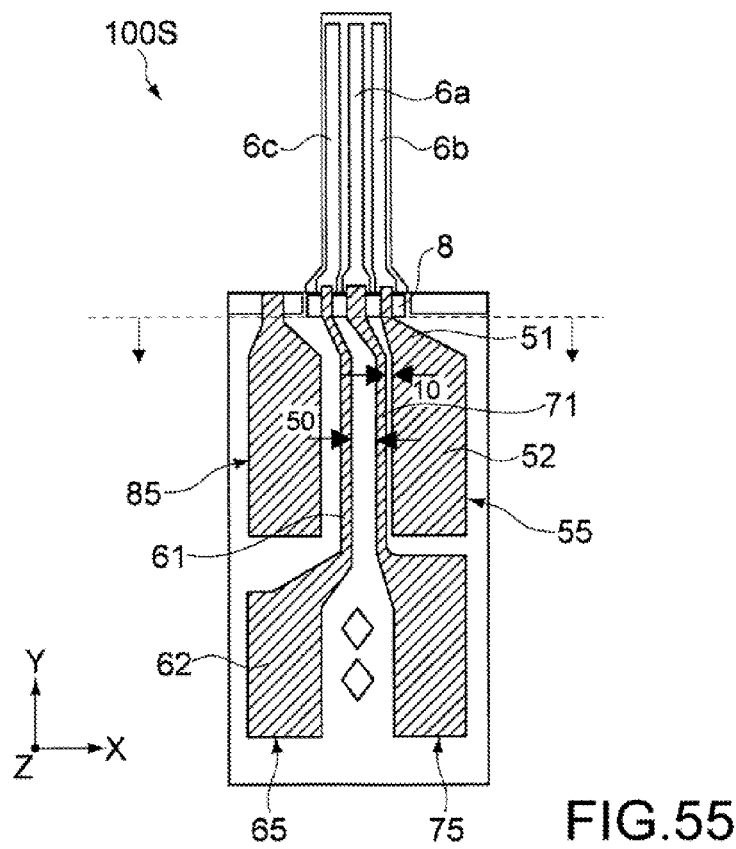
FIG. 55 is a schematic diagram showing an example of a piezoelectric device of which the distance between electrodes is different.
Figure 56:
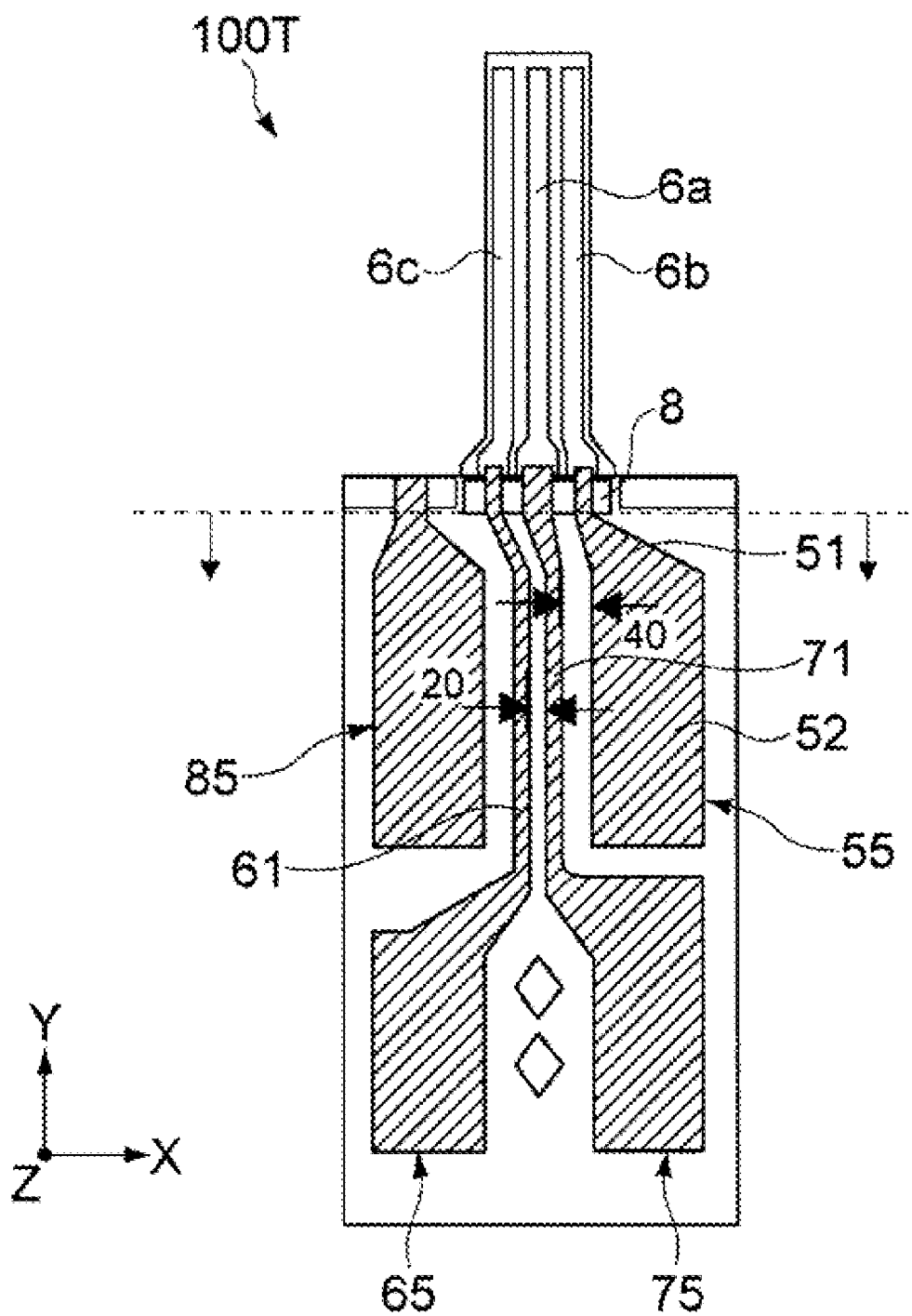
FIG. 56 is a schematic diagram showing an example of a piezoelectric device of which the distance between electrodes is different.

FIG. 54 to FIG. 56 are schematic diagrams partially showing piezoelectric devices that differ in these distances. The type of the piezoelectric device shown in FIG. 54 is the same as that shown in FIG. 46. In the following description, the type of the piezoelectric device shown in FIG. 54 is referred to as type R. The type of the piezoelectric device shown in FIG. 55 is referred to as type S. The type of the piezoelectric device shown in FIG. 56 is referred to as type T.

In a piezoelectric device 100R of type R, the distance between the third lead wire 71 and the second lead wire 61 is very short, 10 μm. The distance between the third lead wire 71 and the first pad 52 is 50 μm.

In a piezoelectric device 100S of type S, the distance between the third lead wire 71 and the first pad 52 is very short, 10 μm. The distance between the third lead wire 71 and the second lead wire 61 is 50 μm.

In a piezoelectric device 100T of type T, the distance between the third lead wire 71 and the second lead wire 61 is 20 μm. The distance between the third lead wire 71 and the first pad 52 is 40 μm.

Figure 57:
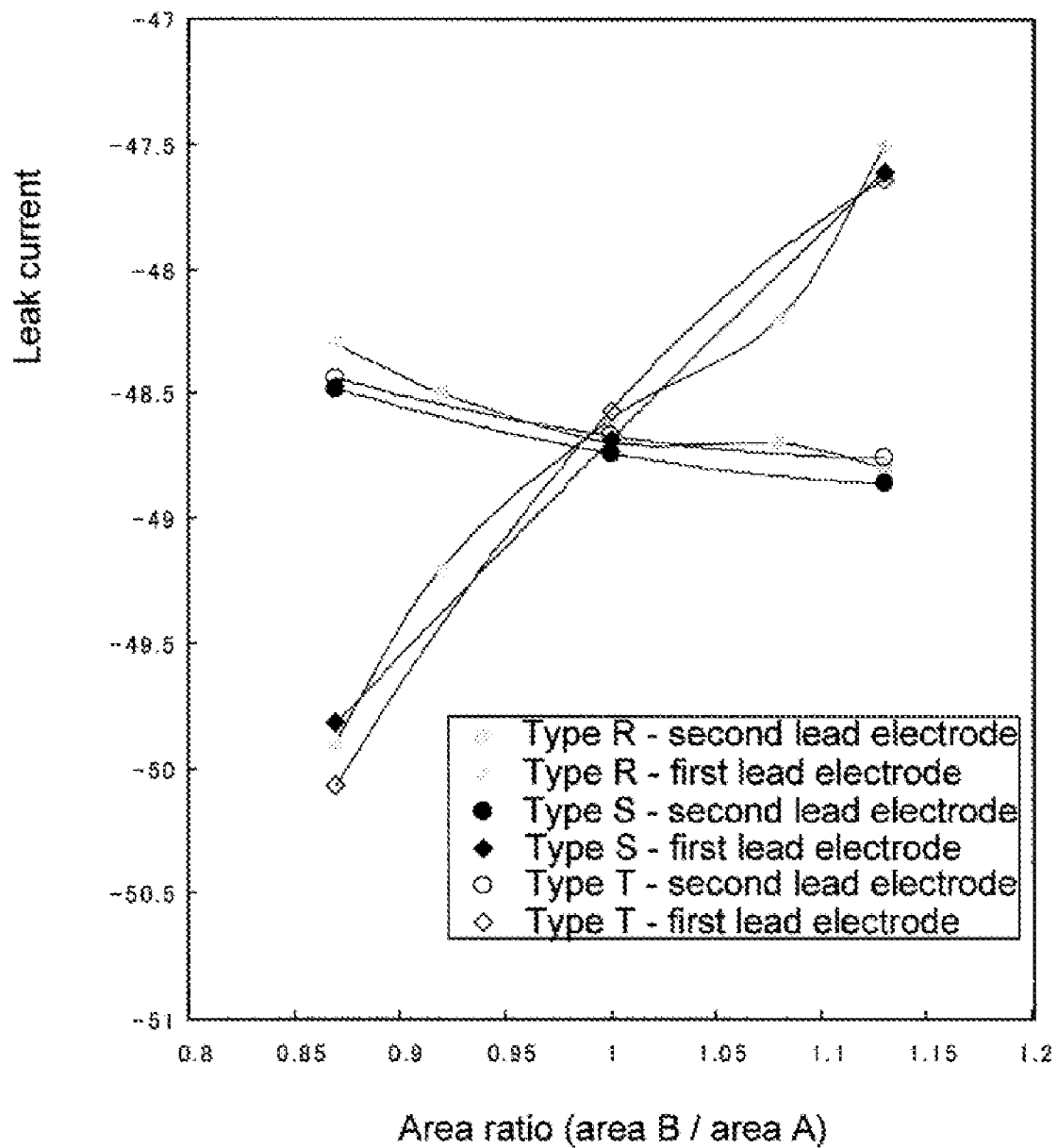
FIG. 57 is a graph showing dependency of the distance of electrodes and area ratio against leak currents for three types of area ratios of first and second lead electrodes of the three piezoelectric devices of FIG. 54 to FIG. 56.

The inventors of the present patent application categorized the area ratios of the first lead electrode 55 and the second lead electrode 56 of the piezoelectric device 100R of type R, the piezoelectric device 100S of type S, and the piezoelectric device 100T of type T as three types and studied the dependency of the distance between electrodes and area ratio against leak currents for the three types. FIG. 57 is a graph showing the results. The area ratios of these three types are 0.87, 1.00, and 1.13. It is clear from FIG. 57 that the leak currents just depend on the area ratios regardless of the distance between electrodes of types R, S, and T.

Figure 58:
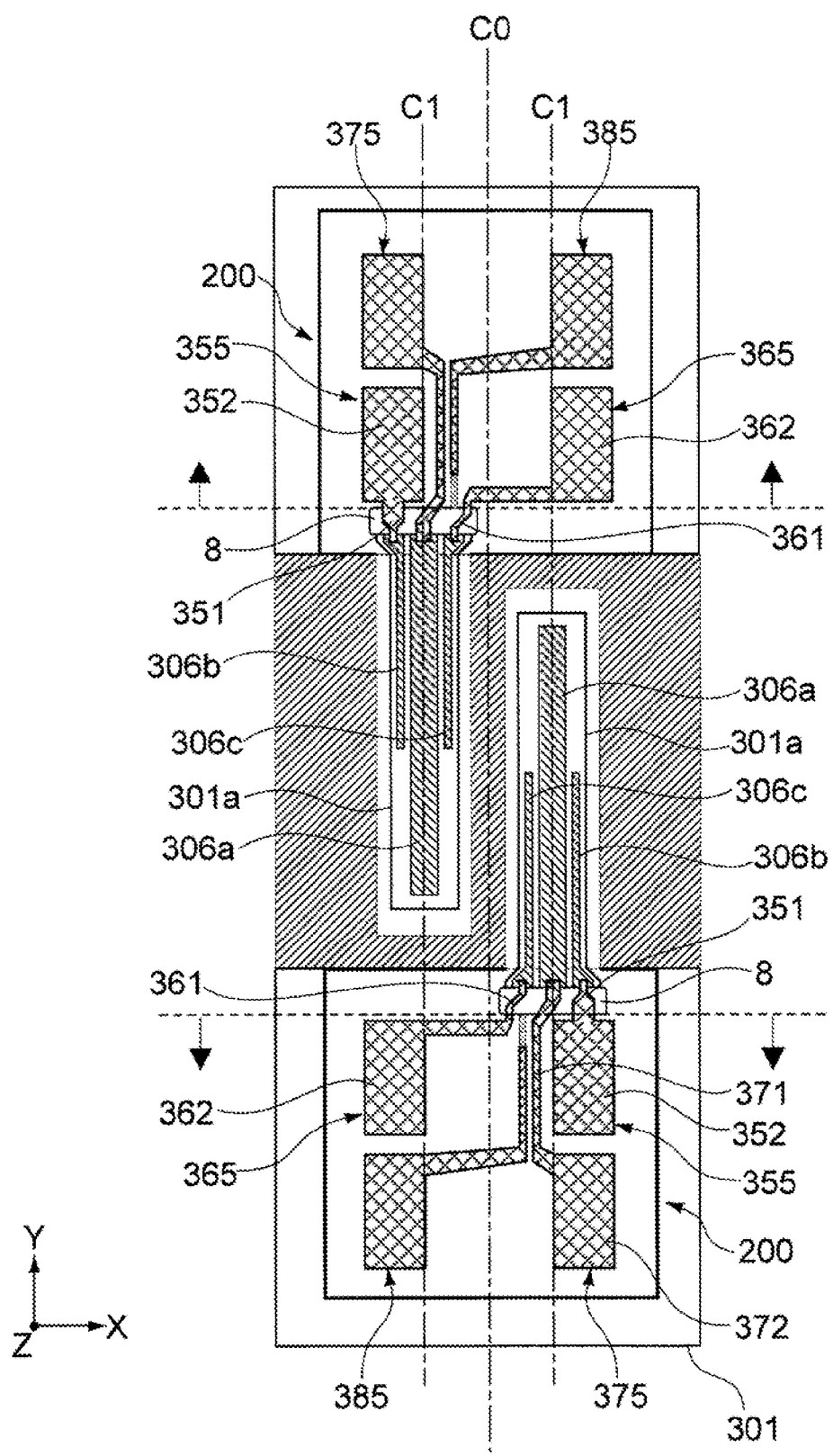
FIG. 58 is a schematic diagram showing a piezoelectric device according to another embodiment.

FIG. 58 is a schematic diagram showing a piezoelectric device 200 according to another embodiment. In the following, similar portions and functions to those of the piezoelectric device 100 shown in FIG. 1, FIG. 46, and so forth will be briefly described or omitted. Different points between the piezoelectric device 100 of the foregoing embodiment and the piezoelectric device 200 of this embodiment will be mainly described.

The manufacturing method of the piezoelectric device 200 shown in FIG. 58 is basically the same as that of the piezoelectric device 100. A plurality of piezoelectric devices 200 are manufactured from one substrate 301 by the MEMS technique. FIG. 58 shows two piezoelectric devices 200 of those manufactured from the substrate 301.

The piezoelectric device 200 has an arm portion 301a. The arm portion 301a has a drive electrode 306a, a first detection electrode 306b, and a second detection electrode 306c. In addition, the piezoelectric device 200 has a third lead electrode 375 connected to the drive electrode 306a, a first lead electrode 355 connected to the first detection electrode 306b, a second lead electrode 365 connected to the second detection electrode 306c, and a reference lead electrode 385. The first lead electrode 355 is composed of a first lead wire 351 and a first pad 352. The second lead electrode 365 is composed of a second lead wire 361 and a second pad 362. As in the foregoing embodiment, in this embodiment, the first lead electrode 355 is asymmetrical to the second lead electrode 365. The area of the first lead electrode 355 is substantially the same as the area of the second lead electrode 365. Thus, the difference between a leak current that flows from the third lead electrode 375 to the first lead electrode 355 and a leak current that flows from the third lead electrode 375 to the second lead electrode 365 can be decreased. As a result, the PSRR can be decreased.

In this embodiment, center axis C1 in the Y direction of the arm portion 301a of one piezoelectric device 200 is offset against center axis C0 of another piezoelectric device 200. In this embodiment, even if the first lead electrode 355 is asymmetrical to the second lead electrode 365, center axis C1 is not necessary to match center axis C0 as long as the area of the first lead electrode 355 is substantially the same as the area of the second lead electrode 365. In this structure, when a plurality of piezoelectric devices 200 are manufactured from one substrate 301 by the MEMS technique or the like, the degree of freedom of these positions is improved. Thus, the number of piezoelectric devices 200 manufactured from one substrate 301 can be increased.

In other words, in the embodiment shown in FIG. 58, the first lead electrode 355 is asymmetrical to the second lead electrode 365 not only for the foregoing polarization treatment performed for a plurality of piezoelectric devices 200 at a time. In the state of which center axis C1 of the arm portion 301a is offset against center axis C0, the first lead electrode 355 and the second lead electrode 365 can be asymmetrically formed. However, in the manufacturing step of the piezoelectric devices 200 shown in FIG. 58, the polarization treatment can be performed for them at a time.

Figure 59:
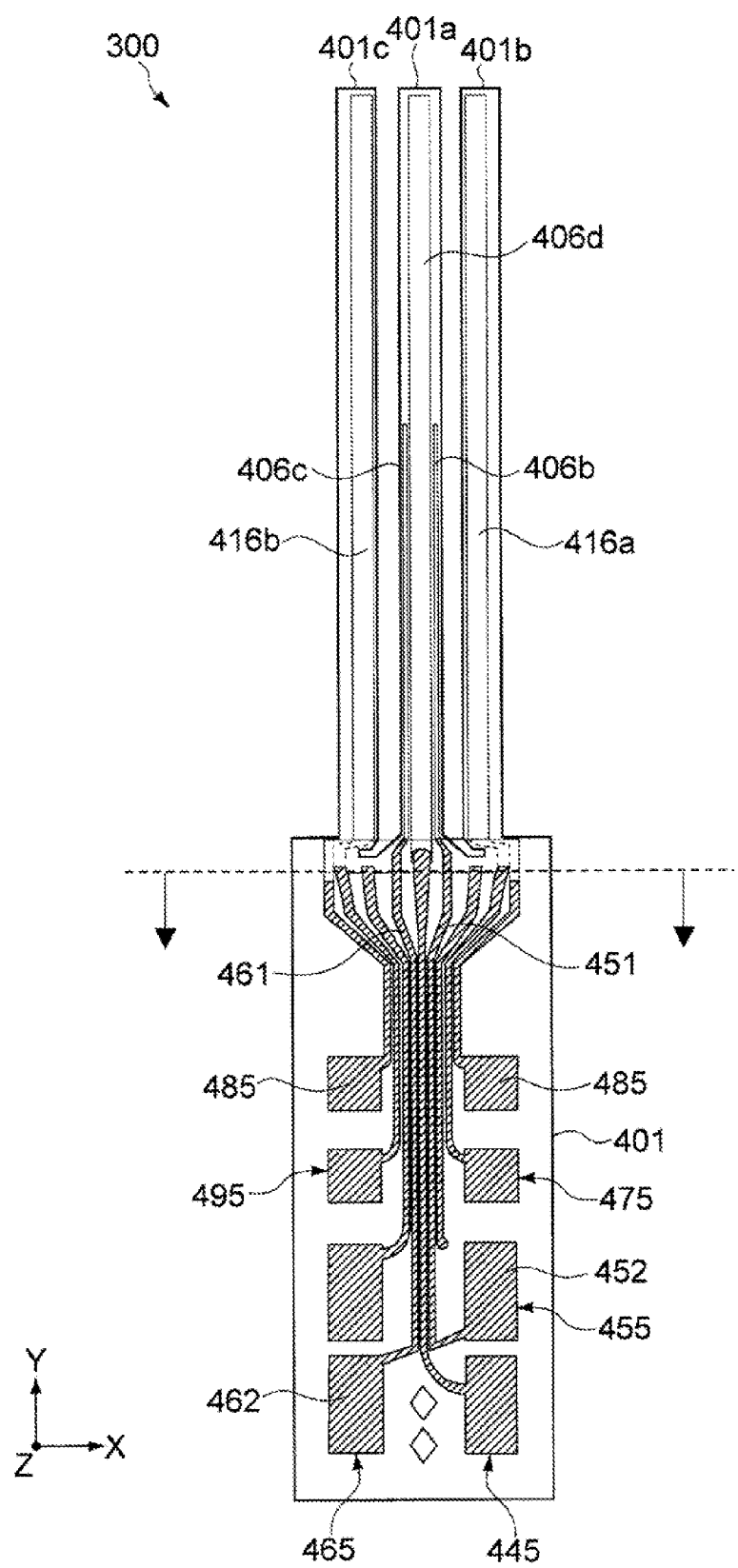
FIG. 59 is a plan view showing a piezoelectric device according to another embodiment.

FIG. 59 is a plan view showing a piezoelectric device 300 according to another embodiment.

The piezoelectric device 300 has a total of three arm portions that are first, second, and third arm portions 401a, 401b, and 401c. In other words, the piezoelectric device 300 is of a so-called tuning fork type (three-tuning fork type). A reference electrode 406d is formed at the center of the first arm 401a disposed at the center of the piezoelectric device 300. A first detection electrode 406b and a second detection electrode 406c are formed such that they sandwich the reference electrode 406d. A first drive electrode 416a and a second drive electrode 416b are formed on a right-side second arm portion 401b and a left-side third arm portion 401c, respectively. In this piezoelectric device 300, the first drive electrode 416a and the second drive electrode 416b are driven and a reference signal obtained from the reference electrode 406d is fed back to a control circuit (not shown). The control circuit generates drive signals supplied to the first drive electrode 416a and the second drive electrode 416b on the basis of the reference signal such that the first arm 401a, the second arm 401b, and the third arm 401c self-oscillate. In this case, the first and second arm portions 401a and 401b oscillate in the same phase. The third arm portion 401c oscillates in the reverse phase of the first arm portion 401a and the second arm portion 401b. When the Coriolis force occurs, the first detection electrode 406b and the second detection electrode 406c detect a signal corresponding to the Coriolis force.

The reference electrode 406d may function as a drive electrode. In addition, the first drive electrode 416a and the second drive electrode 416b may function as the first detection electrode and the second detection electrode, respectively. Thus, in such a manner, it can be contemplated that there are many modes of piezoelectric devices.

Connected to the first detection electrode 406b and the second detection electrode 406c are a first lead electrode 455 and a second lead electrode 465, respectively. Connected to the first drive electrode 416a and the second drive electrode 416b are a third lead electrode 475 and a fourth lead electrode 495, respectively. In addition, another reference lead electrode 485 is formed. Connected to the reference electrode 406d is a fifth lead electrode 445. The first lead electrode 455 is composed of a first lead wire 451 and a first pad 452. The second lead electrode 465 is composed of a second lead wire 461 and a second pad 462. As in the foregoing embodiments, in this embodiment, the first lead electrode 455 and the second lead electrode 465 are formed such that they are asymmetrical and the area of the first lead electrode 455 is the same as the area of the second lead electrode 465. Thus, the difference between a leak current that flows from the third lead electrode 475 to the first lead electrode 455 and a leak current that flows from the fourth lead electrode 495 to the second lead electrode 465 can be decreased. As a result, the PSRR can be decreased.

Figure 60:
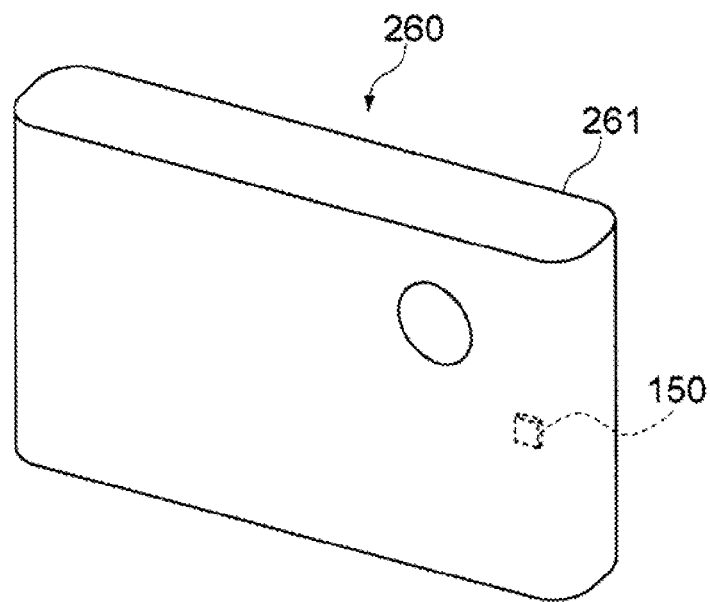
FIG. 60 is a schematic perspective view showing a digital camera exemplifying an electronic device in which an oscillation type gyro sensor is mounted.
Figure 61:
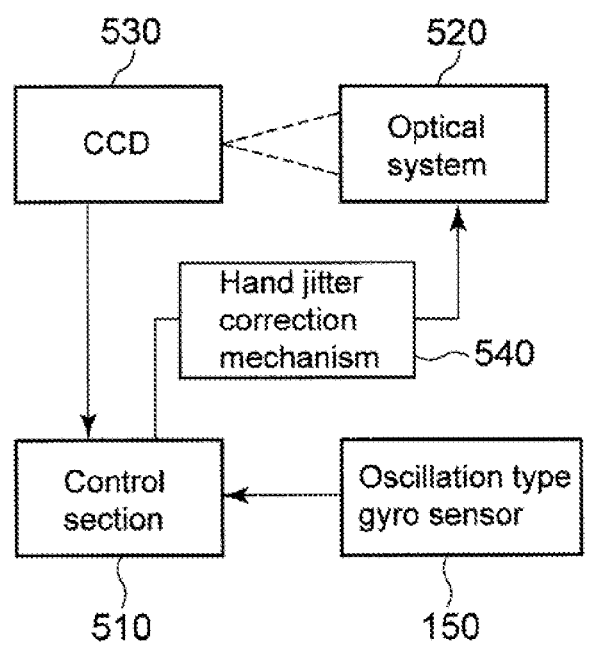
FIG. 61 is a block diagram showing the structure of the digital camera shown in FIG. 60.

FIG. 60 is a schematic perspective view showing a digital camera that exemplifies an electronic device in which the forgoing oscillation type gyro sensor 150 (see FIG. 45) has been mounted. FIG. 61 is a block diagram showing the structure of the digital camera.

The digital camera designated by reference numeral 260 has a device body 261 in which the oscillation type gyro sensor 150 is mounted. The device body 261 is for example a frame or a housing made of a metal, a resin, or the like.

As shown in FIG. 61, the digital camera 260 includes the oscillation type gyro sensor 150, a control section 510, an optical system 520 having a lens and so forth, a CCD 530, and a hand jitter correction mechanism 540 that corrects a hand jitter of the optical system 520.

The oscillation type gyro sensor 150 detects the Coriolis force in two axes. The control section 510 causes the hand jitter correction mechanism 540 to correct a hand jitter of the optical system 520 according to the detected Coriolis force.

It should be understood by those skilled in the art that various modifications, combinations, sub-combinations and alternations may occur depending on design requirements and other factors insofar as they are within the scope of the appended claims or the equivalents thereof.

The shape, size, material, and so forth of the substrate, wirings, arm portion that compose the piezoelectric device 100 (200, 300) can be changed when necessary.

The electronic device in which the oscillation type gyro sensor according to each of the foregoing embodiments is mounted is not limited to the foregoing digital camera. Such electronic devices include a laptop computer, a PDA (Personal Digital Assistance), an electronic dictionary, an audio/visual device, a projector, a mobile phone, a game machine, a car navigation unit, and a robot, but not limited thereto.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A piezoelectric device, comprising:
   a substrate having an arm portion;
   a piezoelectric member disposed on the substrate;
   a drive electrode which oscillates the arm portion by a piezoelectric operation of the piezoelectric member;
   a first detection electrode and a second detection electrode which detect a Coriolis force which occurs in the arm portion which oscillates;
   a first lead electrode which has a first total area, the first lead electrode being disposed on the substrate and connected to the first detection electrode, the first lead electrode connecting the first detection electrode to an outside of the piezoelectric device, wherein the first lead electrode has (i) a first lead wire connected to a connection portion of the first detection electrode having a first length, and (ii) a first pad connected to the first lead wire having a first pad area;
   a second lead electrode which has a second total area which is substantially the same as the first total area, the second lead electrode being disposed on the substrate in a shape asymmetrical to the first lead electrode with respect to an axis in a longitudinal direction of the arm portion and connected to the second detection electrode, the second lead electrode connecting the second detection electrode to the outside of the piezoelectric device, wherein the second lead electrode has (i) a second lead wire connected to a connection portion of the second detection electrode having a second length larger than the first length, and (ii) a second pad connected to the second lead wire having a second pad area smaller than the first pad area; and a third lead electrode which connects the drive electrode to the outside of the piezoelectric device.

2. The piezoelectric device as set forth in claim 1, wherein the drive electrode is disposed between the first detection electrode and the second detection electrode, and wherein the third lead electrode has:

a third lead wire which is connected to the drive electrode and has a third length larger than the first length; and a third pad connected to the third lead wire.

3. The piezoelectric device as set forth in claim 1, wherein a difference in area between the first total area and the second total area is 8% or less.

4. An oscillation type gyro sensor, comprising:

a substrate having an arm portion;

a piezoelectric member disposed on the substrate;

a drive electrode which oscillates the arm portion by a piezoelectric operation of the piezoelectric member;

a first detection electrode and a second detection electrode which detect a Coriolis force which occurs in the arm portion which oscillates;

a first lead electrode which has a first total area, the first lead electrode being disposed on the substrate and connected to the first detection electrode, the first lead electrode connecting the first detection electrode to an outside of the piezoelectric device, wherein the first lead electrode has (i) a first lead wire connected to a connection portion of the first detection electrode having a first length, and (ii) a first pad connected to the first lead wire having a first pad area;

a second lead electrode which has a second total area which is substantially the same as the first total area, the second lead electrode being disposed on the substrate in a shape asymmetrical to the first lead electrode with respect to an axis in a longitudinal direction of the arm portion and connected to the second detection electrode, the second lead electrode connecting the second detection electrode to the outside of the piezoelectric device, wherein the second lead electrode has (i) a second lead wire connected to a connection portion of the second detection electrode having a second length larger than the first length, and (ii) a second pad connected to the second lead wire having a second pad area smaller than the first pad area;

a third lead electrode which connects the drive electrode to the outside of the piezoelectric device; and a control circuit which is capable of outputting a drive signal to the drive electrode through the third lead electrode and obtaining a detection signal detected by the first detection electrode and the second detection electrode through the first lead electrode and the second lead electrode, respectively.

5. An electronic device, comprising:

an oscillation type gyro sensor having:

a substrate having an arm portion;

a piezoelectric member disposed on the substrate;

a drive electrode which oscillates the arm portion by a piezoelectric operation of the piezoelectric member;

a first detection electrode and a second detection electrode which detect a Coriolis force which occurs in the arm portion which oscillates;

a first lead electrode which has a first total area, the first lead electrode being disposed on the substrate and connected to the first detection electrode, the first lead electrode connecting the first detection electrode to an outside of the piezoelectric device, wherein the first lead electrode has (i) a first lead wire connected to a connection portion of the first detection electrode having a first length, and (ii) a first pad connected to the first lead wire having a first pad area;

a second lead electrode which has a second total area which is substantially the same as the first total area, the second lead electrode being disposed on the substrate in a shape asymmetrical to the first lead electrode with respect to an axis in a longitudinal direction of the arm portion and connected to the second detection electrode, the second lead electrode connecting the second detection electrode to the outside of the piezoelectric device, wherein the second lead electrode has (i) a second lead wire connected to a connection portion of the second detection electrode having a second length larger than the first length, and (ii) a second pad connected to the second lead wire having a second pad area smaller than the first pad area;

a third lead electrode which connects the drive electrode to the outside of the piezoelectric device; and a control circuit which is capable of outputting a drive signal to the drive electrode through the third lead electrode and obtaining a detection signal detected by the first detection electrode and the second detection electrode through the first lead electrode and the second lead electrode, respectively; and a device body in which the oscillation type gyro sensor is mounted.

6. A method of manufacturing a piezoelectric device, comprising:

forming a piezoelectric member on a substrate;

forming a drive electrode which oscillates an arm portion on the piezoelectric member;

forming a first detection electrode and a second detection electrode on the piezoelectric member, the first detection electrode and the second detection electrode detecting a Coriolis force which occurs in the arm portion which oscillates;

forming a first lead electrode on the substrate such that the first lead electrode is connected to the first detection electrode, the first lead electrode connecting the first detection electrode to an outside of the piezoelectric device, the first electrode having a first total area, wherein the first lead electrode is formed is formed to include (i) a first lead wire connected to a connection portion of the first detection electrode having a first length, and (ii) a first pad connected to the first lead wire having a first pad area;

forming a second lead electrode on the substrate such that the second lead electrode is connected to the second detection electrode, the second lead electrode connecting the second detection electrode to the outside of the piezoelectric device, the second lead electrode being asymmetrical to the first lead electrode with respect to an axis in a longitudinal direction of the arm portion, the second lead electrode having a second total area which is substantially same as the first total area, wherein the second lead electrode is formed to include (i) a second lead wire connected to a connection portion of the second detection electrode having a second length larger than the first length, and (ii) a second pad connected to the second lead wire having a second pad area smaller than the first pad area; and forming a third lead electrode on the substrate, the third lead electrode connecting the drive electrode to the outside of the piezoelectric device.

7. The method of the manufacturing the piezoelectric device as set forth in claim 6, further comprising:
when a plurality of piezoelectric devices are manufactured on the substrate, performing a polarization treatment for the piezoelectric members of the piezoelectric devices at a time.

* * * * *